United States Patent
Yang

(10) Patent No.: US 9,953,180 B2
(45) Date of Patent: Apr. 24, 2018

(54) METHOD AND APPARATUS FOR CONTROLLING AN AGGREGATION SERVER

(71) Applicant: LG ELECTRONICS INC., Seoul (KR)

(72) Inventor: Seungryul Yang, Seoul (KR)

(73) Assignee: LG Electronics Inc., Seoul (KR)

(*) Notice: Subject to any disclaimer, the term of this patent is extended or adjusted under 35 U.S.C. 154(b) by 453 days.

(21) Appl. No.: 14/431,721

(22) PCT Filed: Sep. 27, 2013

(86) PCT No.: PCT/KR2013/008714
§ 371 (c)(1),
(2) Date: Mar. 26, 2015

(87) PCT Pub. No.: WO2014/051395
PCT Pub. Date: Apr. 3, 2014

(65) Prior Publication Data
US 2015/0242646 A1  Aug. 27, 2015

Related U.S. Application Data

(60) Provisional application No. 61/706,776, filed on Sep. 28, 2012, provisional application No. 61/863,433, filed on Aug. 8, 2013.

(51) Int. Cl.
*G06F 17/30* (2006.01)
*G06F 21/62* (2013.01)
(Continued)

(52) U.S. Cl.
CPC .......... *G06F 21/6218* (2013.01); *G06F 15/16* (2013.01); *G06F 17/30* (2013.01);
(Continued)

(58) Field of Classification Search
CPC .................................................. G06F 21/6218
See application file for complete search history.

(56) References Cited

U.S. PATENT DOCUMENTS

2005/0135341 A1  6/2005  Kim
2006/0133330 A1*  6/2006  Chin ..................... H04W 48/18
                                                          370/338
(Continued)

FOREIGN PATENT DOCUMENTS

JP    2005-20706 A    1/2005
JP    2007-200436 A   8/2007
(Continued)

OTHER PUBLICATIONS

Kubovy, "Network Media Content Aggregator for DLNA Server," XP-002755863, Johannes Kepler University Linz, Jul. 2011, 108 pages.

*Primary Examiner* — Syed H Hasan
(74) *Attorney, Agent, or Firm* — Birch, Stewart, Kolasch & Birch, LLP

(57) ABSTRACT

The present invention provides a method for controlling an aggregate server aggregating content information stored in at least one of an aggregated server, requesting, to the aggregate server, an aggregation restriction for content information of a specific aggregated server; and changing an aggregation restriction state variable according to the requesting, wherein the aggregation restriction state variable represents identification information of the specific aggregated server of which the content information is not allowed to be aggregated by the aggregate server.

8 Claims, 53 Drawing Sheets

(51) Int. Cl.
*H04L 29/08* (2006.01)
*G06F 15/16* (2006.01)

(52) U.S. Cl.
CPC .............. *H04L 67/02* (2013.01); *H04L 67/10* (2013.01); *H04L 67/2838* (2013.01)

(56) References Cited

U.S. PATENT DOCUMENTS

| | | | |
|---|---|---|---|
| 2007/0219953 A1* | 9/2007 | Mak | G06F 17/30038 |
| 2009/0245176 A1 | 10/2009 | Balasubramanian et al. | |
| 2009/0327507 A1 | 12/2009 | Douillet et al. | |
| 2010/0036907 A1 | 2/2010 | Douillet et al. | |

FOREIGN PATENT DOCUMENTS

| | | |
|---|---|---|
| JP | 2007-281918 A | 10/2007 |
| JP | 2008-257511 A | 10/2008 |
| JP | 2009-38699 A | 2/2009 |
| JP | 2009-188690 A | 8/2009 |
| JP | 2011-517186 A | 5/2011 |
| KR | 10-2005-0062849 A | 6/2005 |
| KR | 10-0724361 B1 | 6/2007 |
| KR | 10-0745722 B1 | 8/2007 |
| KR | 10-2012-0064882 A | 6/2012 |
| WO | WO 2007/072236 A1 | 6/2007 |

* cited by examiner

FIG. 10

| Device properties | Total Storage Size | Free Storage Size | Memory | CPU | XML Parsing Capability | Transforming Capability | Connectivity &Transfer Protocols | The number of Stored Content | Device Type | Aggregation Mode |
|---|---|---|---|---|---|---|---|---|---|---|
| ACMS #1 | 1GB | 500MB | 1.5GB | 3.5 GHz | Grade 3 | 32 | Grade 1 | 77 | Grade 2 | Off |
| ACMS #2 | 500MB | 100MB | 2GB | 2.53 GHz | Grade 1 | 13 | Grade 2 | 204 | Grade 4 | On |
| ACMS #3 | 100MB | 20MB | 1GB | 1 GHz | Grade 3 | 0 | Grade 1 | 564 | Grade 1 | Off |

| Device properties | Total Storage Size | Free Storage Size | Memory | CPU | XML Parsing Capability | Transforming Capability | Connectivity &Transfer Protocols | The number of Stored Content | Device Type | Aggregation Mode | Sum | Overall Rank |
|---|---|---|---|---|---|---|---|---|---|---|---|---|
| ACMS #1 | 1 | 1 | 2 | 1 | 2 | 1 | 1 | 3 | 2 | 2 | 16 | 1 |
| ACMS #2 | 2 | 2 | 1 | 2 | 1 | 2 | 3 | 2 | 3 | 1 | 19 | 2 |
| ACMS #3 | 3 | 3 | 3 | 3 | 3 | 3 | 1 | 1 | 1 | 2 | 23 | 3 |

FIG. 11

| Device properties | Aggregation Capability |
|---|---|
| ACMS #1 | Grade 1 |
| ACMS #2 | Grade 3 |
| ACMS #3 | Grade 4 |

FIG. 19

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Unknown | ... |
| | 17 | 7 | aab3 | episode07 | Beckham | ... |
| | 18 | 8 | 78wq | episode08 | Rooney | ... |

FIG. 20

| Property (Metadata type) | ObjectID | aggregatedObjectID | originalServerUDN | title | creator | ... |
|---|---|---|---|---|---|---|
| Aggregate Object on AMS | 11 | 1 | aab3 | pilot | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG. 21

| Property (Metadata type) | ObjectID | aggregatedObjectID | originalServerUDN | title | creator | |
|---|---|---|---|---|---|---|
| Aggregate Object on AMS | 11 | 1 | aab3 | pilot | Torres | ... |
| | | | deleted | | | |
| | 13 | 3 | aab3 | episode03 | Ronaldo | ... |
| | | | deleted | | | |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG. 22

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 13 | 3 | deleted | | | |
| | | | aab3 | episode03 | Ronaldo | ... |
| | 15 | 5 | deleted | | | |
| | | | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG. 23

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Xavi | ... |
| | 17 | 7 | aab3 | episode07 | Beckham | ... |
| | 18 | 8 | 78wq | finale | Rooney | ... |

FIG. 24

| Property (Metadata type) | ObjectID | aggregatedObjectID | originalServerUDN | title | creator | ... |
|---|---|---|---|---|---|---|
| Aggregate Object on AMS | 11 | 1 | aab3 | episode01 | Torres | ... |
| | 12 | 2 | aab3 | episode02 | Messi | ... |
| | 13 | 3 | aab3 | episode03 | Ronaldo | ... |
| | 14 | 4 | aab3 | episode04 | Park | ... |
| | 15 | 5 | aab3 | episode05 | Ki | ... |
| | 16 | 6 | 78wq | episode06 | Unknown | ... |
| | 17 | 7 | aab3 | episode07 | Beckham | ... |
| | 18 | 8 | 78wq | episode08 | Rooney | ... |

FIG. 27

| Property (Metadata type) | ObjectID | aggregatedObjectID | originalServerUDN | parentID | creator | ... |
|---|---|---|---|---|---|---|
| Aggregate Object on AMS | 11 | 1 | aab3 | 0 | Kim | ... |
| | 12 | 2 | aab3 | 11 | Messi | ... |
| | 13 | 3 | aab3 | 11 | Messi | ... |
| | 14 | 4 | aab3 | 11 | Park | ... |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG. 28

| Property (Metadata type) | ObjectID | aggregatedObjectID | originalServerUDN | parentID | creator | ... |
|---|---|---|---|---|---|---|
| Aggregate Object on AMS | 11 | 1 | aab3 | 0 | Kim | ... |
| | 12 | 2 | aab3 | 11 | Messi | ... |
| | 13 | 3 | aab3 | 11 | Messi | ... |
| | | | deleted | | | |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG. 29

| Property (Metadata type) | ObjectID | aggregatedObjectID | originalServerUDN | parentID | creator | ... |
|---|---|---|---|---|---|---|
| | 11 | 1 | aab3 | 0 | Torres | ... |
| | 12 | 2 | aab3 | 11 | Messi | ... |
| | 13 | 3 | aab3 | 11 | Messi | ... |
| Aggregate Object on AMS | | | deleted | | | |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG. 30

| Property (Metadata type) | ObjectID | aggregatedObjectID | originalServerUDN | parentID | creator | ... |
|---|---|---|---|---|---|---|
| Aggregate Object on AMS | 11 | 1 | aab3 | 0 | Torres | ... |
| | 12 | 2 | aab3 | 11 | Messi | ... |
| | 13 | 3 | aab3 | 11 | Ronaldo | ... |
| | 14 | 4 | aab3 | 11 | Park | ... |
| | 15 | 5 | aab3 | 14 | Ki | ... |
| | 16 | 6 | aab3 | 14 | Xavi | ... |
| | 17 | 7 | aab3 | 15 | Beckham | ... |
| | 18 | 8 | aab3 | 17 | Unknown | ... |

FIG. 31

| Property (Metadata type) | ObjectID | aggregatedObjectID | originalServerUDN | parentID | creator | ... |
|---|---|---|---|---|---|---|
| Aggregate Object on AMS | 11 | 1 | aab3 | 0 | Torres | ... |
| | 12 | 2 | aab3 | 11 | Messi | ... |
| | 13 | 3 | aab3 | 11 | Ronaldo | ... |
| | 14 | 4 | aab3 | 11 | Park | ... |
| | 15 | 5 | aab3 | 14 | Ki | ... |
| | 16 | 6 | aab3 | 14 | Unknown | ... |
| | 17 | 7 | aab3 | 15 | Beckham | ... |
| | 18 | 8 | aab3 | 17 | Rooney | ... |

FIG. 32

```
<AggregationStatus>
 <AggregatedCDS> :for the 1st aggregated CDSe
  <mediaserverID>The UDN</mediaserverID>
  <powerState>The Power State</powerState>
  <aggregateCriteria>SearchCriteria</aggregateCriteria>
  <aggregateProgress>The Progress</aggregateProgress>

</AggregatedCDS>
 ...
 ...
 <AggregatedCDS> :for the last aggregated CDS
  <mediaserverID>The UDN</mediaserverID>
  <powerState>The Power State</powerState>
  <aggregateCriteria>SearchCriteria</aggregateCriteria>
  <aggregateProgress>The Progress</aggregateProgress>
 </AggregatedCDS>
</AggregationStatus>
```

FIG. 34

| Property (Metadata type) | ObjectID | aggregatedObjectID | originalServerUDN | parentID | creator | ... |
|---|---|---|---|---|---|---|
| Aggregated Object on ADMS#1 | 1 | - | - | 0 | Torres | ... |
| | 2 | - | - | 1 | Messi | ... |
| | 3 | - | - | 1 | Ronaldo | ... |
| Aggregate Object on AMS | 14 | 1 | aab3 | 11 | Torres | ... |
| | 15 | 2 | aab3 | 14 | Messi | ... |
| | 16 | 3 | aab3 | 14 | Ronaldo | ... |

FIG. 35

| Property (Metadata type) | ObjectID | aggregatedObjectID | originalServerUDN | parentID | creator | ... |
|---|---|---|---|---|---|---|
| Aggregated Object on ADMS#1 | 1 | – | – | 0 | Torres | ... |
|  | 2 | – | – | 1 | Messi | ... |
|  | 3 | – | – | 1 | Ronaldo | ... |
| Aggregate Object on AMS | 14 | 1 | aab3 | 11 | Smith | ... |
|  | 15 | 2 | aab3 | 14 | Messi | ... |
|  | 16 | 3 | aab3 | 14 | Ronaldo | ... |

FIG. 36

| Property (Metadata type) | ObjectID | aggregatedObjectID | originalServerUDN | parentID | creator | ... |
|---|---|---|---|---|---|---|
| Aggregated Object on ADMS#1 | 1 | – | – | 0 | Torres | ... |
| | 2 | – | – | 1 | Ronaldo | ... |
| | 3 | – | – | 1 | Ronaldo | ... |
| Aggregate Object on AMS | 14 | 1 | aab3 | 11 | Smith | ... |
| | 15 | 2 | aab3 | 14 | Messi | ... |
| | 16 | 3 | aab3 | 14 | Ronaldo | ... |

FIG. 37

| Property (Metadata type) | ObjectID | aggregatedObjectID | originalServerUDN | parentID | creator | ... |
|---|---|---|---|---|---|---|
| Aggregated Object on ADMS#1 | 1 | – | – | 0 | Torres | ... |
| | 2 | – | – | 1 | Ronaldo | ... |
| | | | deleted | | | |
| Aggregate Object on AMS | 14 | 1 | aab3 | 11 | Smith | ... |
| | 15 | 2 | aab3 | 14 | Messi | ... |
| | 16 | 3 | aab3 | 14 | Ronaldo | ... |

FIG. 42

| Action name | GetAggregationRestrictedDevices() | | |
|---|---|---|---|
| Argument | | Direction | Related State Variable |
| AggregationRestrictedDevices | | OUT | AggregationRestrictedDevices |

FIG. 43

| Action name | | |
|---|---|---|
| SetAggregationRestrictedDevices() | | |
| Argument | Direction | Related State Variable |
| AggregationRestrictedDevices | OUT | AggregationRestrictedDevices |

FIG. 44

| State Variable name | Data type | Allowed value |
|---|---|---|
| AggregationRestrictedDevices | string | CSV (string) |

FIG. 49

| Action name | GetAggregationStatus() | | |
|---|---|---|---|
| | | Direction | Related State Variable |
| Argument | AggregationStatus | OUT | AggregationStatus |

FIG. 50

| State Variable name | Data type | Allowed value |
|---|---|---|
| AggregationStatus | string | AggregationStatus XML Document |

FIG. 51

```
<?xml version="1.0" encoding="UTF-8"?>
<AggregationStatus
    xmlns="urn:schemas-upnp-org:av:xx"
    xmlns:xsd="http://www.w3.org/2001/XMLSchema"
    xmlns:xsi="http://www.w3.org/2001/XMLSchema-instance"
    xsi:schemaLocation="
        urn:schemas-upnp-org:av:xx
        http://www.upnp.org/schemas/av/xx.xsd">
    <aggregatedCDS id="Associated UDN of the aggregated CDS ">       ——S5110
        <progress>Progress of aggregation</progress>   ——S5120
        <powerState>Associated Power state of the aggregated CDS</powerState>  ——S5130
        <systemUpdateID>SystemUpdateID value of the aggregated CDS </systemUpdateID>
    </aggregatedCDS>                                                          ——S5140
    <!-- Information of other aggregated CDSs -->  ——S5150
</AggregationStatus>
```

METHOD AND APPARATUS FOR CONTROLLING AN AGGREGATION SERVER

CROSS REFERENCE TO RELATED APPLICATIONS

This application is the National Phase of PCT International Application No. PCT/KR2013/008714, filed on Sep. 27, 2013, which claims priority under U.S.C. 119(e) to U.S. Provisional Application Nos. 61/706,776, filed on Sep. 28, 2012 and 61/863,443, filed on Aug. 8, 2013, all of which are hereby expressly incorporated by reference into the present application.

TECHNICAL FIELD

The present invention relates to a method and an apparatus for controlling an aggregation server collecting information stored in a plurality of servers.

BACKGROUND ART

As the number of UPnP devices or DLNA devices used at home or at a market increases, it becomes a common practice to incorporate a plurality of digital media servers in a home network. However, searching for, managing, and organizing media content included in a plurality of digital media server is getting more difficult in proportion to the number of digital media servers included in a home network. In case a user is unable to know at which server the content that the user tries to find through UPnP or DLNA technology is located, a problem arises that makes a search for the content conducted in all of digital media servers belonging to a home network.

DISCLOSURE

Technical Problem

To solve the problem above, the present invention has been made in an effort to provide a control apparatus configuring an aggregation server which collects information stored in other servers among a plurality of servers belonging to the same network.

The present invention has been made in an effort to provide a control apparatus configuring a negotiation server which activates an aggregation function of other servers.

The present invention has been made in an effort to provide an aggregation server which collects information stored in a plurality of servers and provides the collected information to a control apparatus.

The present invention has been made in an effort to provide a control apparatus which receives information stored in a plurality of servers from one aggregation server.

The present invention has been made in an effort to provide a control apparatus which restricts an aggregation server's collecting information from a particular server.

The present invention has been made in an effort to provide a server capable of tracking change of information stored in a plurality of servers.

The present invention has been made in an effort to provide a server capable of checking whether information stored in a plurality of servers has been changed and of updating changed information.

The present invention has been made in an effort to provide a server capable of providing latest content information by tracking and updating content information changed in a different server.

Technical Solution

The present invention provides a method for controlling an aggregate server aggregating content information stored in at least one of an aggregated server, the method requesting, to the aggregate server, an aggregation restriction for content information of a specific aggregated server and changing an aggregation restriction state variable according to the requesting, wherein the aggregation restriction state variable represents identification information of the specific aggregated server of which the content information is not allowed to be aggregated by the aggregate server.

The changing an aggregation restriction state variable according to the present invention adds identification information of the specific aggregated server or deletes identification information of a different aggregated server which is included in the aggregation restriction state variable.

The specific aggregated server corresponding to the added identification information according to the present invention does not allow content information thereof to be aggregated by the aggregate server.

The different aggregated server corresponding to the deleted identification information according to the present invention allows content information thereof to be aggregated by the aggregate server.

The method for controlling an aggregate server according to the present invention further comprises requesting the aggregation restriction state variable from the aggregate server; and receiving the aggregation restriction state variable from the aggregate server.

A method for transmitting content information stored in at least one aggregated server to a control apparatus according to another embodiment of the present invention comprises receiving from the control apparatus a request signal an aggregation restriction for content information of a specific aggregated server; and based on the request signal, changing a aggregation restriction state variable, wherein the aggregation restriction state variable represents identification information of an aggregated server of which the content information is not allowed to be aggregated by an aggregate server.

The changing an aggregation restriction state variable according to the present invention adds identification information of the specific aggregated server or deletes identification information of a different aggregated server which is included in the aggregation restriction state variable.

The aggregate server according to the present invention does not aggregate content information from the specific aggregated server corresponding to the added identification information.

The aggregate server according to the present invention aggregates content information from the different aggregated server corresponding to the deleted identification information.

The method for transmitting content information according to the present invention further comprises receiving a signal requesting the aggregation restriction state variable from the control apparatus; and transmitting the aggregation restriction state variable to the control apparatus.

An apparatus for controlling an aggregate server aggregating content information stored in at least one aggregated server according to a yet another embodiment of the present invention comprises a network interface transmitting and receiving content-related information to and from the aggregate server; and a controller requesting, to the aggregate server, an aggregation restriction for content information of a specific aggregated server and changing an aggregation restriction state variable according to the request, wherein the aggregation restriction state variable represents identification information of the specific aggregated server of which the content information is not allowed to be aggregated by the aggregate server.

An aggregate server transmitting content information stored in at least one aggregated server to a control apparatus according to a still another embodiment of the present invention comprises a network interface transmitting and receiving content-related information to and from the control apparatus; and a controller receiving from the control apparatus a request signal an aggregation restriction for content information of a specific aggregated server and changing an aggregation restriction state variable based on the request signal, wherein the aggregation restriction state variable represents identification information of the specific aggregated server of which the content information is not allowed to be aggregated by the aggregate server.

A method for controlling an aggregate server aggregating content information from an aggregated server according to a further embodiment of the present invention comprises obtaining aggregation state information of the aggregated server from the aggregated server; based on the obtained aggregation state information, checking whether state of the aggregated server has been changed; and in case it is determined from the checking result that the state of the aggregated server has been changed, updating the state of the aggregated server based on the obtained aggregation state information, wherein the aggregation state information includes an update identifier of the aggregated server.

The state of the aggregated server according to the present invention is checked by comparing an update identifier included in the obtained aggregation state information with a pre-stored update identifier of the aggregated server.

The state of the aggregated server according to the present invention is checked based on a request for obtaining the update identifier.

The method for controlling an aggregate server aggregating content information from an aggregated server according to the present invention further comprises requesting a search of the aggregated server for content information; and receiving modified content information from the aggregated server.

An aggregate server aggregating content information from an aggregated server according to an additional embodiment of the present invention comprises a network interface transmitting and receiving content-related information to and from a control apparatus; and a controller obtaining aggregation state information of the aggregated server from the aggregated server, checking based on the obtained aggregation state information whether the state of the aggregated server has been changed; and in case it is determined that the state of the aggregated server has been changed, updating the state of the aggregated server based on the obtained aggregation state information, wherein the aggregation state information includes an update identifier of the aggregated server.

The controller according to the present invention checks the state of the aggregated server by comparing an update identifier included in the obtained aggregation state information with a pre-stored update identifier of the aggregated server.

Advantageous Effects

The present invention can provide a control apparatus which configures an aggregate server aggregating information stored in other servers among a plurality of servers belonging to the same network.

The present invention can provide a control apparatus which configures a negotiation server activating an aggregation function of other servers.

The present invention can provide an aggregate server aggregating information stored in a plurality of servers and providing the aggregated information to a control apparatus.

The present invention can provide a control apparatus receiving information stored in a plurality of servers from one aggregate server.

The present invention can provide a control apparatus restricting an aggregation server's collecting information from a particular server.

The present invention can provide a server capable of tracking change of information stored in a plurality of servers.

The present invention can provide a server capable of checking whether information stored in a plurality of servers has been changed and updating changed information.

The present invention can provide a server capable of providing the latest content information by tracking and updating content information changed in other server.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 illustrates criteria based on which an aggregate media server is configured according to an embodiment of the present invention;

FIG. 11 illustrates criteria based on which an aggregate media server is configured according to another embodiment of the present invention;

FIG. 19 is a table illustrating aggregate object information on an aggregate media server according to an embodiment of the present invention;

FIG. 20 is a table illustrating aggregate object information updated on an aggregate media server according to an embodiment of the present invention;

FIG. 21 is a table illustrating aggregate object information discarded on an aggregate media server according to an embodiment of the present invention;

FIG. 22 is a table illustrating a case where specific aggregate object information is refreshed on an aggregate media server according to an embodiment of the present invention;

FIG. 23 is a table illustrating a case where all of the aggregate object information discarded on an aggregate media server is refreshed according to an embodiment of the present invention;

FIG. 24 is a table illustrating a case where all of the aggregate object information updated on an aggregate media server is refreshed according to an embodiment of the present invention;

FIG. 27 is a table illustrating aggregate object information updated on an aggregate media server according to another embodiment of the present invention;

FIG. 28 is a table illustrating aggregate object information discarded on an aggregate media server according to another embodiment of the present invention;

FIG. 29 is a table illustrating a case where specific aggregate object information is refreshed on an aggregate media server according to another embodiment of the present invention;

FIG. 30 is a table illustrating a case where specific aggregate object information is refreshed on an aggregate media server according to a yet another embodiment of the present invention;

FIG. 31 is a table illustrating a case where specific aggregate object information is refreshed on an aggregate media server according to a still another embodiment of the present invention;

FIG. 32 illustrates aggregated media server related information of XML type stored in an aggregate media server according to an embodiment of the present invention;

FIGS. 34 to 37 illustrate tables representing information stored in an aggregate media server and an aggregated media server in case an aggregate media server transmits a request received from a control point device to an aggregated media server according to an embodiment of the present invention;

FIGS. 42 to 44 are embodiments to which the present invention is applied, where

FIG. 42 represents action information for obtaining identification information of an aggregation restricted media server for which aggregation of content information by an aggregate media server is restricted;

FIG. 43 represents action information for configuring a specific aggregated media server for which aggregation of content information is restricted; and FIG. 44 represents a state variable used for the action information of FIG. 42 and FIG. 43;

FIGS. 49 to 51 are embodiments to which the present invention is applied, where

FIG. 49 represents action information for obtaining information about an aggregated media server;

FIG. 50 represents a state variable used for the action information of FIG. 49; and FIG. 51 represents information of XML type as an example of the state variable of FIG. 50;

MODE FOR INVENTION

Figure 1:
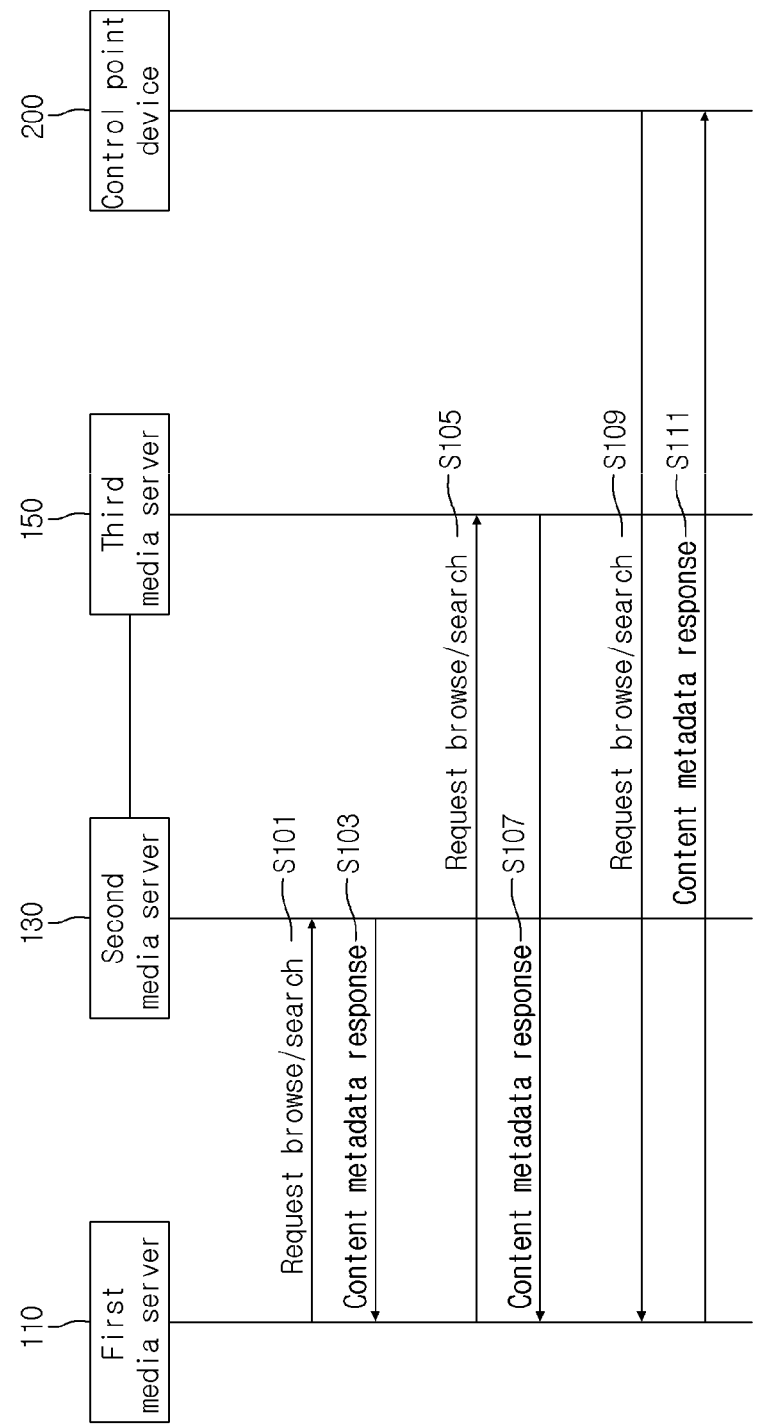
FIG. 1 is a flow diagram illustrating an operation of aggregating content information of a media server according to an embodiment of the present invention.

Universal plug and play (hereinafter, it is called UPnP) technology and digital living network alliance (hereinafter, it is called DLNA) technology permit services and control among home appliances from different manufactures. In particular, UPnP technology permits AV services and control compatible among audio-visual (AV) devices. Compatible AV services include media streaming, uploading, and downloading.

A network based on UPnP intended for home networking logically comprises a plurality of UPnP devices, services, and control points (CPs). In a UPnP network, a service refers to the smallest control unit on the network and is modeled through state variables.

In a UPnP network, a control point (CP) refers to a control application equipped with a function of detecting and controlling other devices and/or services and is operated in an arbitrary device, for example, in a physical device such as a PDA that a user can easily operate.

An AV home network based on UPnP comprises a media server (MS) providing media data to a home network, a media renderer (MR) playing media data through the home network, and an AV control point (CP) controlling the media server and the media renderer. The media server and the media renderer is a device controlled by the control point.

The media server (to be precise, a content directory service (CDS)) constructs media files stored therein and information of containers (corresponding to directories) beforehand in the form of object information. An 'object' is a term used to indicate collectively one or more media files, for example, an item having information about a still picture, a moving picture, or an audio file; and a container having information about a directory. Depending on situations, the term of object can be appropriately used to indicate an 'item' or a 'container'.

One item corresponds to one or more media files. For example, a plurality of media files having the same content but with different bit rates can be managed as a single item.

Object information is also called 'metadata', and metadata carry various kinds of information related to content. For example, carried by the meta data are an ID assigned to an object corresponding to content, identification information about a container to which the object belongs, a title, information about whether the object is an item or a container, media type, protocol through which related content (for example, a media file) can be obtained, access position information, and so on. Such metadata are written in the form of a mark-up language and are stored in a storage managed by the CDS independently of a storage which stores associated media files. The content-related metadata composed as above are provided according to an action called by the control point, and the whole or part of the metadata can be provided to the media renderer through the control point.

In the present invention, UPnP divides such devices into control point (CP) devices and control target devices. A digital media controller (DMC) and a digital media player (DMP) can be classified into a control point device, whereas a digital media renderer (DMR), a digital media server (DMS), and a digital media printer (DMPr) can be classified into a control target device.

Also, if a control point (CP) device based on UPnP or a digital media player (DMP) and a digital media controller (DMC) based on DLNA request content metadata from a UPnP based control target device or a DLNA based digital media server (DMS), the control target device or the digital media server (DMS) aggregates a plurality of content metadata corresponding to each of the stored content and transmits (a generated content list) to a control point (CP) device, a digital media player (CMP), or a digital media controller (DMC).

Meanwhile, DLNA specifies home network devices to include a digital media server (DMS), a digital media player (DMP), a digital media renderer (DMR), a digital media controller (DMC), and a digital media printer (DMPr); and specifies mobile handheld devices to include a mobile digital media server (M-DMS), a mobile digital media player (M-DMP), a mobile digital media uploader (M-DMU), a mobile digital media downloader (M-DMD), and a mobile digital media controller (M-DMC). In what follows, scope of the digital media server (DMS) is extended to include the M-DMS; the digital media player (DMP) to include the M-DMP; and the digital media controller (DMC) to include the M-DMC.

Also, DLNA can be described by a 2 box model and a 3 box model. The 2 box model includes the DMP and the DMS. In the 2 box model, the DMP enables the user to search for and play the content browsed and distributed by the DMS. The 3 box model includes the DMC, DMS, and DMR. In the 3 box model, the DMC enables the user to search for the content of the DMS to be played in the DMR.

In what follows, with reference to FIG. 1, a content information aggregation protocol according to one embodiment of the present invention will be described.

FIG. 1 is a flow diagram illustrating an operation of aggregating content information of a media server according to an embodiment of the present invention. In what follows, a media server also denotes a digital media server. Similarly, content is regarded to have the same meaning as media content such as AV data. Content information is used to include content metadata or content object. A content object may denote a set of content metadata. A content object can include an item object in a single file format and a container object in the form of a folder which contains multiple files.

With reference to FIG. 1, a first media server 110 can receive content metadata transmitted from each of a plurality of media server 130, 150. A media server provides a content directory service (CDS) so that the user can browse content stored in the media server and obtain detailed information about individual content.

The first media server 110 can receive content metadata respectively from a second media server 130 and a third media server 150 by using a browse/search action of the content directory service. For example, if the first media server 110 requests the browse/search action from the second media server 130 S101, the second media server 130 can transmit content metadata of the respective content stored in the second media server 130 to the first media server 110 in response to the request by using the content directory service S103. In the same manner, by also requesting the browse/search action from the third media server 150 S105, the first media server 110 can receive content metadata of the respective content stored in the first media server 150 as a response from the third media server 150 S107. Subsequently, the first media server 110 can aggregate all the content information within a home network intended to provide a unified user experience. The aggregation function of the first media server 110 can be turned on or off. The first media server 110 can provide useful information about aggregation through content metadata and an additional useful control mechanism. The additional useful control mechanism can provide a more enhanced user experience by providing a couple of actions.

At this time, a set of content metadata, namely, a content object which first belongs to the second media server 130 and the third media server 150 and is aggregated by an aggregate media server (AMS) such as the first media server 110 can be defined as an aggregated object. The aggregate media server (AMS) can aggregate aggregated objects and recreate an aggregate object corresponding to the aggregated objects. In other words, an aggregate object can be defined as an object which is recreated by the aggregate media server (AMS) based on the content metadata aggregated from the aggregated CDS such as the second media server 130 and the third media server 150 which are an aggregated media server (ADMS).

According to an embodiment of the present invention, the first media server 110 is a virtual server, a kind of media server, and is capable of gathering all of the content metadata physically or logically by using a content directory service. At this time, the virtual server can gather content metadata stored in any device. Therefore, the virtual server can gather content metadata from a plurality of native servers. A native server may denote a server in the original meaning, which stores or provides content and content related information like the aforementioned second media server 130 and the third media server 150. On the other hand, the virtual server can carry out a function such as a control point device which requests and receives content or content related information.

Meanwhile, in the case of a virtual server aggregating content from a plurality of native servers, it must have a unique name on a network to represent a function of an aggregating virtual server which carries out content transformation. Also, in case the last native device virtualizes issuing ssdp:byebye or cache-control intervals of all of the native servers are terminated without receiving an advertisement set, the aggregating virtual server has to issue its own ssdp:byebye message within a predetermined time period, for example, 5 seconds. The simple service discovery protocol (SSDP) refers to a protocol intended for searching for a device connected to a network and an available service.

A virtual server which does not carry out a function of aggregating content from a plurality of native servers has to provide all of the actions that a basic native server provides. Also, a virtual server which does not carry out an aggregation function has to make possible all of the events of a native server. On the other hand, a virtual server which aggregates content from a plurality of native servers can restrict an action or an event that the virtual server itself provides.

If a virtual server is aggregating content metadata from a plurality of native servers and one of the native servers leaves the network, a query issued after the native server leaves the network, for example, after 1 second, must not show within the hierarchy content metadata of the content stored in the native server which has left the network.

According to an embodiment of the present invention, an aggregating virtual server should be able to aggregate content metadata from all of the native servers on a current network when content is aggregated from a plurality of native servers; also, the aggregating virtual server has to specify a "k" flag within <dlna:X_DLNAVIRT>XML element of a device description of the aggregating virtual server.

Subsequently, in case a plurality of media servers are present, a control point device 200 which receives a user input including a request for searching for content metadata of media content requests a browse/search action from the first media server 110 which carries out a function of a virtual server S109 and receives the content metadata stored in the first media server 110 S111. The content metadata stored in the first media server 110 can include all of the content metadata aggregated from a plurality of media server 130, 150 within a home network. Therefore, the control point device 200 can receive all of the content metadata included in the whole of the plurality of media servers by requesting a browse/search action from one media server only for once. This scheme is effective for the case when the user attempts to find particular content but which media server among a plurality of media servers on a home network has the particular content is unknown.

In what follows, with reference to FIGS. 2 to 4, a content information aggregation protocol according to another embodiment of the present invention will be described.

Figure 2:
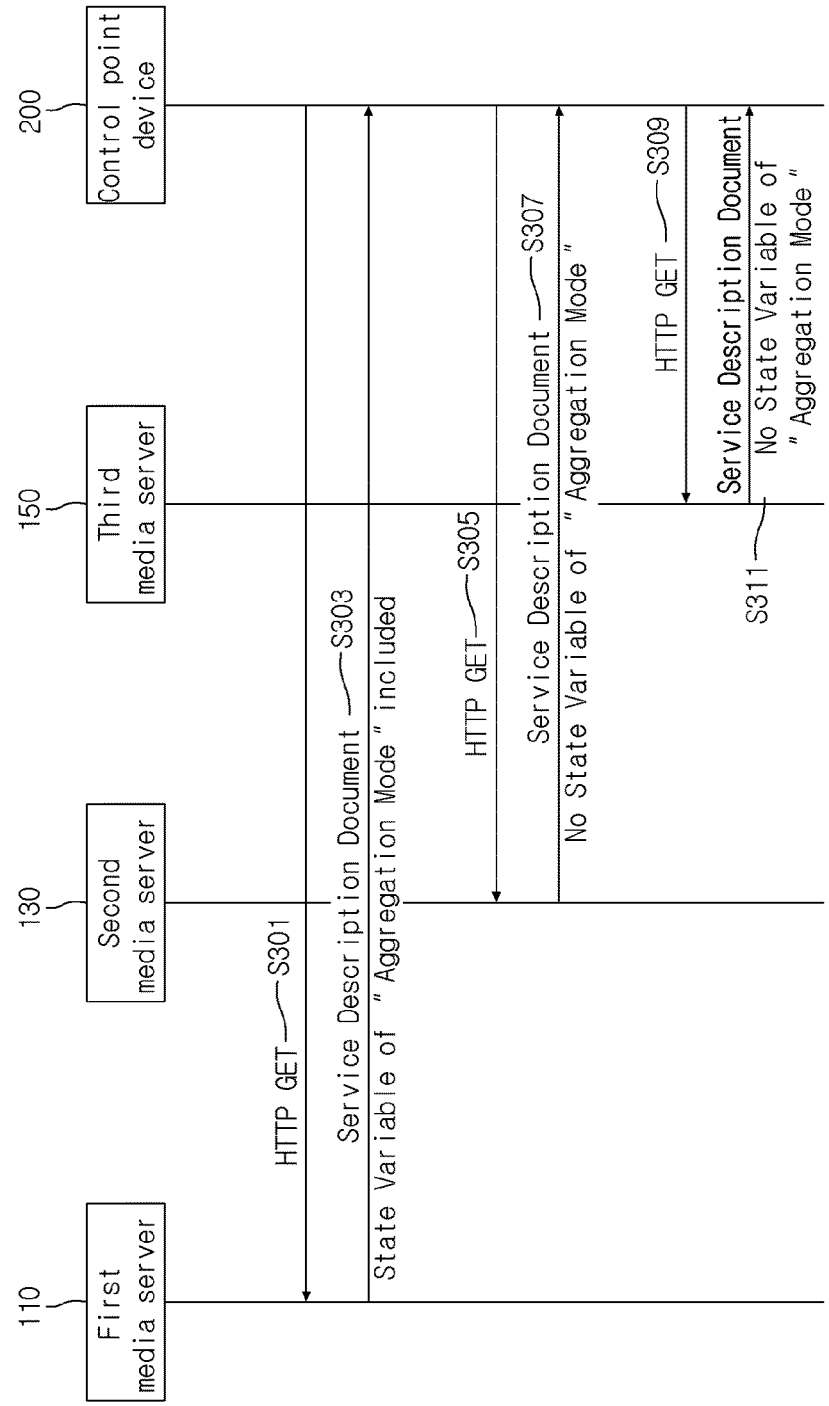
FIG. 2 is a flow diagram illustrating a method for distinguishing a media server supporting a content information aggregation function according to an embodiment of the present invention.

FIG. 2 is a flow diagram illustrating a method for distinguishing a media server supporting a content information aggregation function according to an embodiment of the present invention.

With reference to FIG. 2, a control point device 200 can receive a service description document from each of a plurality of media servers. By using a received service description, the control point device 200 can check whether the corresponding media server supports a content information aggregation function.

A media server can provide an aggregation CDS. An aggregation CDS can provide a single point device to access all of the content within a home network. A physical content directory service structure or a virtual structure of an aggregation content directory service can provide at least one control point module. A control point module can be defined as a module which can configure metadata properties related to aggregation characteristics and operate actions related to the aggregation characteristics. For example, a control point module can carry out the function which is the same as provided by a control point device which requests and receives content and content-related information stored in other media servers within the virtual server described above. In other words, a media server capable of providing an aggregation CDS can include a control point module which can aggregate content and content-related information of other media servers.

A service description can include information about a service that a media server provides. A control point device 200 can transmit a HTTP GET request to a media server and receive a service description of the corresponding media server written in XML in response to the request. In this way, a process described with respect to FIG. 2 can be carried out in the step where the control point device 200 searches for an UPnP device or a DLNS device belonging to a home network.

According to whether an aggregation mode state variable is included in a received service description, the control point device 200 can determine whether the corresponding media server can support a content information aggregation function. Depending on availability of a content information aggregation function, media servers can be divided into those supporting a content information aggregation function and those not. Also, a media server supporting a content information aggregation function can be classified to an aggregation capable media server (ACMS) and an aggregation media server (AMS). An ACMS refers to the server which is capable of carrying out a content information aggregation function but is not currently carrying out the content information aggregation function. In what follows, a legacy media server (LMS) is used as a term providing the same meaning as the media server which does not provide a content information aggregation function. Also, similarly to the aggregation media server (AMS) which is a kind of a media server currently carrying out a content information aggregation function, a media server, content information of which is aggregated by a current aggregation media server (AMS) can be defined as an aggregated media server (ADMS).

Even if a media server supporting the content information aggregation function is present within a network, the control point device 200 is unable to distinguish a media server which supports the content information aggregation function from a media server which does not. Therefore, the control point device 200 can request a service description from each of a plurality of media servers and identify a media server which supports the content information aggregation function by receiving the service description which includes an aggregation mode state variable.

A media server supporting a content information aggregation function can show that it is a kind of a media server which supports the content information aggregation server by transmitting a newly defined state variable together with the aggregation mode state variable to the control point device 200. As shown in FIG. 2, if the control point device 200 requests a HTTP GET from the first media server 100 S301, the first media server 110 transmits a service description document which includes an aggregation mode state variable to the control point device 200 in response to the request S303. The control point device 200 can know from the aggregation mode state variable included in the service description document that the first media server 110 is a media server which supports a content information aggregation function.

On the other hand, a media server which does not support a content information aggregation function can transmit to the control point device 200 a service description which does not include an aggregation mode state variable. As shown in FIG. 2, if the control point device 200 requests a HTTP GET from the second media server 130 or the third media server 150 S305, S309, the second media server 130 or the third media server 150 transmits to the control point device 200 a service description document which does not include an aggregation mode state variable in response to the request S307, S311. The control point device 200, checking that the service description document does not include an aggregation mode state variable, can know that the second media server 130 or the third media server 150 is a kind of a media server which does not support the content information aggregation function.

Properties of an aggregation mode state variable can include a state variable name, event, data type, and a default value, but are not limited to the items listed above. A state variable name can be an aggregation mode. An event can be triggered, and the aggregation media server (AMS) can notify the control point device or other aggregation capable media server (ACMS) through an event including the aggregation mode state variable that it is currently carrying out the content information aggregation function. An event may be blocked, and in this case, the control point device 200 can only know whether an aggregation function of the corresponding aggregation media server (AMS) is being carried out by applying an action for obtaining an aggregation mode to the aggregation media server (AMS). The data type can be a Boolean type; in case a data value is '0', it indicates that the aggregation function of the corresponding media server has been turned off and that the corresponding media server is an aggregation capable media server (ACMS) rather than the aggregation media server (AMS). In case the data value is '1', it indicates that the aggregation function of the corresponding media server at that moment has been turned on and that the corresponding media server is an aggregation media server (AMS). A default value can be determined by a policy; for example, if the default value is set to '0' and the media server is set to an aggregation capable media server (ACMS) by default, unnecessary network traffic caused from one or more aggregation media servers (AMSs) can be avoided.

In what follows, described will be a method for setting only one media server as an aggregation media server from among a plurality of aggregation media servers in case a plurality of aggregation media server carries out a content information aggregation function on a network.

Figure 3:
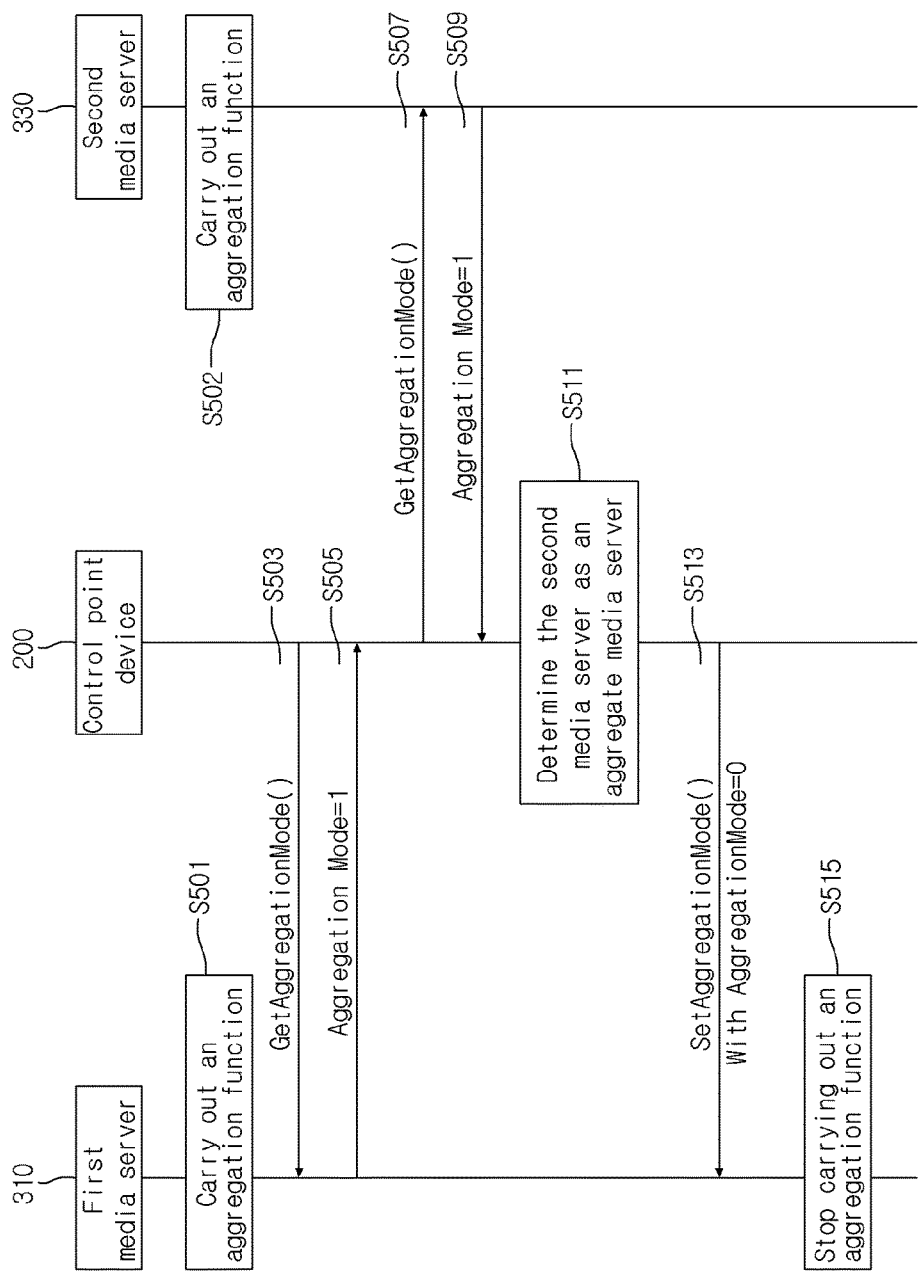
FIG. 3 is a flow diagram illustrating a method for configuring an aggregate media server executing a content information aggregation protocol according to another embodiment of the present invention.

FIG. 3 is a flow diagram illustrating a method for configuring an aggregate media server executing a content information aggregation protocol according to another embodiment of the present invention.

With reference to FIG. 3, a first media server 310 and a second media server 330 carry out the respective aggregation functions in one network S501, S502. The first media server 310 and the second media server 330 are media servers supporting a content information aggregation function respectively, for example, aggregation mode state variables of them all correspond to '1' and the corresponding content information aggregation functions are turned on. In other words, the first media server 310 and the second media server 330 all correspond to an aggregation media server (AMS).

The control point device 200 transmits an aggregation mode get action (GetAggregationMode) to the first media server 310 S503. The aggregation mode get action (GetAggregationMode) can be a command requesting an aggregation mode state variable to identify an aggregation media server among media servers supporting a plurality of content information aggregation functions.

The control point device 200 can check whether a media server supports a content information aggregation function according to the user input received through an internal or external user interface. For example, if the control point device 200 receives a user input selecting the first media server 310 or the second media server 330 through a user interface, the control point device 200 transmits an aggregation mode get action (GetAggregationMode) to a selected media server. The control point device 200 can check whether the media server selected according to the user input supports a content information aggregation function by receiving a response signal corresponding to the aggregation mode get action (GetAggregationMode).

Properties of the GetAggregationMode can include an action name, arguments, and related state variables, but are not limited to the items listed above. The action name can be the GetAggregationMode. Arguments are variables corresponding to a command, which can be an aggregation mode state variable (AggregationMode) corresponding to the GetAggregationMode. The transmission direction of an aggregation mode state variable can be defined as OUT, and an entity receiving the aggregation mode get action, for example, the first media server 310 can transmit the aggregation mode state variable. The related state variable can correspond to an aggregation mode state variable (AggregationMode). In case a retrieved value of the related state variable is '0', it indicates that the corresponding media server is an aggregation capable media server (ACMS) rather than an aggregate media server (AMS). On the other hand, if a retrieved value of the related state variable is '1', it indicates that the corresponding media server is an aggregation media server (AMS).

The control point device 200 receives information including an aggregation mode state variable transmitted from the first media server 310 in response to the aggregation mode get action S505. If the first media server 310 transmits an aggregation mode state variable, the data value of which is '1', the control point device 200 can know that the first media server 310 is an aggregation media server (AMS). Meanwhile, without transmitting an aggregation mode get action to a media server, the control point device 200 can know through an event message transmitted from the media server that the corresponding media server is an aggregate media server, which is not limited to the case above. For example, by receiving from the first media server 310 an event message including an aggregation mode state variable, the data value of which is '1', the control point device 200 can also figure out that the first media server 310 is an aggregate media server (AMS).

Also, the first media server 310, in response to a device description request transmitted from the control point device 200, can transmit a device description to the control point device 200. At this time, the device description can include a friendly name changed together with the aggregation mode state variable. For example, if the control point device 200 is connected to multiple servers, it can provide the user with a media server friendly name list including friendly names of the connected multiple servers by displaying the list on a display unit. Next, if the control point device 200 receives a changed friendly name transmitted from the first media server 310, the control point device 200 can display the changed friendly name of the first media server 310 on the display unit. The user can identify a media server which carries out an aggregation mode through the media server friendly name list displayed on the display unit of the control point device 200. Since a friendly name can represent the aggregation mode state of the corresponding media server like "all your content aggregated", it can be differentiated from an ID such as a manufacturer name or a model name of the corresponding media server, through which determining the state of the corresponding media server is difficult for the user. In this manner, the aggregate media server (AMS) can notify the control point device 200 of availability of the aggregation function by changing the friendly name which represents an operation aggregating content metadata within the corresponding network.

As described above, the control point device 200 also transmits the aggregation mode get action (GetAggregationMode) separately to the second media server 330, S507. If the second media server 330 transmits information including an aggregation mode state variable the data value of which is '1' in response to the control point device's transmission S509, the control point device 200 can know that the second media server 330 is an aggregate media server.

Next, the control point device 200 sets up the second media server 330 as an aggregate media server (AMS) S511. In other words, the control point device 200 can set up only the second media server 330 as an aggregate media server (AMS) and set up the first media server 310 as an aggregation capable media server (ACMS) but no longer an aggregate media server AMS. In this case, the first media server 310 may become an aggregated media server (ADMS) as a target device of an aggregation function of the second media server 330, which is not limited to the case above. The control point device 200 can know from the aggregation mode state variable transmitted from the first media server 310 and the second media server 330 that a plurality of media servers are currently carrying out aggregation of content information. It should be noted, however, that in case two aggregate media servers are not required for one network, it is sufficient that only one of the two media servers carries out the aggregation function. The control point device 200 can check whether the media server supports and carries out the aggregation function and control the media server. According to the control point device's 200 control, a target media server may or may not carry out the aggregation function.

Also, the control point device 200 may receive a user input which configures or changes the aggregation mode state of the media server through a user interface. According to an embodiment of the present invention, the control point device 200 can receive a user input through the user interface, which selects one from among a plurality of media servers capable of carrying out an aggregation function as the server which carries out the aggregation function. For example, the control point device 200 can receive through the user interface a user input which sets the aggregation mode state of the second media server 330 to ON (an active state) or a user input which changes the aggregation mode state of the first media server 310 to OFF (an inactive state).

Next, the control point device 200 transmits to the first media server 310 an aggregation mode set action (SetAggregationMode) which includes an aggregation mode state variable of which the data value is '0' S513. The control point device 200 can stop the first media server 310 carrying out an aggregation function so that only the second media server 330 is allowed to carry out the content information aggregation function. The control point device 200 can control the aggregation function of the first media server 310 by using the aggregation mode set action. The aggregation mode set action can correspond to a control command which controls the aggregation function of a media server which supports a content information aggregation function to be activated or deactivated.

Properties of the aggregation mode set action (SetAggregationMode) can include an action name, arguments, and related state variables, but are not limited to the items listed above. The action name can be the SetAggregationMode. Arguments are variables corresponding to a command, which can be an aggregation mode state variable (AggregationMode) corresponding to the SetAggregationMode. The transmission direction of an aggregation mode state variable can be defined as IN, and an entity receiving the aggregation mode set action, for example, the first media server 310 can also receive the aggregation mode state variable. At this time, error codes can include 741 which is a useless parameter. Error codes can indicate that the aggregation mode argument has the same value as a current value of the aggregation state variable. The related state variable can be an aggregation mode state variable (AggregationMode). In case a retrieved value of the related state variable is '0', it indicates that the aggregation mode of the corresponding media server is deactivated. On the other hand, if the retrieved value of the related state variable is '1', it indicates that the aggregation mode of the corresponding media server is activated.

The first media server 310 which has received an aggregation mode set action including the aggregation mode state variable of which the data value is '0' stops carrying out the aggregation function S515. Therefore, due to the control of the control point device 200, only the second media server 330 can carry out the content information aggregation function as an aggregate media server (AMS) on the network.

Figure 4:
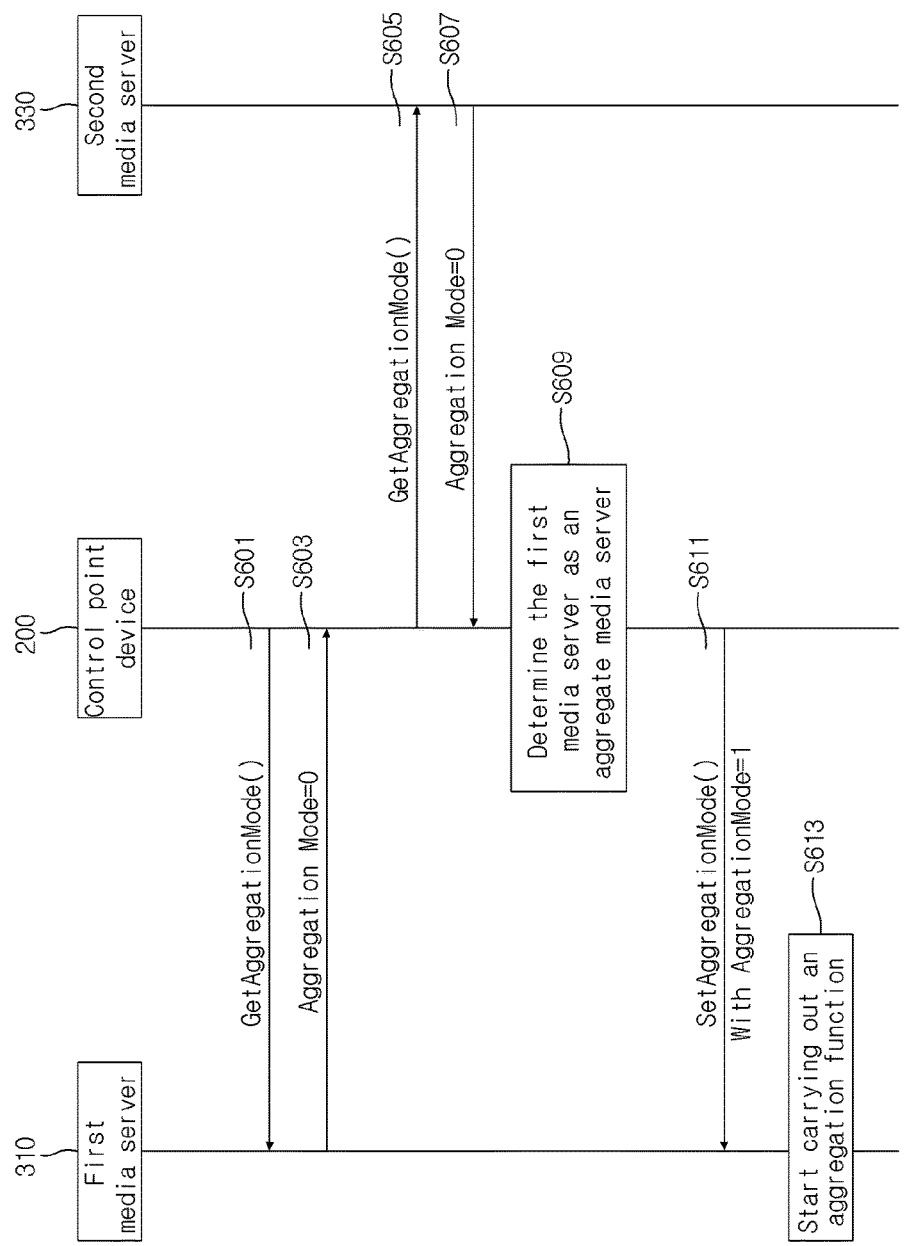
FIG. 4 is a flow diagram illustrating a method for configuring an aggregate media server executing content information aggregation protocol according to a yet another embodiment of the present invention.

FIG. 4 is a flow diagram illustrating a method for configuring an aggregate media server executing content information aggregation protocol according to a yet another embodiment of the present invention. In what follows, descriptions about the same part of FIG. 3 will be omitted.

If the control point device 200 transmits an aggregation mode get action (GetAggregationMode) to a first media server 310 S601, information including an aggregation mode state variable transmitted from the first media server 310 is received in response to the aggregation mode get action S603. If the first media server 310 transmits an aggregation mode state variable of which the data type is '0', the control point device 200 can know that the first media server 310 is not carrying out the function of an aggregate media server (AMS). On the other hand, without transmitting the aggregation mode get action to the media server, the control point device 200 can know whether the corresponding media server is carrying out the aggregation function through a transmitted event message, which is not limited to the case above. For example, by receiving an event message including an aggregation mode state variable of which the data type is '0' from the first media server 310, the control point device 200 can know that the first media server 310 is not carrying out the function of the aggregate media server (AMS).

The control point device 200 also transmits the aggregation mode get action (GetAggregationMode) separately to a second media server 330. If the second media server 330 transmits information including an aggregate mode state variable of which the data type is '0' S607, the control point device 200 can know that the second media server 330 is not carrying out the function of the aggregate media server (AMS). Next, the control point device 200 sets up the first media server 310 as an aggregate media server (AMS) S609.

The control point device 200 transmits an aggregate mode set action (SetAggregationMode) including the aggregation mode state variable of which the data type is '1' to the first media server 310 which has been set as an aggregate media server (AMS) S611.

The first media server 310 which has received the aggregation mode set action including the aggregation mode state variable of which the data type is '1' starts carrying out an aggregation function S613. Therefore, due to the control of the control point device 200, only the first media server 310 can carry out the content information aggregation function as an aggregate media server (AMS) on the network.

In what follows, a structure of a device constituting a 2 box model and a 3 box model of DLNA according to an embodiment of the present invention will be described with reference to FIGS. 5 and 6.

Figure 5:
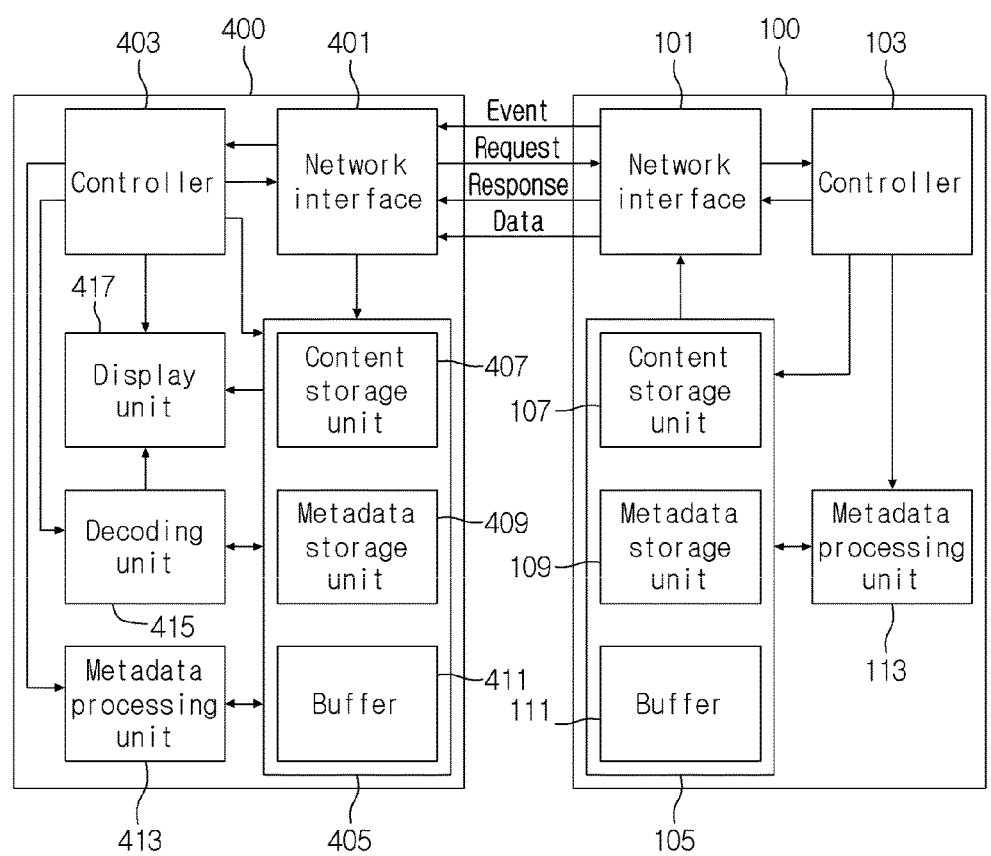
FIG. 5 is a block diagram of devices constituting a 2 box model according to an embodiment of the present invention.

FIG. 5 is a block diagram of devices constituting a 2 box model according to an embodiment of the present invention.

With reference to FIG. 5, a 2 box model based on DLNA includes a media server 100 and a media player 400. The media server 100 can transmit an event message to a media player 400. Or the media server 100 may transmit a response in response to a request transmitted from the media player 400. The media server 100 can transmit the data stored in the memory 105 thereof to the media player 400. The media player 400 can process and play the data transmitted from the media server 100.

The media server 100 includes a network interface 101, a controller 103, and a metadata processing unit 113.

The network interface 101 of the media server 100 can receive a message including a command, a request, and an action transmitted from the media player 400. Also, the network interface 101 can transmit an event message, data, and so on to the media player 400. The network interface 101 can be a physical element of the media server 100.

The controller 103 controls operation of each element belonging to the media server 100 based on a user input or software. The controller 103 can be a logical element of the media server 100. For example, the controller 103 can control according to a request received through the network interface so that content metadata stored in the memory 105 is extracted and transmitted to the outside through the network interface 101.

The memory 105 stores various types of information. The memory 105 can be a physical element of the media server 100. The memory 105 can include a content storage unit 107, a metadata storage unit 109, and a buffer 111. The content storage unit 107 can store media content data. The metadata storage unit 109 can store metadata which is information related to content. The metadata storage unit 109 may store the metadata after classifying them. The buffer 111 can store various types of data temporarily. Also, the memory 105 can store state information of the media server 100. The state information can include information about the hardware-specific state of the media server 100 or information about the software-specific state thereof. For example, the state information can include information about a storage size of the media server 100, memory, CPU performance, XML parsing capability, content modifying capability, connection and transmission protocol, the number of stored contents, device type, aggregation mode state, negotiation mode state, and so on.

The metadata processing unit 113 extracts and separates metadata of media content stored in the content storage unit 107. The metadata that the metadata processing unit 113 extracts and separates can be stored in the metadata storage unit 109.

Since the media server 100 can store not only content but also metadata related thereto, the media server 100 can provide information about the stored content, a content streaming service, and a content upload/download service.

The media player 400 comprises a network interface 401, a controller 403, a memory 405, a metadata processing unit 413, a decoding unit 415, and a display unit 417; and can carry out both of the functions of the media controller and the media renderer described above. In what follows, descriptions the same as described above will be omitted.

The network interface 401 can transmit to the media server 100 a message including a command, a request, and an action. Also, the network interface 401 can receive an event message, data, and so on from the media server 100.

The controller 103 controls operation of each element belonging to the media server 100 based on a user input or software. For example, the controller 403 can control the operation so that content received through the network interface 401 is stored in the memory 405, the stored content is processed in the decoding unit 415, and the processed content is displayed in the display unit 417.

The memory 405 comprises a content storage unit 407, a metadata storage unit 409, and a buffer 411. The content storage unit 407 can store the media content transmitted from the media server 100. The metadata storage unit 409 can store metadata transmitted from the media server 100.

The metadata processing unit 413 classifies data type of the metadata transmitted from the media server 100 into a predetermined category so that the controller 403 can visualize or control the metadata.

The decoding unit 415 can decode encoded media content so that the encoded media content can be displayed on the display unit 417.

The display unit 417 visualizes various types of data such as a user interface or media data. The user can enter the user input through a user interface displayed on the display unit 417 or can use media data in such a way that the media data are displayed on the display unit 417.

Figure 6:
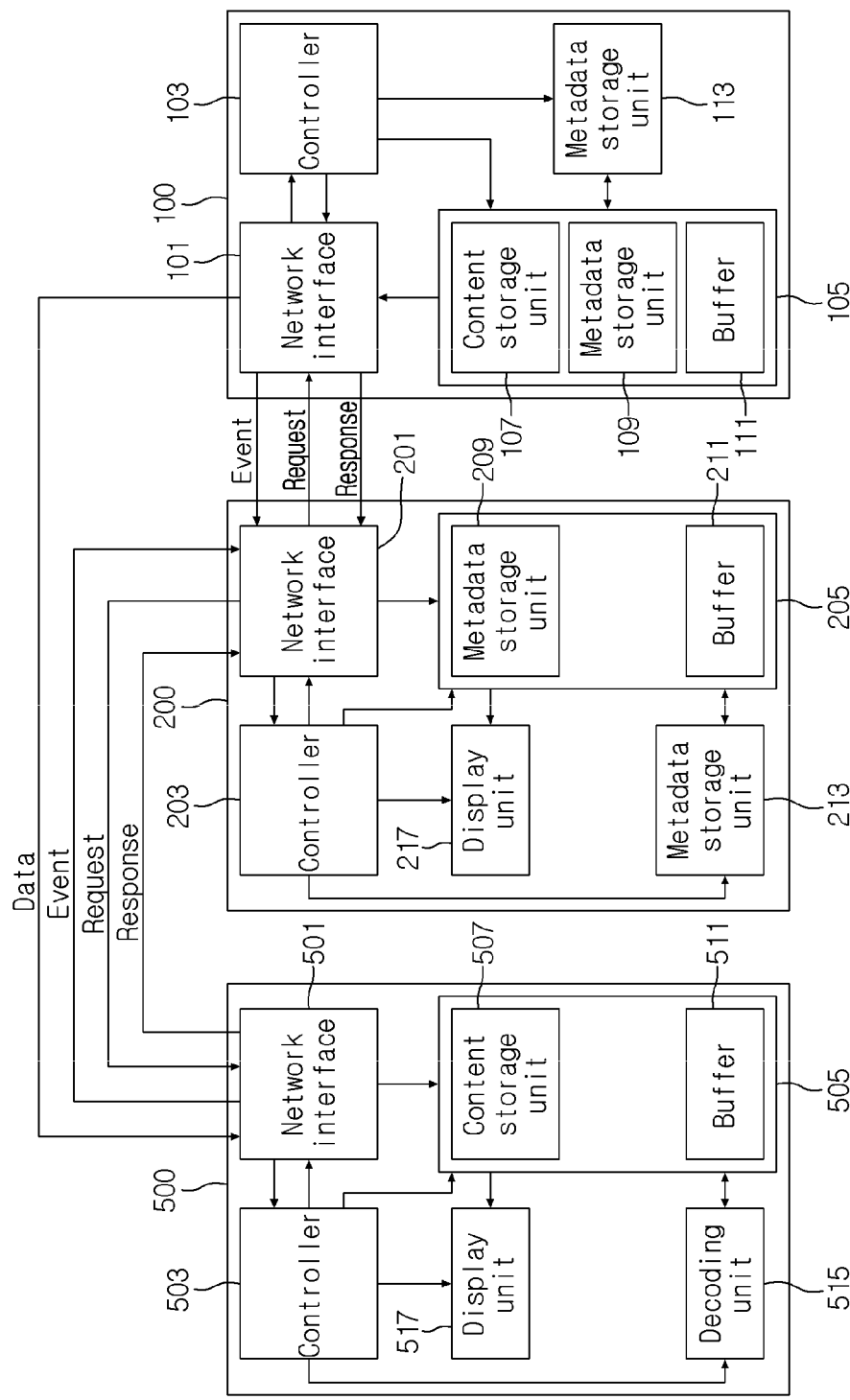
FIG. 6 is a block diagram of devices constituting a 3 box model according to an embodiment of the present invention.

FIG. 6 is a block diagram of devices constituting a 3 box model according to an embodiment of the present invention. In what follows, descriptions about the same structure of the 2 box model will be omitted.

A 3 box model based on DLNA comprises a media server 100, a media controller 200, and a media renderer 500. The media server 100 can transmit an event message or a response according to the request transmitted from the media controller 200 to the media controller 200. The media controller 200 can also transmit the event message or the response according to the request transmitted from the media controller 200 to the media renderer 500. The media server 100 can transmit data to the media renderer 500 according to a request transmitted from the media controller 200. The media renderer 500 can display data transmitted from the media server 100 to the display unit 517. In the 3 box model, the media controller 200 can store and process content metadata transmitted from the media server 100, and the media renderer 500 can store, process, and display content transmitted from the media server.

In what follows, a method for a negotiator to configure an aggregate media server according to an embodiment of the present invention will be described with reference to FIG. 7.

Figure 7:
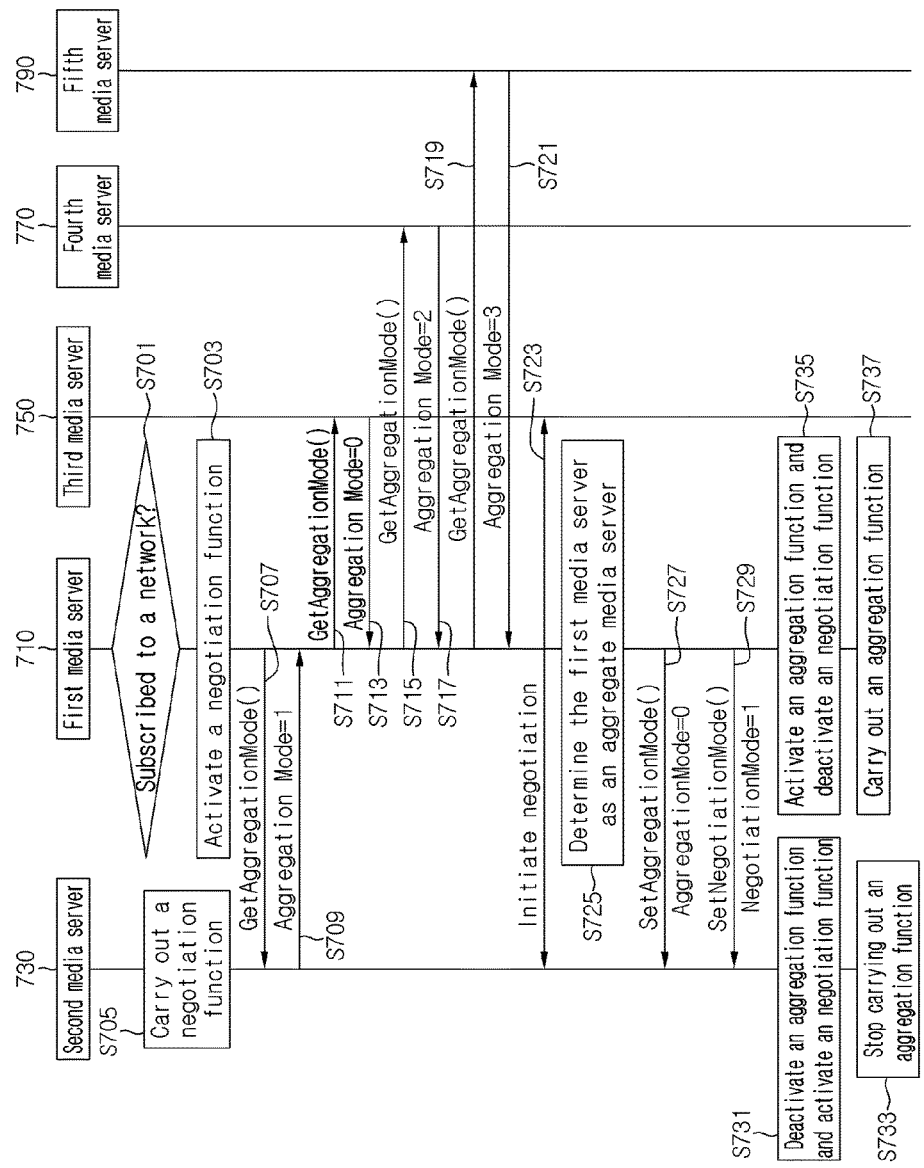
FIG. 7 is a flow diagram illustrating a method for a negotiator to configure an aggregate media server according to an embodiment of the present invention.

FIG. 7 is a flow diagram illustrating a method for a negotiator to configure an aggregate media server according to an embodiment of the present invention.

With reference to FIG. 7, a first media server 710 can set up at least one of a plurality of aggregation capable media servers belonging to the same network, for example, a second media server to a fifth media server 730, 750, 770, 790 as an aggregate media server.

In case a plurality of aggregation capable media servers are connected to one network, it is necessary for an aggregation capable media server to automatically control activation of the aggregation function of other aggregation capable media servers even if a control point device controlled by a user input does not transmit a request signal.

It should be noted, however, that since control of an aggregation capable media server by another aggregation capable media server can be carried out contrary to the user's intent, it is necessary to indicate whether the aggregation function of the aggregation capable media server can be controlled by another aggregation capable media server and to set up so that the aggregation function of the aggregation capable media server can be controlled by another aggregation capable media server.

A negotiation procedure can be an automatic procedure which sets up at least one of a plurality of aggregation capable media servers as an aggregate media server carrying out an aggregation function. For example, an aggregation capable media server can initiate such a negotiation procedure.

A negotiator can refer to an aggregation capable media server which initiates a negotiation procedure. For example, an aggregation capable media server newly joining a network can function as a negotiator automatically. Similarly, in case the surroundings of the negotiator are changed—for example, in case the negotiator becomes an aggregate media server or connection to the corresponding network is lost, the negotiator may set up another aggregate capable media server as a negotiator beforehand. In case connection to a network is lost, the negotiator may notify beforehand the aggregate media server of the disconnection from the network.

In case there is no negotiator in a network, an aggregate media server may take the responsibility to set up one of aggregation capable media servers within the corresponding network to take the role of a negotiator.

As shown in FIG. 7, if the first media server 710 newly joins a network including the second media server to the fifth media server 730, 750, 770, 790, S701, the first media server 710 can become a negotiator. The first media server 710, now a negotiator, can activate a negotiation function S703 and before initiating a negotiation procedure for setting up one of the first media server to the fifth media server 710, 730, 750, 770, 790, which are aggregation capable media servers, as an aggregate media server, aggregate information about aggregation mode of each of the plurality of media servers.

The first media server 710 transmits S707, S711, S715, S719 an aggregation mode get action (GetAggregationMode) to the second media server to the fifth media server 730, 750, 770, 790. The second media server to the fifth media server 730, 750, 770, 790 which have received the aggregation mode get action can transmit to the first media server 710 a state variable having a specific value. A response transmitted in response to the aggregation mode get action can include at least one of a controllable aggregation mode (ControllableAggregationMode) state variable and an aggregation mode (AggregationMode) state variable.

Properties of a controllable aggregation mode state variable can include a state variable name, an event, a data type, an allowed value, and a default value, but are not limited to the items listed above. The state variable name can be a controllable aggregation mode (ControllableAggregationMode). An event may or may not be triggered. The data type may be a Boolean type or a string type. In case the data type is Boolean, an allowed value can take '0' or '1'. The allowed value of '0' can indicate that the corresponding aggregation capable media server cannot be controlled by another aggregation capable media server, whereas the allowed value of '1' can indicate that the corresponding aggregation capable media server can be controlled by another aggregation capable media server. In case the data type is a string type, the allowed value can be 'not controllable by an ACMS (Not_Controllable_by_ACMS)' or 'controllable by an ACMS (Controllable_by_ACMS)'. The default value can be determined by a policy. For example, it can be recommended that a media server is set to be controllable by another aggregation capable media server by default by assigning the default value to '1', which is not limited to the above.

Properties of an aggregation mode state variable can include a state variable name, an event, a data type, an allowed value, and a default value, but are not limited to the items listed above. The aggregation mode state variable described below is based on the same concept as the aggregation mode state variable described earlier, but the data type can have a more extended concept. In what follows, descriptions about the part the same as the aggregation mode state variable described above will be omitted, but only the difference from previous descriptions will be provided.

Any data type is allowed as the data type of an aggregation mode state variable once it can specify four different states. For example, the data type can be 'ui1' or 'ui4'. Also, a string type can be employed. In the case of an integer type such as the data type of 'ui1' or 'ui4', the allowed value of '0' can indicate that a content information aggregation function can be carried out but is not being carried out at the moment and another aggregation capable media server can control the corresponding aggregation capable media server. An allowed value of '1' can indicate that the content information aggregation function is being carried out at the moment and the corresponding aggregation capable media server can be controlled by another aggregation capable media server. An allowed value of '2' can indicate that the content information aggregation function can be carried out but the content information aggregation function is not being carried out at the moment nor can the corresponding aggregation capable media server be controlled by another aggregation capable media server. An allowed value of '3' can indicate that the content information aggregation function is being carried out at the moment but the corresponding aggregation capable media server cannot be controlled by another aggregation capable media server. In case the data type is a string, the allowed value can correspond to an 'aggregation capable media server that can be controlled by an aggregation capable media server (Controllable_ACMS_by_ACMS)', an 'aggregate media server that can be controlled by an aggregation capable media server (Controllable_AMS_by_ACMS)', and 'aggregation capable media server that cannot be controlled by an aggregation capable media server (Not Controllable_ACMS_by_ACMS)', and an 'aggregate media server that cannot be controlled by an aggregation capable media server (Not_Controllable_AMS_by_ACMS)' The default value can be determined by a policy.

The first media server 710 transmits an aggregation mode get action (GetAggregationMode) to the second media server 730, S707. Since the second media server 730 is carrying out a content information aggregation function on the corresponding network at the moment S705, the second media server 730, in response to the aggregation mode get action, transmits to the first media server an aggregation mode state variable of which the allowed value is '1' S709. Based on the allowed value of the aggregation mode state variable transmitted from the second media server 730, the first media server 710 can know that the second media server 730 is carrying out the content information aggregation function at the moment and the second media server 730 can be controlled by another aggregation capable media server.

The first media server 710 transmits the aggregation mode get action (GetAggregationMode) to the third media server 750 S711. The third media server 750, in response to the aggregation mode get action, transmits to the first media server 710 the aggregation mode state variable of which the allowed value is '0' S713. Based on the allowed value of the aggregation mode state variable transmitted from the third media server 750, the first media server 710 can know that although the third media server 750 is capable of carrying out the content information aggregation function, the third media server 750 is not currently carrying out the content information aggregation function and the third media server 750 can be controlled by another aggregation capable media server.

The first media server 710 transmits an aggregation mode get action (GetAggregationMode) to the fourth media server 770, S715. The fourth media server 770, in response to the aggregation mode get action, transmits to the first media server 710 the aggregation mode state variable of which the allowed value is '2' S717. Based on the allowed value of the aggregation mode state variable transmitted from the fourth media server 770, the first media server 710 can know that the fourth media server 770 can carry out the content information aggregation function but is not currently carrying out the content information aggregation function and the fourth media sever 770 cannot be controlled by another aggregation capable media server.

The first media server 710 transmits an aggregation mode get action (GetAggregationMode) to the fifth media server 790, S719. In response to the aggregation mode get action, the fifth media server 790 transmits to the first media server 710 the aggregation mode state variable of which the allowed value is '3' S721. Based on the allowed value of the aggregation mode state variable transmitted from the fifth media server 790, the first media server 710 can know that the fifth media server 790 is currently carrying out the content information aggregation function but the fifth media server 790 cannot be controlled by another aggregation capable media server.

Next, between the second media server 730 and the fifth media server 790 which are aggregate media servers carrying out an aggregation function at the moment, the first media server 710 starts a negotiation procedure with the second media server 730 that can be controlled by another media server S723. Based on the information about the aggregation modes aggregated from each of a plurality of media server, the first media server 710 can start negotiation to set up at least one of the plurality of media servers as an aggregate media server. The negotiation procedure can be carried out among media servers that can be controlled by another media server and the negotiator.

Next, as a result of negotiation, if the first media server 710 is selected as an aggregate media server between the first 710 and the second media server 730, S725, the first media server 710 can activate the aggregation function of the first media server 710 while deactivating the aggregation function of the second media server 730. To deactivate the aggregation function of the second media server 730, the first media server 710 transmits to the second media server 730 an aggregation mode set action (SetAggregationMode) including the aggregation mode state variable of which the data type is '0' (AggregationMode=0) S727. Also, the first media server 710 deactivates the negotiation function while activating the aggregation function of the first media server 710, S735. Activation of the aggregation function and deactivation of the negotiation function of the first media server 710 can be carried out simultaneously, which is not limited to the case above. The S727 step and the S735 step can be carried out simultaneously, which is not limited to the case above.

Also, the first media server 710 transmits to the second media server 730 an negotiation mode set action (SetNegotiationMode) including the negotiation mode state variable (NegotiationMode) of which the allowed value is '1' S729. The first media server 710, as it becomes an aggregate media server, can hand over the role of a negotiator to the second media server 730.

Properties of the negotiation mode state variable can include a state variable name, an event, a data type, an allowed value, and a default value, but are not limited to the items above. The state variable name can be a negotiation mode (NegotiationMode). An event can be triggered and through an event including the negotiation mode state variable, an aggregate media server can know whether the corresponding network includes a negotiator. The data type may be a Boolean type or a string type. In case the data type is Boolean, the allowed value can be '0' or '1'. The allowed value of '0' can indicate that the corresponding media server does not correspond to a negotiator, and the allowed value of '1' can indicate that the corresponding media server is a negotiator. In case the data type is a string type, the allowed value can be a 'Negotiator' or a 'Not_a_Negotiator'. In case the default value is '1', an aggregation procedure can be started if the aggregation capable media server has subscribed to one network, which is not limited to the case above.

Properties of an negotiation mode set action can include an action name and arguments, but are not limited to the items above. An action name can be a SetNegotiationMode. An argument is a variable corresponding to a command and can include an argument name, an argument direction, and a related state variable, which is not limited to the list above. The argument name corresponding to a negotiation mode set action can be NegotiationMode, transmission direction can be defined as IN, and the first media server 710 transmitting the negotiation mode set action can be an entity which transmits the negotiation mode state variable. The related state variable can be a negotiation mode state variable (NegotiationMode).

Subsequently, the second media server 730 which has received an aggregation mode set action including an aggregation mode state variable of which the value is '0' and a negotiation mode set action including a negotiation mode state variable of which the value is '1' activates the negotiation function but deactivates the aggregation function S731. Deactivation of the aggregation function and activation of the negotiation function can be carried out at the same time, which is not limited to the case above. Therefore, the second media server 730 stops carrying out the aggregation function S733. In the case of absence of an aggregate media server where, for example, the first media server carrying out the aggregation function at the moment is disconnected from a network, the second media server 730 can newly initiate a negotiation procedure as a negotiator to set up a new aggregate media server.

Figure 8:
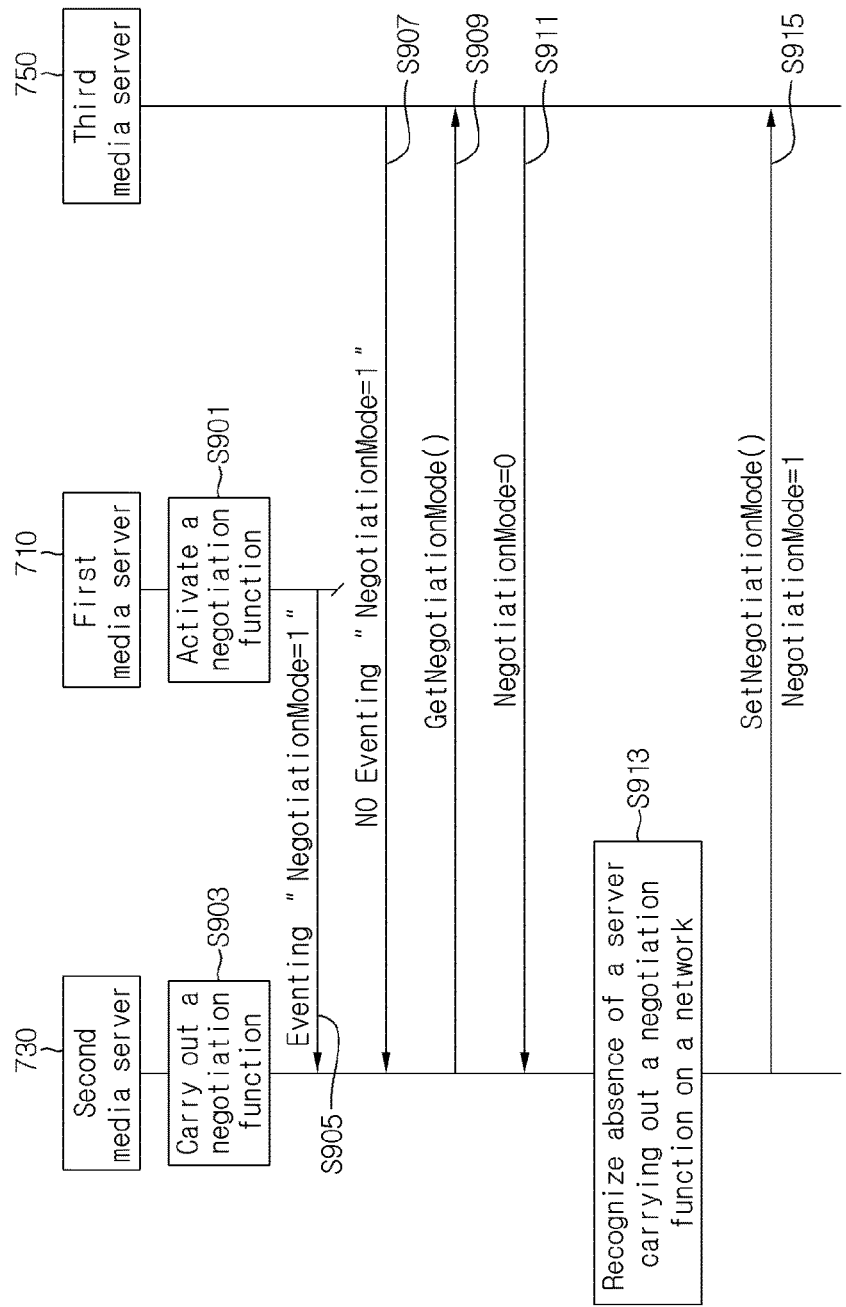
FIG. 8 is a flow diagram illustrating a method for configuring a negotiator according to an embodiment of the present invention.

Now, with reference to FIG. 8, described will be a method for setting up a new negotiator in case a previous negotiator is released from a current network without a particular notification according to an embodiment of the present invention.

FIG. 8 is a flow diagram illustrating a method for configuring a negotiator according to an embodiment of the present invention.

With reference to FIG. 8, a first media server 710 activates a negotiation function S901. The first media server 710 can carry out the role of a current negotiator within one network.

The first media server 710, which is a negotiator, transmits an event message including a negotiation mode state variable of which the allowed value is '1' to a second media server 730 which is an aggregate media server carrying out a current aggregation function S905. The second media server 730 which has received an event message including the negotiation mode state variable of which the allowed value is '1' can know that the first media server 710 is a negotiator.

Next, the first media server 710 is disconnected from a network without notification or handing over the role of a negotiator to another media server.

The second media server 730, which is an aggregate media server, can check whether a negotiator exists within the network. Different from transmission of an event message of the first media server as described above, if a third media server 750, which is another media server belonging to the same network, does not transmit any event message including a negotiation mode state variable having a specific allowed value S907, the second media server 730 transmits a negotiation mode get action (GetNegotiationMode) to the third media server 750, S909.

Properties of a negotiation mode get action can include an action name and arguments, but are not limited to the items listed above. The action name can be GetNegotiationMode. An argument is a variable corresponding to a command; an argument can include an argument name, an argument direction, and a related state variable, which is not limited to the case above. The argument name corresponding to a negotiation mode get action can be NegotiationMode. The argument direction, namely, the transmission direction of the negotiation mode state variable can be defined as OUT, and an entity which has received the negotiation mode get action, for example, the negotiation mode state variable of the third media server 750 can be a target argument. The related state variable can be NegotiationMode.

The third media server 750 transmits a negotiation mode state variable of which the allowed value is '0' to the second media server in response to the negotiation mode get action S911.

The second media server 730 which has not received from a media server within a network an event message or a response message including the negotiation mode state variable of which the allowed value is '1' recognizes absence of a negotiator which is a kind of a server carrying out a negotiation function on the corresponding network S913.

Next, the second media server 730 recognizing absence of a negotiator on the network transmits to the third media server 750 a negotiation mode set action including a negotiation mode state variable of which the allowed values is '1' S915.

The third media server 750 which has received a negotiation mode set action including a negotiation mode state variable of which the allowed value is '1' can be a new negotiator.

Next, described with reference to FIGS. 9 to 11 will be criteria based on which an aggregate media server is configured during a negotiation procedure.

Figure 9:
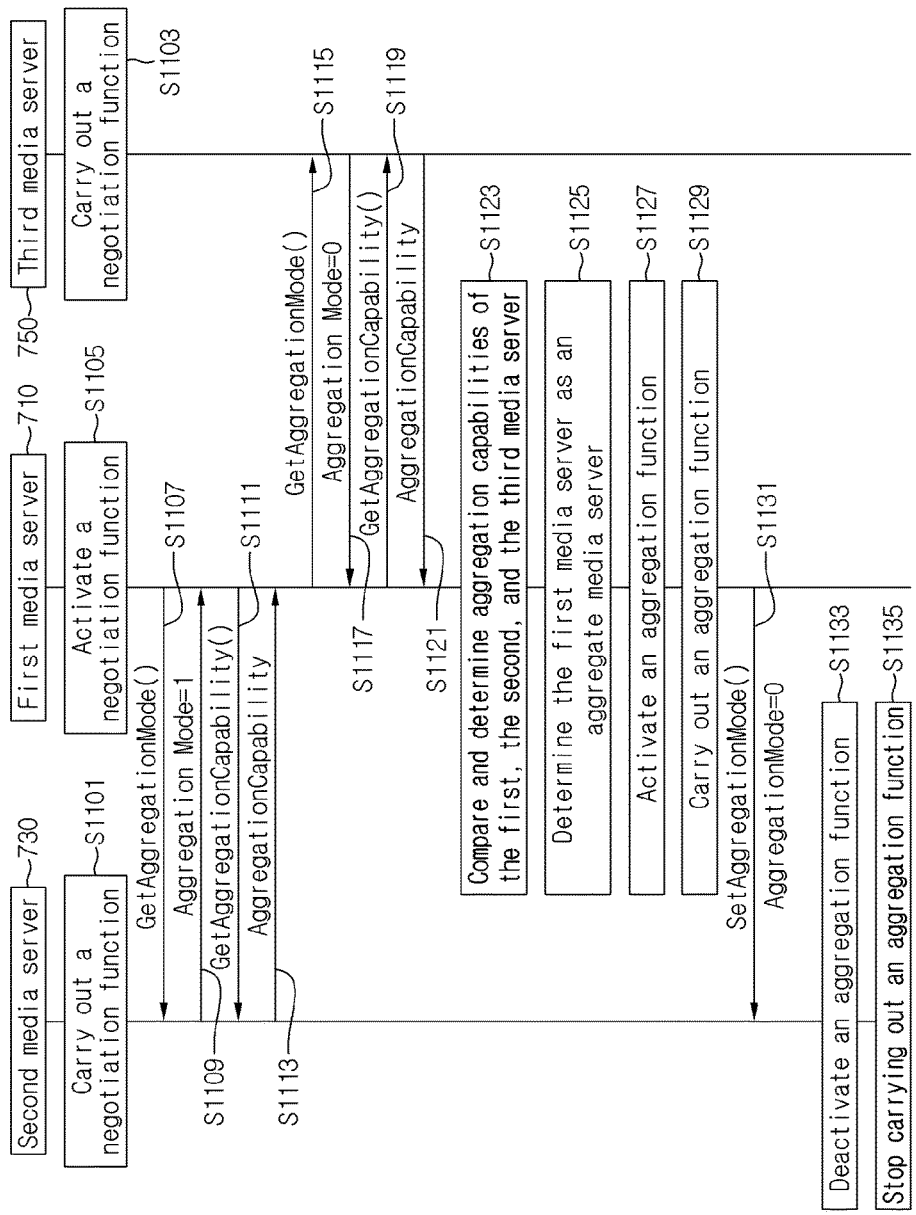
FIG. 9 is a flow diagram illustrating criteria based on which a negotiator configures an aggregate media server according to an embodiment of the present invention.

FIG. 9 is a flow diagram illustrating criteria based on which a negotiator configures an aggregate media server according to an embodiment of the present invention.

With reference to FIG. 9, a second media server 730 and a third media server 750 belonging to a network are aggregate media servers carrying out respectively an aggregation function S1101, S1103.

If the first media server 710 newly subscribes to a network to which the second media server 730 and the third media server 750 belong, the first media server 710 becomes a negotiator, and the negotiation function of the first media server 710 is activated S1105. In order to avoid unnecessary network traffic caused when a plurality of aggregation capable media servers or aggregate media servers are present on one network, it is necessary that only one or a minimum number of aggregation capable media servers carry out an aggregation function, and it is sufficient for the other aggregation capable media servers to function as ordinary media servers without carrying out the aggregation function. Therefore, in order to specify one aggregation capable media server and to make the specified server carry out an aggregation function, a negotiator can aggregate information about aggregation capabilities of a plurality of aggregation capable media servers.

The first media server 710 of which the aggregation function has been activated transmits an aggregation mode get action (GetAggregationMode) to the second media server 730 S1107. The second media server 730 transmits an aggregation mode state variable of which the data type is '1' in response to the aggregation mode get action transmitted from the first media server 710 S1109.

Next, the first media server 710 transmits an aggregation capability get action (GetAggregationCapability) to the second media server 730 S1111. The second media server 730 transmits an aggregation capability state variable to the first media server 710 in response to the aggregation capability get action transmitted from the first media server 710 S1113.

Also, the first media server 710 transmits the aggregation mode get action (GetAggregationMode) to the third media server 750 S1115. The third media server 750 transmits an aggregation mode state variable of which the data type is '0' in response to the aggregation mode get action transmitted from the first media server 710 S1117.

Next, the first media server 710 transmits an aggregation capability get action (GetAggregationCapability) to the third media server 750 S1119. The third media server 750 transmits an aggregation capability state variable in response to the aggregation capability get action transmitted from the first media server 710, S1121.

In this manner, the first media server 710 can know by using an aggregation mode get action that the second media server 730 and the third media server 750 are carrying out an aggregation function within one network. Accordingly, aggregation capable media servers, for example, the first media server 710, the second media server 730, and the third media server 750 have to share their capabilities and information about resources required necessarily and beneficially for the media servers to carry out an aggregation function. However, it needs to define which properties among device properties of a media server are related to capability and resources required necessarily and beneficially.

An aggregation capability get action can include an action name and arguments, but are not limited to the items listed above. The action name can be GetAggregationCapability. An argument can include an argument name, an argument direction, and a related state variable, which is not limited to the case above. The argument name corresponding to a aggregation capability get action can be AggregationCapability. The transmission direction of the argument capability state variable can be defined as OUT. The related state variable can be AggregationCapability.

Properties of an aggregation capability state variable can include a state variable name, an event, a data type, and an allowed value, but are not limited to the items listed above. The state variable name can be AggregationCapability. An event may or may not be triggered. The data type may be a string type. The allowed value can be in a list form representing various values, for example, a comma separated value (CSV) list'. The state variable of 'CSV' type can include a plurality of properties. The corresponding, individual data types can be determined by device properties. In what follows, with reference to FIGS. 10 and 11, information which can be included in an aggregation capability state variable will be described.

FIG. 10 illustrates criteria based on which an aggregate media server is configured according to an embodiment of the present invention.

With reference to FIG. 10, an aggregation capability state variable according to one embodiment of the present invention can include information about device properties such as total storage size, free storage size, memory, CPU, XML parsing capability, transforming capability, connectivity and transfer protocol, the number of stored content, device type, and aggregation mode, but are not limited to the items listed above.

The total storage size and free storage size can be used to determine the amount of content metadata aggregated by the corresponding media server within one network.

The memory can be used to determine the amount of content metadata dealt with by the corresponding media server within one network.

CPU performance influences data management and computation of the corresponding media server.

Since metadata are represented by XML, the XML parsing capability becomes an important element, and information about grade according to the XML parsing capability is required.

Since an aggregation capable media server can transform content on behalf of a media server actually including the corresponding content, the transforming capability becomes an important property, and the number of file formats that the corresponding media server can deal with can be a measure representing the transforming capability.

The connectivity and transfer protocol can be used to determine the amount of data transmitted by the corresponding media server to another media server or a control point device, and grade information according to the connectivity and transfer protocol is required. For example, a higher grade is preferred for the connectivity and transfer protocol of a device equipped with the Ethernet, whereas a lower grade is still acceptable for connectivity and transfer protocol of a device equipped with the Bluetooth.

With respect to the number of stored content, since an aggregation capable media server is a kind of a server aggregating content metadata from other media servers, it is necessary for the aggregation capable media server storing a larger number of content metadata to aggregate a smaller number of content metadata from other media servers.

A device type grade is required since it is preferable to have a media server connected to the corresponding network for a long time carry out an aggregation function. For example, the device type grade of a mobile device is low whereas the device type grade of a high performance device such as a PC and of an around-the-clock (or semi-permanent) device such as a server attached to a network is high.

Information about an aggregation mode is required since it is convenient to have a media server currently carrying out an aggregation function continue to carry out the aggregation function.

In the S1113 step of FIG. 9, the second media server 730 can transmit to the first media server 710 aggregation capability state information including total storage size (500 MB), free storage size (100 MB), memory (2 GB), CPU (2.53 GHz), XML parsing capability (Grade 1), transforming capability (13), connectivity and transfer protocol (Grade 2), the number of stored content (204), device type (Grade 4), and aggregation mode (ON) of the second media server 730.

In the S1121 step of FIG. 9, the third media server 750 can transmit to the first media server 710 aggregation capability state information including total storage size (100 MB), free storage size (20 MB), memory (1 GB), CPU (1 GHz), XML parsing capability (Grade 3), transforming capability (0), connectivity and transfer protocol (Grade 1), the number of stored content (564), device type (Grade 1), and aggregation mode (OFF) of the third media server 750.

FIG. 11 illustrates criteria based on which an aggregate media server is configured according to another embodiment of the present invention.

With reference to FIG. 11, an aggregation capability state variable according to a yet another embodiment of the present invention includes one value indicating an aggregation capability grade instead of informing of all of the properties of the corresponding device. Each of a plurality of aggregation capable media servers can represent various types of its device properties in terms of a single integer through a translation rule.

Properties of an aggregation capability state variable according to a yet another embodiment of the present invention can include a state variable name, event, data type, allowed value, and allowed value range, but are not limited to the items listed above. The state variable name can be aggregation capability (AggregationCapability). An event may or may not be triggered. The data type can be ui4 type. The allowed value can be one of the integers ranging from '0' to 'M', where 'M' represents the largest grade. The allowed value range can be larger than or equal to '0' and less than or equal to 'M'; to be more precise, the maximum value can be increased.

In the S1113 step of FIG. 9, the second media server 750 may transmit the aggregation capability state information of which the allowed value is '3' to the first media server 710.

In the S1121 step of FIG. 9, the third media server 750 may transmit the aggregation capability state information of which the allowed value is '4' to the first media server 710.

Again, FIG. 9 will be described.

As described with reference to FIGS. 10 and 11, the first media server 710 receives aggregation capability state information transmitted from each of the second media server 730 and the third media server 750; compares aggregation capabilities of the first 710, the second 730, and the third media server 750 with each other; and determines a media server to be used as an aggregate media server S1123.

Next, from the result of comparing aggregation capabilities of the first 710, the second 730, and the third media server 750 with each other, the first media server 710 is set up as an aggregate media server S1125.

For example, again with reference to FIG. 10, the first media server 710 determines the ranks of individual properties of the first 710, the second 730, and the third media server 750 by comparing the respective device properties and determines the media server which corresponds to the smallest value of the three sums of ranks of individual properties as an aggregate media server. As shown in FIG. 10, the first media server 710 can transmit an aggregation capability get action (GetAggregationCapability) to each of the second media server 730 and the third media server 750 and receive an aggregation capability state variable in response to the transmission, thereby aggregating information about the respective device properties. The first media server 710 can determine ranks of individual device properties of each media server by comparing them and calculate a total sum of the ranks. As a result, the total sum of ranks of the first media server 710 is 16; that of the second media server 730 is 19; and that of the third media server 750 is 23, where the first media server 710 yielding the smallest total sum is determined as a media server having the best aggregation capability. A method for determining ranks is not limited to the case above, however.

As another example, again with reference to FIG. 11, the first media server 710 can receive aggregation capability state variables represented by a single grade from the second 730 and the third media server 750. The first media server 710 can compare its aggregation capability state variable with the received aggregation capability state variables and determine the first media server 710 showing the smallest grade as an aggregate media server.

The first media server 710 which has been configured as an aggregate media server activates an aggregation function by changing the value of the aggregation mode state variable to '1' in case a previous value thereof is '0' S1127. The first media server 710 of which the aggregation function has been activated carries out an aggregation function S1129.

Next, the first media server 710 transmits an aggregation mode set action (SetAggregationMode) including an aggregation mode state variable of which the data type is '0' (AggregationMode=0) to the second media server 730 S1131.

The second media server 730 deactivates the aggregation function by changing the value of its aggregation mode state variable from '1' to '0' S1133. The second media server 730 of which the aggregation function has been deactivated stops carrying out the aggregation function S1135.

Next, described will be a procedure of changing the state of a media server supporting a content information aggregation function into an aggregation capable media server and an aggregate media server.

Figure 12:
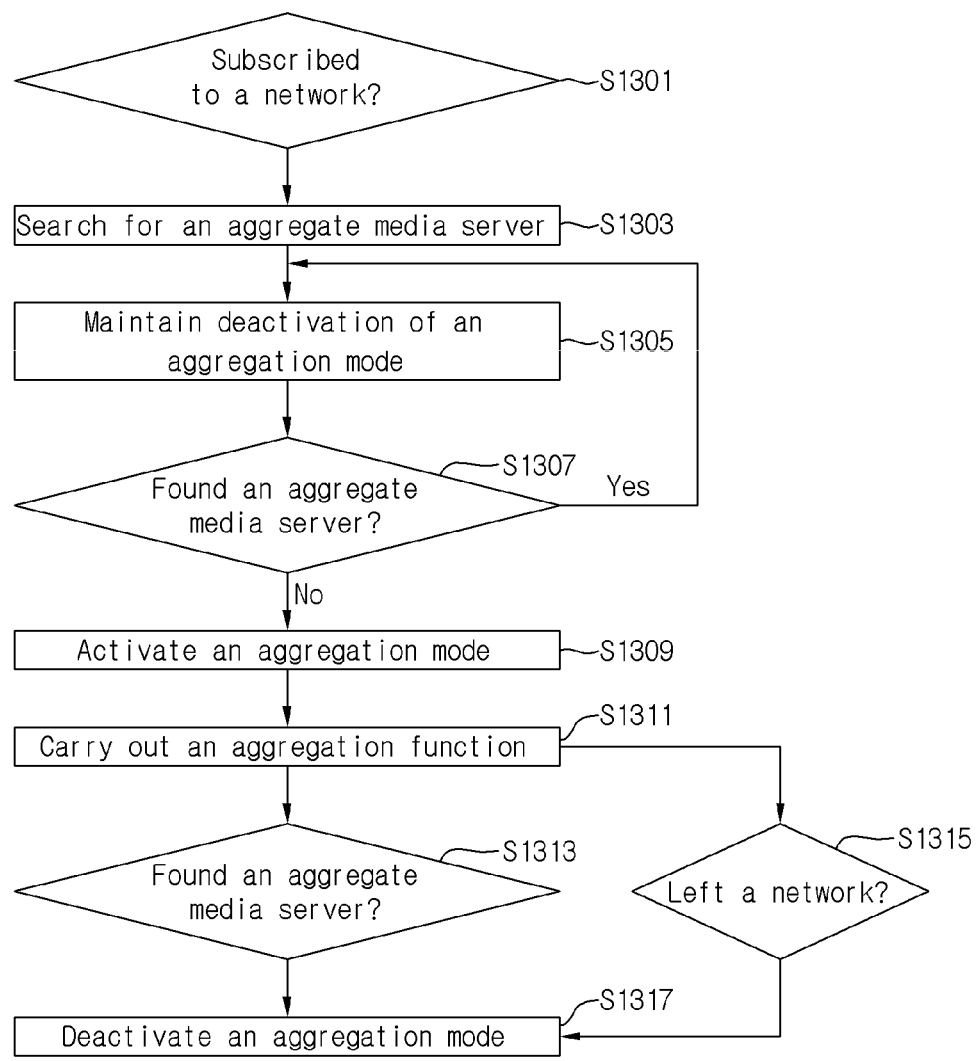
FIG. 12 is a flow diagram illustrating state transition of an aggregation mode of a media server supporting a content information aggregation function according to an embodiment of the present invention.

FIG. 12 is a flow diagram illustrating state transition of an aggregation mode of a media server supporting a content information aggregation function according to an embodiment of the present invention.

With reference to FIG. 12, if an aggregation capable media server supporting a content information aggregation function subscribes to a network S1301, media servers belonging to the corresponding network are searched periodically to determine whether an aggregate media server exists S1303. At this time, an aggregation capable media server can operate as a negotiator. An aggregation capable media server may use the aforementioned aggregation mode get action (GetAggregationMode) to search for an aggregate media server or may receive an event message including information about the aggregation mode state transmitted from another aggregate capable media server or another aggregate media server, which is not limited to the case above.

An aggregation capable media server maintains an aggregation mode deactivation state until it determines that none of the media servers belonging to the corresponding network carries out an aggregation function, namely, until a search for an aggregate media server is completed S1305.

The aggregation capable media server maintains the aggregation mode deactivation state if an aggregate media server is found S1307; the aggregation capable media server activates its aggregation mode only when no aggregation media server is found S1309. Also, if the aggregation capable media server finds aggregate media servers, compares aggregation capabilities of the aggregate media servers among them as a negotiator, and may set up the media server yielding the most excellent aggregation capability as an aggregation media server. For example, the aggregation capable media server can set the value of its aggregation mode state variable to '1' so that its aggregation mode can be activated, which is not limited to the case above.

In case the aggregation mode is activated, the aggregation capable media server carries out the aggregation function S1311. For example, the aggregation capable media server can become an aggregate media server, and the aggregate media server can aggregate content metadata stored in a media server that can be controlled by another media server among the media servers belonging to the corresponding network.

An aggregate media server deactivates its deactivation mode S1317 when another aggregate media server is found in the corresponding network S1313. Or the aggregate media server leaves the corresponding network S1315 and deactivates its aggregation mode S1317 after being disconnected from the network.

In this manner since at least one media server can aggregate information stored in other media servers belonging to a network even when no command from a specific control apparatus is given within the network, a control apparatus can receive information stored in the other media servers just by requesting information from one media server for once.

Meanwhile, it is necessary for a media server or a control apparatus to distinguish a plurality of content metadata stored in the aggregate media server from each other according to the types of media servers to which the individual content metadata originally belonged so that the media server or the control apparatus can select a specific object among aggregate objects stored in an aggregate media server. In what follows, with reference to FIGS. 13 to 15, described will be a method for distinguishing content metadata aggregated and stored in an aggregate media server.

Figure 13:
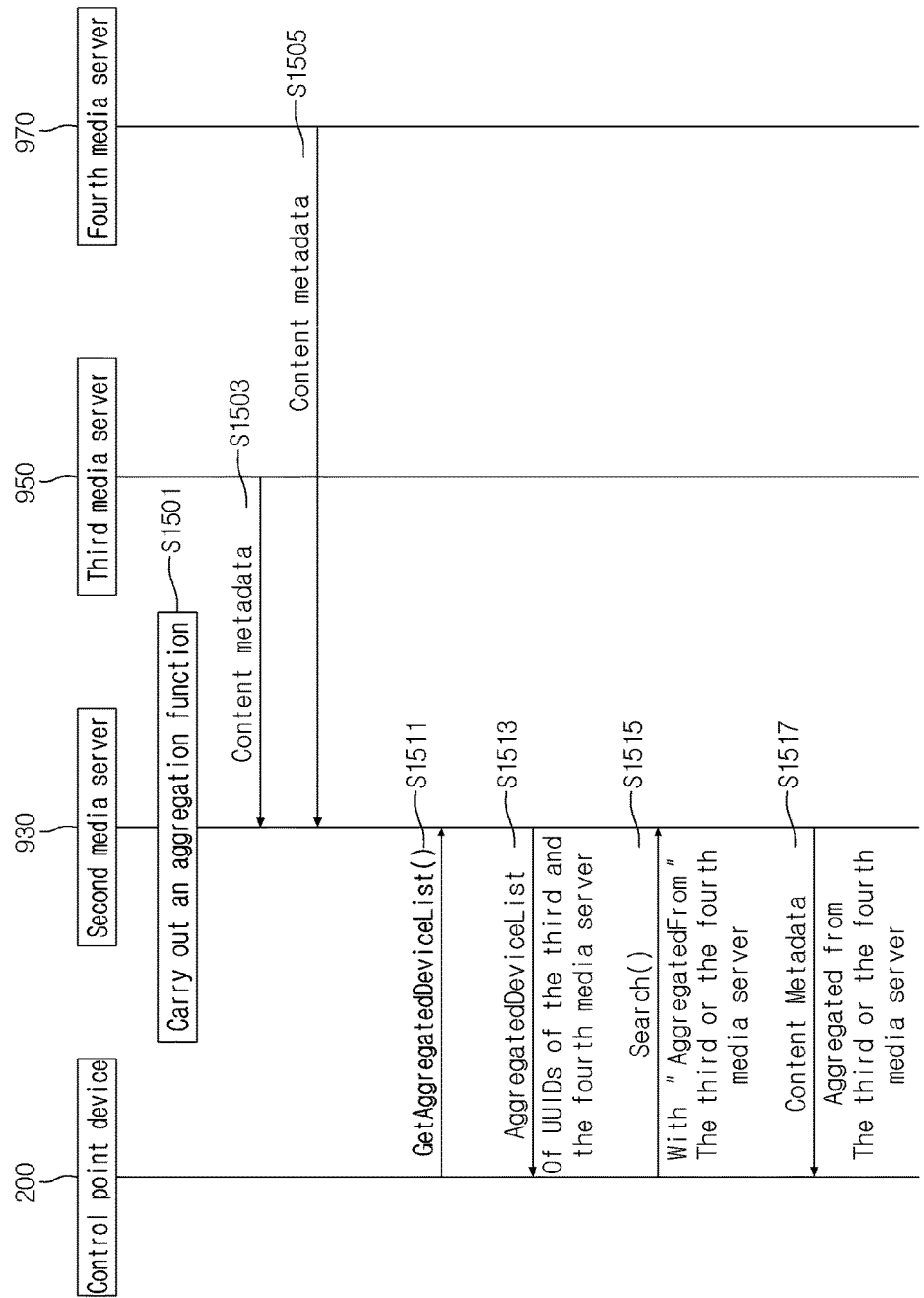
FIG. 13 is a flow diagram illustrating properties used to distinguish content information aggregated by an aggregate media server according to an embodiment of the present invention.

FIG. 13 is a flow diagram illustrating properties used to distinguish content information aggregated by an aggregate media server according to an embodiment of the present invention.

With reference to FIG. 13, a second media server 930 carries out an aggregation function as an aggregate media server (AMS) S1501. To carry out an aggregation function, the second media server 930 receives content metadata from a third media server 950 and a fourth media server 970 which are an aggregated media server (ADMS) S1503, S1505.

Next, a control point device 200 transmits an aggregated server list get action (GetAggregatedDeviceList) to the second media server 930 S1511. The control point device 200 can transmit an aggregated server list get action to the second media server 930 which is now an aggregate media server to know from which devices the content metadata aggregated by the second media server 930 comes. In order to avoid unnecessary network traffic caused when a plurality of aggregate media servers (AMSs) are present on one network, it is necessary to distinguish the content metadata aggregated from those not aggregated among the content metadata stored in the aggregate media servers (AMSs). The content metadata not aggregated can denote those content metadata created by the corresponding aggregate media server (AMS) or those content metadata stored originally in the corresponding aggregate media server (AMS). In what follows, those locally stored content are regarded in the same manner as the content not aggregated.

To distinguish content metadata from each other, it is necessary to newly define CDS properties. The new CDS properties include a property name, data type, multi-valued, and R/W (Read/Write), but are not limited to the items listed above. The property name can be Aggregated. The data type may be a Boolean type or a string type. In case the data type is Boolean of which the value is '0', the corresponding content metadata denotes the content metadata stored locally in an aggregate media server (AMS). In case the value of the data type is '1', it indicates that the corresponding content metadata has been aggregated by the aggregate media server from another media server. In case the data type is string, the value of the data type can be 'Local' or 'Aggregated'. The corresponding property doesn't have to be multi-valued, which is not limited to the case above. R/W indicates that reading and writing are allowed, which is not limited to the case above.

In addition, the new CDS properties above can be used to show to which media server an aggregate media server (AMS) which has been aggregating content metadata, for example, the original media server corresponds.

A new CDS property can be defined to distinguish the aforementioned original media server aggregating content metadata. The new CDS properties can include a property name, data type, multi-values, and R/W (Rcad/Write), but are not limited to the items listed above. The property name may be AggregatedFrom or originalServerUDN. The data type may be a string type. In case the data type is a string, the value of the data type can display a unique device name (UDN) of a media server. The corresponding property doesn't have to be multi-valued, which is not limited to the case above. R/W indicates that reading and writing are allowed, which is not limited to the case above.

Also, it is necessary to share the information about the source of the content metadata stored in an aggregate media server (AMS) with other aggregation capable media servers (ACMSs) or control apparatus. It may be required to define a state variable and an action for information sharing.

The information about the source of the content metadata stored in an aggregate media server (AMS) can be known from a state variable. The state variable can include a name, event, data type, allowed value and default value, but is not limited to the items listed above. The name of a state variable may be AggregatedDeviceList or A_ARG_TYPE_AggregatedDeviceList. An event may or may not be triggered. The data type can be a string and denote a unique device name (UDN) of a media server which is a source of the content metadata aggregated by an aggregate media server. The allowed value can be 'CSV'. Since the state variable can include multiple UDNs, the allowed value has to be of 'CSV' type, which is not limited to the case above. It is not necessary to define a default value.

Also, information about a source of the content metadata stored in an aggregate media server (AMS) can be known through an action. For example, an aggregated server list get action can correspond to a control command for obtaining a list including UDNs of aggregated servers such as aggregated media servers from which the aggregate media server aggregates content metadata. The aggregated server list get action can include a name, argument, related state variable, and error codes. The name can be GetAggregatedDeviceList.

The name of the argument can be AggregatedDeviceList and direction of the argument can be OUT. The related state variable may be AggregatedDeviceList or A_ARG_TYPE_AggregatedDeviceList. The error code can include 742. The error code 742 can denote a unsupported action. For example, since the action requested together with the aggregated server list get action is supported only when the value of the aggregation mode state variable (AggregationMode) is '1', the error code of 742 can indicate that the requested action is not supported if a current value of the state variable is '0'.

The second media server 930 transmits a response including an aggregated server list (AggregatedDeviceList) state variable to the control point device 200 in response to the aggregated server list get action (GetAggregatedDeviceList) S1513. At this time, the aggregated server list (AggregatedDeviceList) state variable can include universally unique identifiers (UUIDs) of the third media device 950 and the fourth media device 970 which have been the aggregated media server of the second media server 930.

The control point device 200 transmits a search request including AggregatedFrom information to the second media server 930 S1515. At this time, the control point device 200 can specify the AggregatedFrom information by the third media server 950 or the fourth media server 970.

The second media server 930 transmits content metadata to the control point device 200 in response to the search request S1517. At this time, among the content metadata stored in the second media server 930, the second media server 930 can distinguish content metadata aggregated from the third media server 950 and the fourth media server 970 from each other and transmit the distinguished content metadata separately to the control point device 200.

In this manner, in requesting content metadata from an aggregate media server belonging to the same network, by using an aggregated server list get action, aggregated server list state variable, AggregatedFrom information, and aggregated server properties, a media server can distinguish the content metadata stored locally in an aggregate media server from the content metadata aggregated by the aggregate media server. In the case of content metadata aggregated by an aggregate media server, the media server can receive selectively the content metadata stored in a specific media server by distinguishing the sources of the content metadata from each other.

Figure 14:
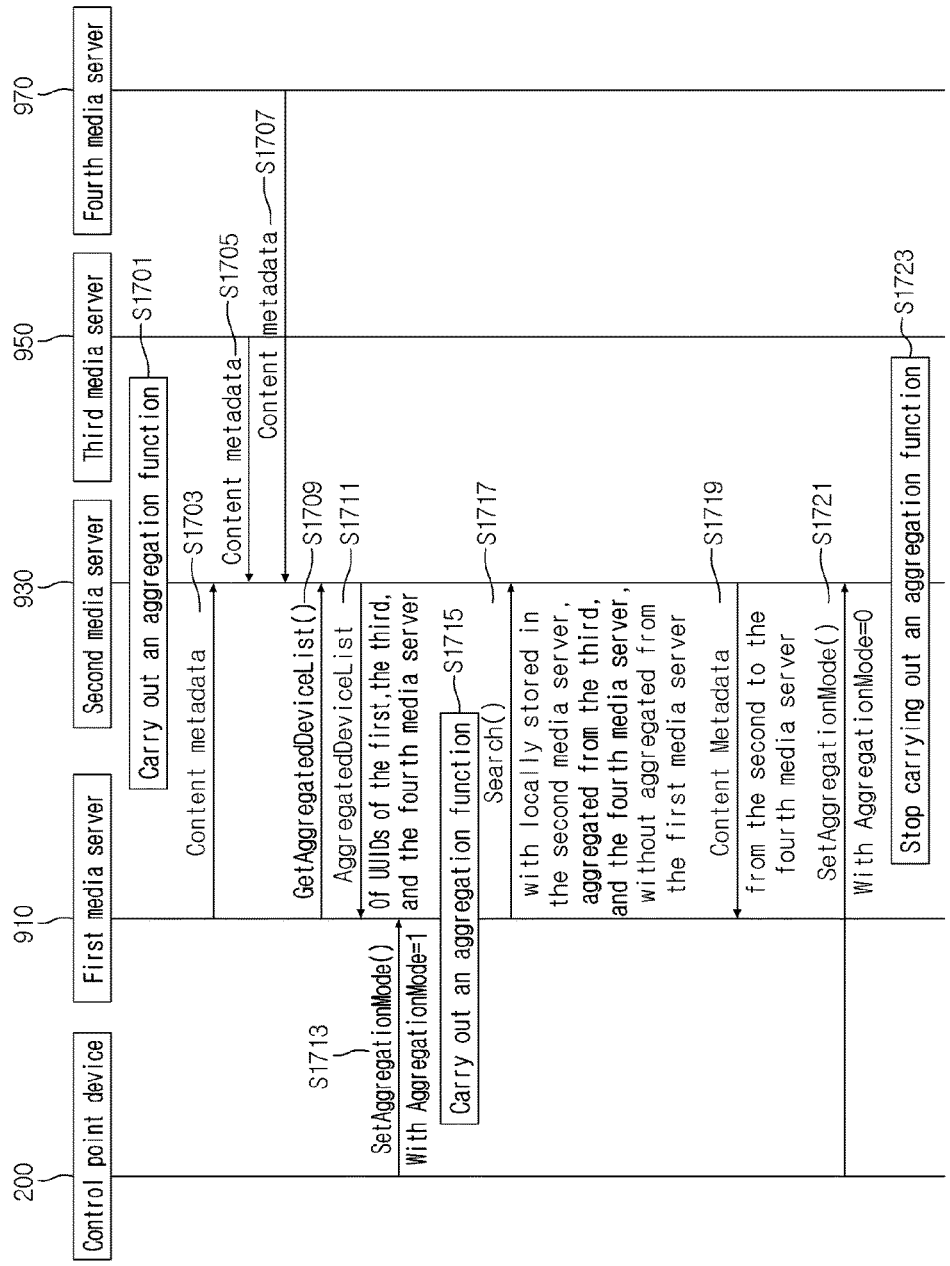
FIG. 14 is a flow diagram illustrating a method for receiving content information from a previous aggregate media server by using properties with which a new aggregate media server distinguishes content information according to an embodiment of the present invention.
Figure 15:
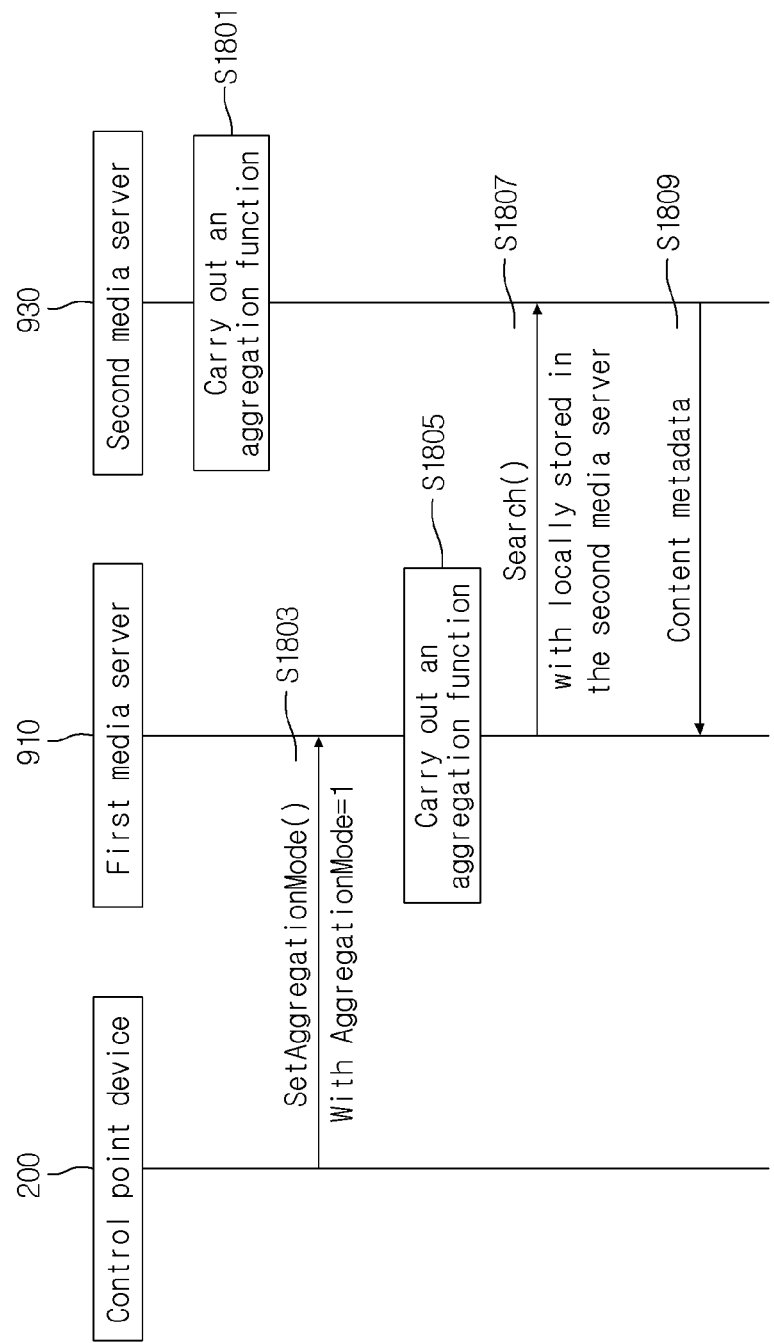
FIG. 15 is a flow diagram illustrating a method for receiving content information from a previous aggregate media server by using properties with which a new aggregate media server distinguishes content information according to another embodiment of the present invention.

In what follows, with reference to FIGS. 14 and 15, described will be a method for a new aggregate media server to receive content information from a previous aggregate media server by distinguishing only the content information needed from the others by using the action, state variable, and information properties described earlier in case an aggregate media server is changed to or overlaps with another one. At this time, descriptions about the same part of FIG. 13 will be omitted.

FIG. 14 is a flow diagram illustrating a method for receiving content information from a previous aggregate media server by using properties with which a new aggregate media server distinguishes content information according to an embodiment of the present invention.

With reference to FIG. 14, a second media server 930, carrying out an aggregation function as an aggregate media server (AMS) S1701, aggregates content metadata respectively from media servers belonging to the same network, for example, a first media server 910, a third media server 950, and a fourth media server 970, S1703, S1705, S1707.

Next, if the first media server 910 requests an aggregated server list get action (GetAggregatedDeviceList) from the second media server 930, S1709, the second media server 930 transmits to the first media server 910 an aggregated server list state variable including UDNs of the first media server 910, the second media server 950, and the fourth media server 970 in response to the request S1711.

Next, the control point device 200 initiates execution of an aggregation function of the first media server 910 S1715 by transmitting to the first media server 910 an aggregation mode set action (SetAggregationMode) including an aggregation mode state variable of which the value is '1' (AggregationMode=1) S1713. At this time, not only the control point device 200 but also a media server belonging to the same network can control the aggregation function of the first media server 910 and the second media server 930, which is not limited to the case above.

The first media server 910 requests specific content metadata from the second media server 930, S1717. At the time of requesting content metadata, the first media server 910 can specify the content metadata stored locally in the second media server 930 and content metadata aggregated separately from the third media server 950 and the fourth media server 970. The first media server 910, which is a media server playing the role of an aggregate media server (AMS) on behalf of the second media server 930, receives content metadata aggregated previously by the second media server 930, thereby obviating aggregating content metadata again. It should be noted, however, that since the first media server 910 doesn't have to aggregate again the content metadata aggregated previously by the second media server 930 from the first media server 910, the content metadata aggregated from the first media server 910 can be excluded.

The second media server 930, in response to the request made by the first media server 910 in the S1721 step, transmits to the first media server 910 the content metadata stored locally in the second media server 930 and the content metadata aggregated separately from the third media server 950 and the fourth media server 970.

Next, the control point device 200 stops S1723 the aggregation function of the second media sever 930 by transmitting S1721 an aggregation mode set action (SetAggregationMode) including an aggregation mode state variable of which the value is '0' (AggregationMode=0) to the second media server 930.

FIG. 15 is a flow diagram illustrating a method for receiving content information from a previous aggregate media server by using properties with which a new aggregate media server distinguishes content information according to another embodiment of the present invention.

If the control point device 200 transmits an aggregation mode set action (SetAggregationMode) including an aggregation mode state variable of which the value is '1' to the first media server 910 while the second media player 930 is carrying out an aggregation function as an aggregate media server S1801, the first media server 910 also carries out an aggregation function within the same network S1805.

The first media server 910 which has become an aggregate media server transmits to the second media server 930 a search request for obtaining specific content metadata S1807.

Next, the second media server 930 transmits S1809 specific content metadata to the first media server 910 in response to the search request received in the S1807 step.

The specific content metadata can be the content metadata stored locally in the second media server 930. In this manner, in case the first media server 910 and the second media server 930 are present in the same network, since the second media server is already carrying out an aggregation function and aggregating and storing content metadata of other media servers, the first media server 910 is allowed to aggregate only the content metadata stored locally in the second media server 930 rather than the content metadata aggregated through the aggregation function by the second media server 930 in order to avoid overlap of aggregation of content metadata from other media servers.

In what follows, described with reference to FIGS. 16 and 17 will be a method for an aggregate media server to assign identifiers to aggregated content metadata and if the corresponding content metadata is updated on an aggregated media server after the content metadata is aggregated, to reflect the update on the aggregated content metadata.

Figure 16:
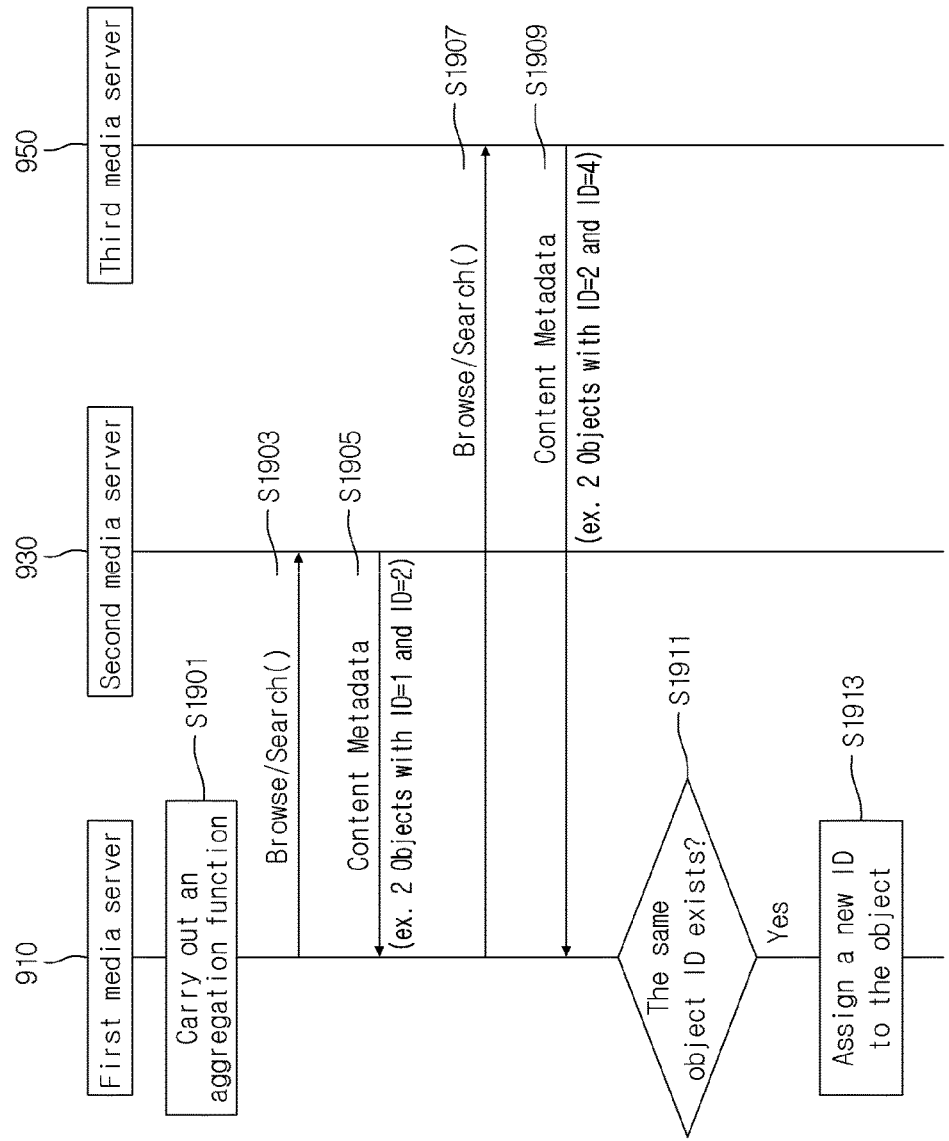
FIG. 16 is a flow diagram illustrating a process of assigning identifiers to content objects aggregated by an aggregate media server from media servers according to an embodiment of the present invention.

FIG. 16 is a flow diagram illustrating a process of assigning identifiers to content objects aggregated by an aggregate media server from media servers according to an embodiment of the present invention.

With reference to FIG. 16, the first media server 910 is an aggregate media server (AMS) and carries out an aggregation function S1901. Therefore, the first media server 910 transmits S1903 a browse/search request to a second media server 930 and receives S1905 content metadata transmitted from the second media server 930. The content metadata transmitted from the second media server 930 can include, for example, two content objects of which the object IDs are '1' and '2' respectively.

Also, the first media server 910 transmits S1907 a browse/search request to a third media server 950 and receives S1909 content metadata transmitted from the third media server 950. The content metadata transmitted from the third media server 950 can include, for example, two content objects of which the object IDs are '2' and '4' respectively. Each media content should be distinguished from the others by an unique identifier. A unique identifier can be assigned by a media server retaining the corresponding media content, and therefore, uniqueness of media content can be maintained only within a single media server.

Meanwhile, it is common for an aggregate media server (AMS) to aggregate a plurality of media content from a plurality of separate media servers rather than a single media server. Thus, uniqueness indicated by an identifier of media content aggregated from an aggregate media server (AMS) is no longer maintained. The content metadata aggregated previously in the S1905 step includes a content object of which the object ID is '1' and an content object of which the object ID is '2', while the content metadata aggregated previously in the S1909 step includes an content object of which the object ID is '2' and an content object of which the object ID is '4'. Since the object ID of '2' overlaps, it is not possible to distinguish content objects from each other only by using the object identifier of '2'.

In this case, the first media server 910 determines whether the same object ID exists by comparing identifiers of a plurality of aggregated content metadata, namely, individual object IDs with each other S1911.

In case an overlapping object ID is found, the first media server 910 assigns a new ID to the overlapping object, namely, content metadata S1913. In other words, an aggregate media server (AMS) has to assign a new, unique identifier to aggregate media content, and the newly assigned identifier has to be stored according to a new type of metadata of the aggregate media content.

An identifier newly assigned by an aggregate media server (AMS) can be defined as a new CDS property. The new CDS property can include a property name, data type, multi-valued, and R/W, but is not limited to the items listed above. The property name can include an object ID (ObjectID) and can re-use the '@id', which is not limited to the case above. The data type can be 'ui4' or a string type. The data type of 'ui4' can indicate that data is integer. The corresponding property doesn't necessarily have to be multi-valued, but is not limited to the case above. R/W is limited to reading, which is not limited to this case.

For example, an object of which the object ID is '1' and an object of which the object ID is '2' aggregated from the second media server 930 can get an identifier of '1' and an identifier of '2' respectively in the aggregate media server (AMS). Also, an object of which the object ID is '2' and an object of which the object ID is '4' aggregated from the third media server 950 can get an identifier of '3' and an identifier of '4' respectively in the aggregate media server (AMS). As a result, since all of content metadata on the aggregate media server (AMS) can have respective identifiers, the content metadata can be distinguished from each other.

Also, an identifier newly assigned by an aggregate media server (AMS) according to another embodiment of the present invention can be defined as another new CDS property. The CDS property can include a property name, data type, multi-valued, and R/W, but is not limited to the items listed above. The property name can include an original object ID (OriginalObjectID), aggregation ID (@aggID), or aggregated object ID (aggregatedObjectID), but is not limited to the IDs above. The data type can be 'ui4' or a string type. 'ui4' data type can indicate that data is integer. The corresponding property doesn't necessarily have to be multi-valued, but is not limited to the case above. R/W is limited to reading, which is not limited to this case.

Also, an identifier newly assigned by an aggregate media server (AMS) according to a yet another embodiment of the present invention can be defined as a yet another new CDS property. The CDS property can include a property name, data type, multi-valued, and R/W, but is not limited to the items listed above. The property name can include an aggregation ID (@aggID), but is not limited to the ID above. The data type can be CVS type. The CSV type of which the data type is integer can indicate the list of original object IDs and UDNs of the original media servers. The corresponding property doesn't necessarily have to be multi-valued, but is not limited to the case above. R/W is limited to reading, which is not limited to this case.

For example, an object aggregated from the second media server 930, of which the object ID is '1' can cret an object ID of '1' (ObjectID=1), an aggregated object ID of '1' (aggregatedObjectID=1), and an original server UDN of 'aab3' (OriginalServerUDN=aab3) from the aggregate media server (AMS). Also, an object aggregated from the second media server 930, of which the object ID is '2' can get an object ID of '2' (ObjectID=2), an aggregated object ID of '2' (aggregatedObjectID=2), and an original server UDN of 'aab3' (OriginalServerUDN=aab3) from the aggregate media server (AMS). An object aggregated from the third media server 950, of which the object ID is '2' can get at least one of an object ID of '3' (ObjectID=3), an aggregated object ID of '2' (aggregatedObjectID=2), and an original server UDN of '78wq' (OriginalServerUDN=78wq) from the aggregate media server (AMS). Also, an object aggregated from the third media server 950, of which the object ID is '4' can get an object ID of '4' (ObjectID=4), an aggregated object ID of '4' (aggregatedObjectID=4), and an original server UDN of '78wq' (OriginalServerUDN=78wq) from the aggregate media server (AMS). To summarize, all of content metadata aggregated by and stored in the aggregate media server (AMS) can be identified as separate objects by using object IDs, the original identifier assigned by an aggregated media server can be known from an aggregated object ID, and the source of an object can be known from the original server UDN.

Figure 17:
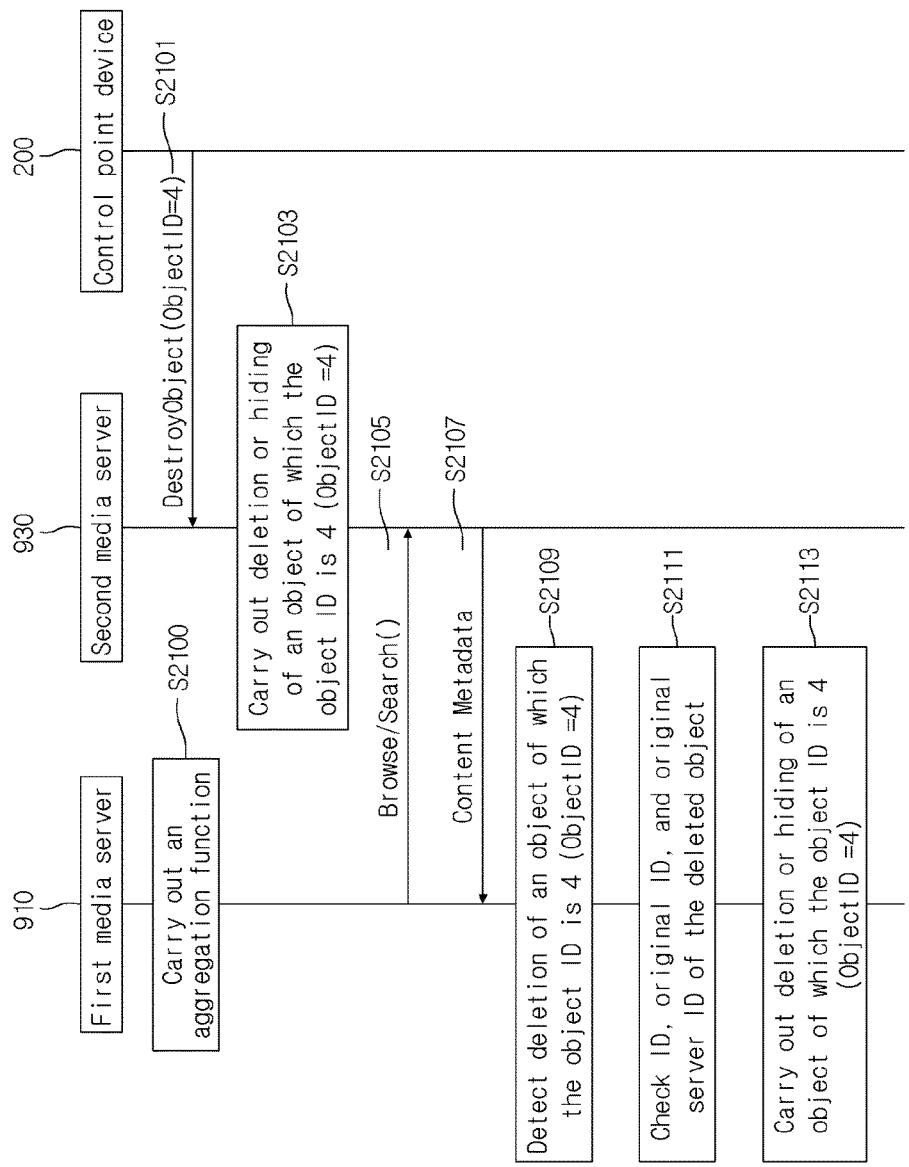
FIG. 17 is a flow diagram illustrating a process where an aggregate media server reflects an update state of content metadata executed on aggregated media servers according to an embodiment of the present invention.

FIG. 17 is a flow diagram illustrating a process where an aggregate media server reflects an update state of content metadata executed on aggregated media servers according to an embodiment of the present invention.

With reference to FIG. 17, a first media server 910, as an aggregate media server (AMS), carries out a content metadata aggregation function with respect to the content stored in a second media server 930, S2100.

Next, a control point device 200 transmits an object destroy command (DestroyObject) to the second media server 930, S2101. The object destroy command (DestroyObject) can specify an object. For example, the control point device 200 can specify an object of which the object ID is '4' and transmit an object destroy command (DestroyObject) to the second media server 930.

The second media server 930, in response to the transmitted object destroy command (DestroyObject), carries out deletion or hiding of an object of which the object ID is '4' S2103. For example, an object of which the object ID is '4' can be deleted from the second media server 930 or the object of which the object ID is '4' can be prevented from being exposed to the control point device 200 or the aggregate media server (AMS).

Next, if the first media server 910, as an aggregate media server (AMS), transmits a browse/search request to the second media server 930, S2105, the second media server 930 transmits the content metadata excluding the object of which the object ID is '4' to the first media server 910, S2107.

The first media server 910 receives content metadata transmitted from the second media server 930 and detects that the object of which the object ID is '4' has been deleted S2109.

Next, the first media server 910 checks an ID of a deleted object, original ID of the deleted object, and original server identifier of the deleted object S2111. The ID of a deleted object can correspond to an object ID, an identifier newly assigned by the first media server 910 which is an aggregate media server (AMS) described above. Also, the original ID of the deleted object can correspond to an aggregated object ID, the original identifier assigned by the second media server 930 which is an aggregated media server. Also, the original server identifier of the deleted object, corresponding to the identifier of the second media server 930, which has been stored before the object is aggregated, can indicate the original server UDN.

If an identifier of the deleted object is confirmed, the first media server 910 carries out deletion or hiding of the confirmed object, namely, the object of which the object ID is '4' S2113. In this way, if an update of content metadata is carried out on an aggregated media server while the aggregate media server (AMS) is carrying out an aggregation function continuously, the aggregate media server (AMS) can reflect the update.

In what follows, with reference to FIGS. 18 to 30, described will be various embodiments of the present invention where aggregate object information aggregated by and stored in an aggregate media server is changed or refreshed according to a request from a control point device. In what follows, descriptions corresponding to the same part as described above will be provided shortly or omitted.

Figure 18:
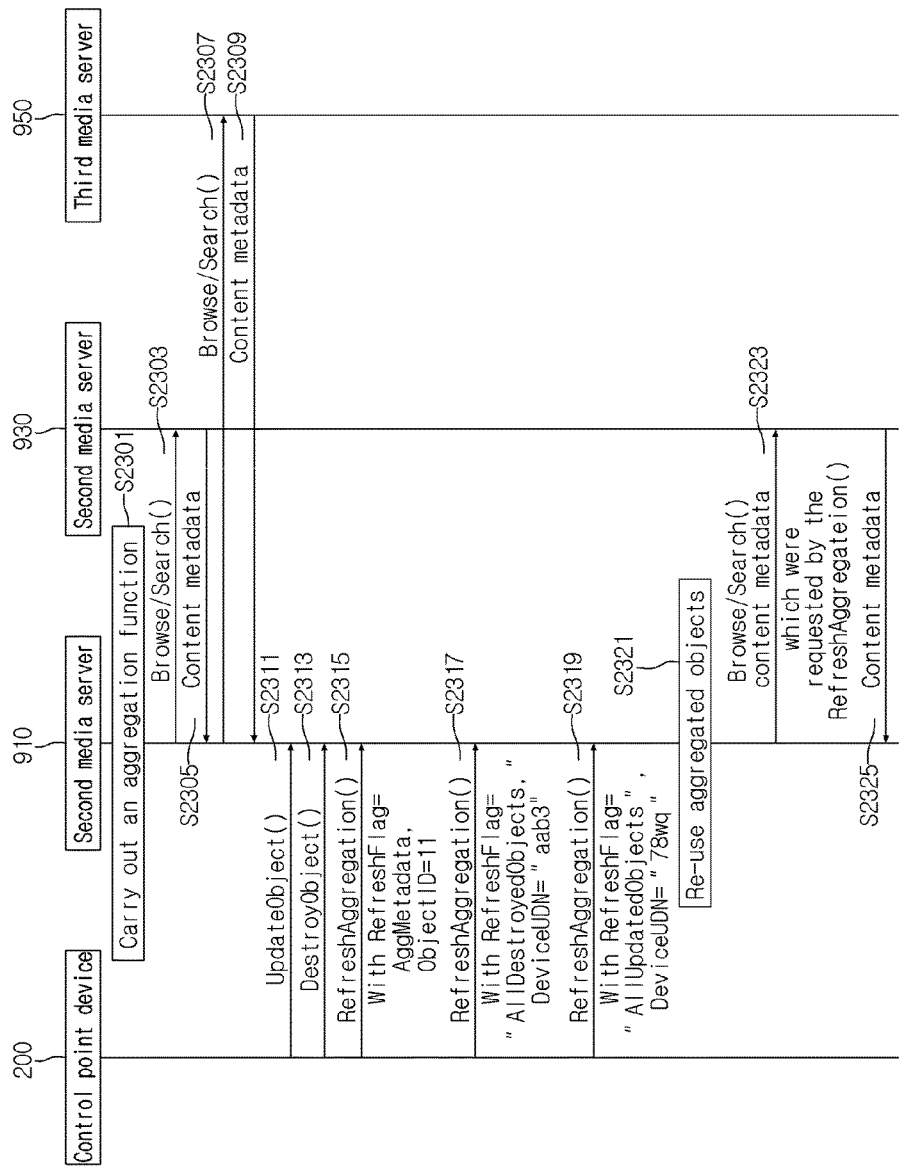
FIG. 18 is a flow diagram illustrating a process where aggregate object information is changed on an aggregate media server according to an embodiment of the present invention.

FIG. 18 is a flow diagram illustrating a process where aggregate object information is changed on an aggregate media server according to an embodiment of the present invention.

With reference to FIG. 18, a first media server 910 carries out an aggregation function as an aggregate media server (AMS) S2301. If the first media server 910 transmits a browse/search request to a second media server 930 and a third media server 950 respectively S2303, S2307, each of the second media server 930 and the third media server 950 transmits content metadata to the first media server 910 S2305, S2309.

In what follows, with reference to FIG. 19, described will be information of an aggregate object aggregated by the first media server 910.

FIG. 19 is a table illustrating aggregate object information on an aggregate media server according to an embodiment of the present invention.

With reference to FIG. 19, information property can represent an aggregate object on an aggregate media server (AMS). An object ID (ObjectID) can indicate an identifier assigned by the aggregate media server (AMS). An aggregated object ID (aggregatedObjectID) can correspond to an identifier assigned by the original media server, and an original server UDN (OriginalServerUDN) can correspond to a unique identifier indicating the original media server. A title can indicate the title of the corresponding content, and a creator can indicate the name of the creator of the corresponding content, which is not limited to the case above. By using the information in the table of FIG. 19, a plurality of content metadata can be distinguished from each other on the aggregate media server (AMS).

Now FIG. 18 is described again.

The control point device 200 transmits an object update action (UpdateObject) to the first media server 910, S2311. Next, the first media server 910 re-uses aggregated objects S2321. For example, if an update is detected in response to the transmitted object update action, the first media server 910 can update the corresponding content object information as shown in FIG. 20.

FIG. 20 is a table illustrating aggregate object information updated on an aggregate media server according to an embodiment of the present invention.

With reference to FIG. 20, according to an object update action transmitted from a control point device 200, a first media server 910 can update an content object of which the object ID is '11' (ObjectID=11), title information of a content object of which the object ID is '18' (ObjectID=18), creator information of a content object of which the object ID is '16' (ObjectID=16), and the like.

Now FIG. 18 is described again.

The control point device 200 transmits an object destroy action (DestroyObject) to the first media server 910, S2313. Next, the first media server 910 re-uses aggregated objects S2321. For example, in case a destroyed item is found in response to the transmitted object destroy action, the first media server 910 can delete the corresponding content object information as shown in FIG. 20.

FIG. 21 is a table illustrating aggregate object information discarded on an aggregate media server according to an embodiment of the present invention.

With reference to FIG. 21, according to an object destroy action transmitted from a control point device 200, a first media server 910 can delete information about a content object of which the object ID is '12' (ObjectID=12) and a content object of which the object ID is '14' (ObjectID=14).

In this way, there are chances that an aggregate object on an aggregate media server (AMS) differs from the original aggregated object before aggregation according to implementation of a media server or a request of a control apparatus. However, even for the case of an intended difference due to the user, such as a request of a control apparatus, the user may cancel the occurrence of the difference and attempt to synchronize the aggregate object with the original aggregated object. In what follows, described will be properties such as an action and a state variable that can be employed to synchronize an aggregate object with the original aggregated object.

Now FIG. 18 is described again.

The control point device 200 transmits to the first media server 910 a refresh flag called 'aggregate metadata' (RefreshFlag=AggMetadata) and an aggregation refresh action (RefreshAggregation) including an object ID of which the value is '11' (ObjectID=11) S2315. Next, the first media server 910 re-uses an aggregated object S2321. For example, the first media server 910 can refresh the corresponding content object information as shown in FIG. 22 in response to the transmitted aggregation refresh action. The refresh flag having the value of 'AggMetadata' can indicate that object ID (ObjectID) argument is used to request aggregating only the specified aggregated object.

A method for refreshing an aggregate object as in the S2315 step specifies an object ID of an aggregate object on an aggregate media server. At this time, the original aggregated object of an aggregated media server is not specified. Therefore, the control point device 200 can refresh an aggregate object by using the information other than the one such as a device UDN (DeviceUDN) including an object ID (ObjectID) and an original server UDN from among the object information as shown in FIG. 19. At this time, an object ID (ObjectID) is an aggregate object identifier of the original aggregated object, and in case the value of a refresh flag corresponds to an aggregate metadata (AggMetadata), aggregate direct children (AggDirectChildren), and aggregate sub-tree (AggSubtree), the object ID has to be aggregated again and updated. An object ID (ObjectID) having the value of '0' corresponding to a root object of an aggregated CDS can be specified by a device UDN (DeviceUDN) argument. Also, since the aggregate media server is already known from metadata of an object, the DeviceUDN is not required.

FIG. 22 is a table illustrating a case where specific aggregate object information is refreshed on an aggregate media server according to an embodiment of the present invention.

With reference to FIG. 22, a first media server 910 can reconstruct deleted title information of a content object of which the object ID is '11' (ObjectID=12) according to an aggregation refresh action transmitted from a control point device 200.

Now FIG. 18 is described again.

The control point device 200 transmits an aggregation refresh action (RefreshAggregation) including a refresh flag showing 'all of the destroyed objects' (RefreshFlag=AllDestroyedObjects) and a device UDN of which the value is 'aab3' (DeviceUDN=aab3) to the first media server 910, S2317. Next, the first media server 910 re-uses an aggregated object S2321. For example, the first media server 910, in response to a transmitted aggregation refresh action, can refresh the corresponding content object information as shown in FIG. 23. The refresh flag having the value of 'AllDestroyedObjects' can command to request aggregating all of aggregate objects deleted from the object destroy action (DestroyObject). At this time, all of the destroyed objects can indicate the original aggregated objects belonging to an aggregated media server specified by the DeviceUDN argument.

FIG. 23 is a table illustrating a case where all of the aggregate object information discarded on an aggregate media server is refreshed according to an embodiment of the present invention.

With reference to FIG. 23, a first media server 910 can reconstruct deleted title information of a content object of which the originalServerUDN is 'aab3' according to an aggregation refresh action transmitted from a control point device 200.

Now FIG. 18 is described again.

The control point device 200 transmits an aggregation refresh action (RefreshAggregation) including a refresh flag showing 'all of the updated objects' (RefreshFlag=AllUpdatedObjects) and a device UDN of which the value is '78wq' (DeviceUDN=78wq) to the first media server 910, S2319. Next, the first media server 910 re-uses an aggregated object S2321. For example, the first media server 910, in response to a transmitted aggregation refresh action, can refresh the corresponding content object information as shown in FIG. 24. The refresh flag having the value of 'AllUpdatedObjects' can command to request aggregating all of aggregate objects updated by the object update action (UpdateObject). At this time, all of the updated objects can indicate the original aggregated objects belonging to an aggregated media server specified by the DeviceUDN argument.

FIG. 24 is a table illustrating a case where all of the aggregate object information updated on an aggregate media server is refreshed according to an embodiment of the present invention.

With reference to FIG. 24, a first media server 910 can restore updated information of a content object of which the originalServerUDN is '78wq' to the information before the update according to an aggregation refresh action transmitted from a control point device 200.

As described above, the user can change the information of an aggregate object stored in the aggregate media server (AMS) by using the control point device 200. For example, information of an aggregate object may be destroyed or updated, or information may be restored to its original content before the modification such as destruction or update. To this end, the object change command that the control point device 200 can transmit to the aggregate media server (AMS) can include various forms of actions. For example, in addition to the object update action (UpdateObject), the object destroy action (DestroyObject) and the aggregation refresh action (RefreshAggregation) described above, actions such as an destroy object refresh action (RefreshDestroyObject) and an update object refresh action (RefreshUpdateObject), which is not limited to the case above.

The destroy object refresh action (RefreshDestroyObject) can indicate a command to restore all of the objects destroyed on the aggregate media server (AMS). The aggregate media server (AMS) which has received the destroy object refresh action (RefreshDestroyObject) can withdraw the original aggregated object and reconstruct the deleted aggregate objects, which is not limited to the case above.

The update object refresh action (RefreshUpdateObject) can indicate a command to restore a specific object updated within the aggregate media server (AMS). The aggregate media server (AMS) which has receive the update object refresh action (RefreshUpdateObject) can withdraw the original aggregated object and synchronize the corresponding original objects with specific aggregate objects, which is not limited to the case above. Arguments of the update object refresh action (RefreshUpdateObject) can include a name, direction, and related state variable, but are not limited to the items listed above. The argument name can be an object ID (ObjectID), and the direction can include IN, and the related state variable can be A_ARG_TYPE_ObjectID. The action of which the object ID argument is set to □*□ can indicate a command to restore all of the updated objects.

Also, the argument included in the aggregation refresh action (RefreshAggregation) can include a refresh flag and an object ID (ObjectID). Meanwhile, the refresh flag can include refresh deletion, refresh modification, all of the metadata (All), aggregate direct children (AggDirectChildren), aggregate sub-tree (AggSubtree), device UDN, Result, NumberReturned, and TotalMatches in addition to aggregate metadata (AggMetadata), AllDestroyedObjects, and AllUpdatedObjects, which are not limited to the items listed above.

In case the refresh flag is refresh deletion, the corresponding action can correspond to a command to restore all of the objects destroyed within the aggregate media server (AMS). Therefore, if the aggregate media server (AMS) receives an action of which the refresh flag is refresh deletion, the aggregate media server (AMS) can withdraw the original aggregated object and reconstruct the deleted aggregate objects, which is not limited to the case above. After that, the argument of the object ID will be empty.

In case the refresh flag is refresh modification, the corresponding action can correspond to a command to restore updated, specific objects within the aggregate media server (AMS) to the original objects before the update. Therfore, if the aggregate media server (AMS) receives the action of which the refresh flag is refresh deletion, the aggregate media server (AMS) can withdraw the original aggregated object and synchronize specific aggregate objects with the original objects, which is not limited to the case above. Then the argument of the object ID will be empty. The action of which the object ID argument is set to □*□ can indicate a command to restore all of the updated objects.

The refresh flag having the value of 'All' can command to request aggregating all of the objects of an aggregated media server specified by the device UDN argument.

The refresh flag having the value of 'AggDirectChildren' can command to request aggregating direct children objects of aggregated objects specified by the object ID (ObjectID) argument. For this value, the object ID (ObjectID) argument has to indicate a container class object.

The refresh flag having the value of 'AggSubtree' can command to request aggregating all of derived objects such as aggregated objects specified by the object ID (ObjectID) argument. For this value, the object ID (ObjectID) argument has to indicate a container class object.

In this manner, the object ID (ObjectID), as an object identifier (@id of the object), should be aggregated again to be updated in case the refresh flag has the value of AggMetadata, AggDirectChildren, and AggSubtree. The object ID (ObjectID) having the value of '0' corresponding to the root object of an aggregated CDS can be specified by a device UDN (DeviceUDN) argument.

Also, the device UDN (DeviceUDN) of an aggregated media server device in which objects are updated or refreshed can be included in the refresh flag of which the value includes all of the metadata (All), AllDestroyedObjects, and AllUpdatedObjects. The DeviceUDN having the value of '0' corresponding to the aggregated media server of an aggregate media server (AMS) can be the same as the value of the aggregated list state variable.

The argument of the RefreshAggregation can include DeviceUDN argument, Result argument, and NumberReturned argument in addition to the refresh flag and ObjectID described above, which is not limited to the items listed above. The name of the DeviceUDN argument can be DeviceUDN, the direction can be IN, and the related state variable can be A_ARG_TYPE_DeviceUDN. The name of the Result argument can be Result, the direction can be OUT, and the related state variable can be A_ARG_TYPE_Result. The name of the NumberReturned argument can be NumberReturned, the direction can be OUT, and the related state variable can be A_ARG_TYPE_Count. The number of the TotalMatches can be TotalMatches, the direction can be OUT, and the related state variable can be A_ARG_TYPE_Count.

Now FIG. 18 is described again.

The first media server 910 requests specific content metadata from the second media server 930 in response to the aggregation refresh action (RefreshAggregation) transmitted from the control point action S2323. Next, the second media server 930 transmits the request content metadata to the first media server 910, S2325. Although not shown in the figure, the first media server 910 can aggregate specific content metadata from the third media server 950 by using the same method.

Figure 25:
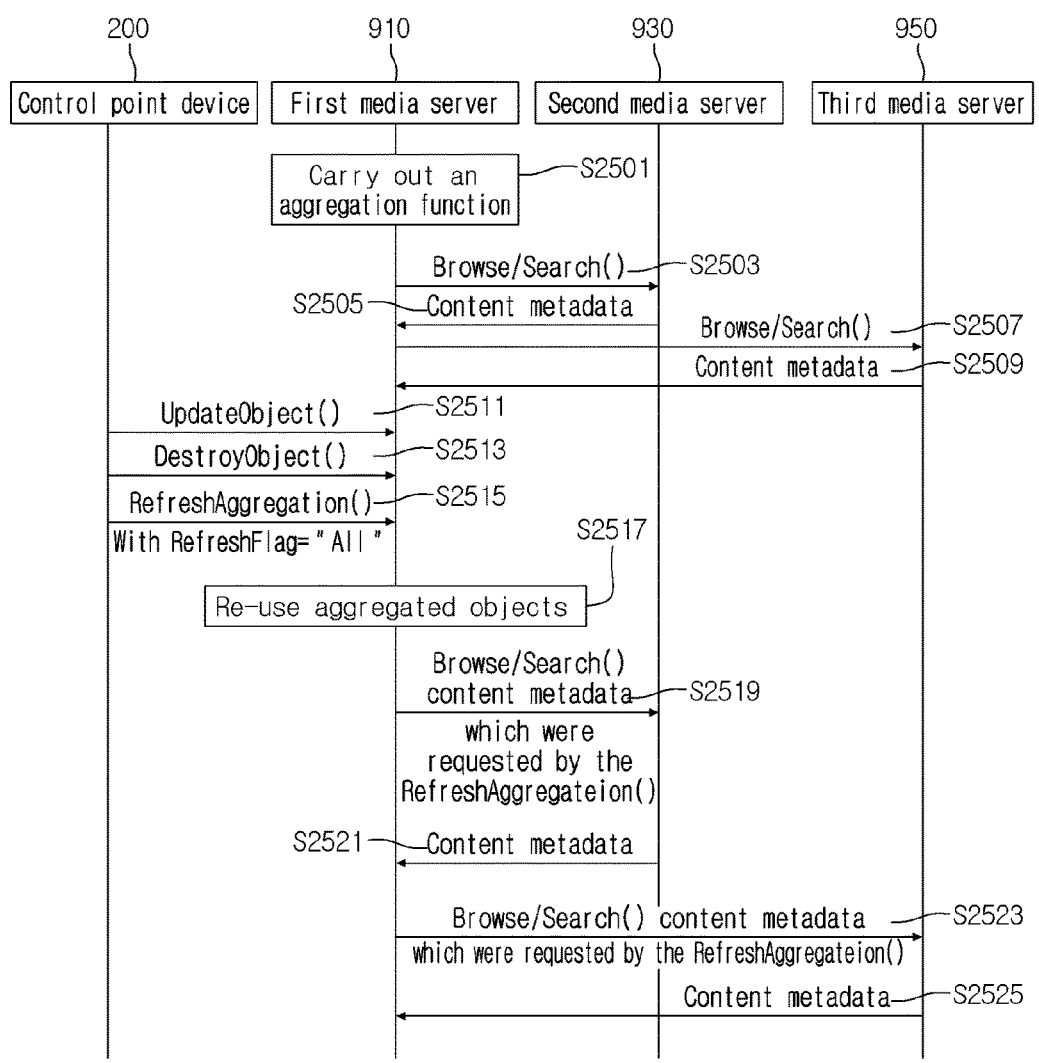
FIG. 25 is a flow diagram illustrating a process where aggregate object information is changed on an aggregate media server according to another embodiment of the present invention.

In what follows, with reference to FIG. 25, described will be a method for an aggregate media server to modify aggregate object information by using a refresh flag having the value of 'all of the metadata (A11)'. In what follows, only the difference from FIG. 18 will be described.

FIG. 25 is a flow diagram illustrating a process where aggregate object information is changed on an aggregate media server according to another embodiment of the present invention.

With reference to FIG. 25, a first media server 910 re-uses 52517 the objects aggregated through the steps S2501 to S2513. As a result, the content objects aggregated by and stored in the first media server 910 can include the information as shown in the table of FIG. 21.

Next, a control point device 200 transmits an aggregation refresh action (RefreshAggregation) including a refresh flag having the value of 'all of the metadata (All)' (Refresh Flag=All) to the first media server 910.

Therefore, the first media server 910 aggregates all of the content metadata respectively from the second media server 930 and the third media server 950 by transmitting a browse/search action corresponding to the aggregation refresh action (RefreshAggregation) to each of the second media server 930 and the third media server 950 S2521, S2525.

In other words, the first media server 910 can refresh the information the same as shown in the table of FIG. 24 in response to the aggregation refresh action (RefreshAggregation) including the refresh flag of which the value is 'all of the metadata (All)' (Refresh Flag=All).

Figure 26:
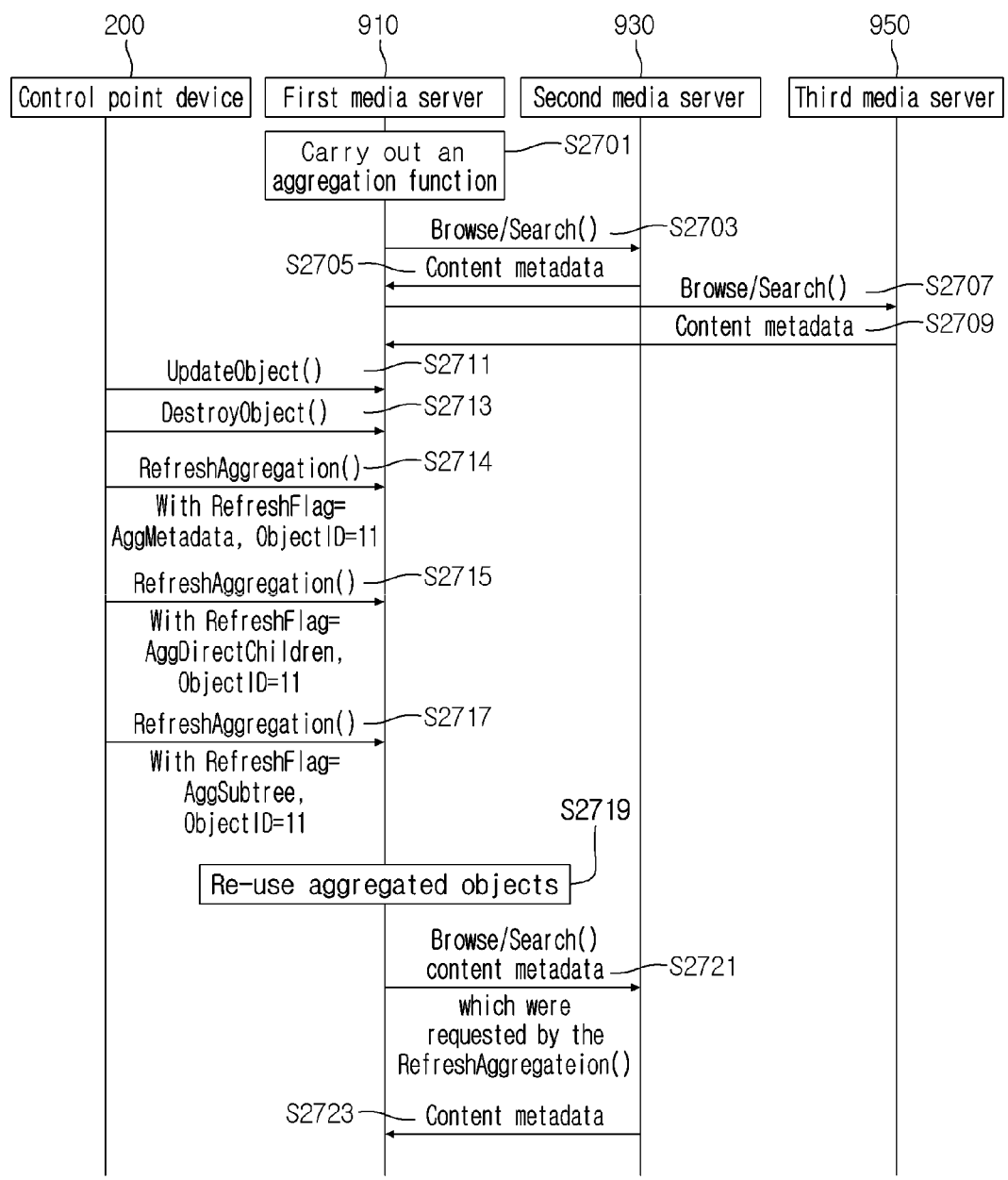
FIG. 26 is a flow diagram illustrating a process where aggregate object information is changed on an aggregate media server according to a yet another embodiment of the present invention.

FIG. 26 is a flow diagram illustrating a process where aggregate object information is changed on an aggregate media server according to a yet another embodiment of the present invention.

With reference to FIG. 26, a first media server 910 carries out an aggregation function S2710. The first media server 910 aggregates content metadata of a second media server 930 and a third media server 950 through the steps S2703 to S2709. The information of the aggregate objects aggregated by the first media server 910 can be stored as shown in the table of FIG. 19.

Next, if the control point device 200 transmits an object update action (UpdateObject) to the first media server 910, S2711, the first media server 910 re-uses aggregate objects according to the object update action (UpdateObject) S2719. The first media server 910 can update the corresponding content object information as shown in FIG. 27 in case an update in response to the transmitted object update action is detected.

FIG. 27 is a table illustrating aggregate object information updated on an aggregate media server according to another embodiment of the present invention.

With reference to FIG. 27, a first media server 910 can update the creatorinformation of a content object of which the object ID is '13' (ObjectID=13), a content object of which the object ID is '16' (ObjectID=16), and a content object of which the object ID is '18' (ObjectID=18) according to an object update action transmitted from a control point device 200.

Now FIG. 26 is described again.

Next, if the control point device 200 transmits S2713 an object destruction action (DestroyObject) to the first media server 910, the first media server 910 re-uses aggregate objects according to the object destruction action (DestroyObject) S2719. In case a destruction action is detected in response to the transmitted object destruction action, the first media server 910 can delete the corresponding content object information as shown in FIG. 28.

FIG. 28 is a table illustrating aggregate object information discarded on an aggregate media server according to another embodiment of the present invention.

With reference to FIG. 28, a first media server 910 can delete information of a content object of which the object ID is '14' according to an object update action transmitted from a control point device 200.

Now FIG. 26 is described again.

If the control point device 200 transmits S2714 to the first media server 910 a refresh flag having the value of 'all of the metadata' (RefreshFlag=AggMetadata) and an aggregation refresh action (RefreshAggregation) including an object ID of which the value is '11' (ObjectID=11) S2714, the first media server 910 re-uses aggregated objects S2719. For example, the first media server 910 can re-use aggregate objects according to the aggregation refresh action. In response to the transmitted aggregation refresh action, the first media server 910 can refresh information of an aggregated object of which the object ID is '11' as shown in FIG. 29.

FIG. 29 is a table illustrating a case where specific aggregate object information is refreshed on an aggregate media server according to another embodiment of the present invention.

With reference to FIG. 29, a first media server 910 can refresh information of a content object of which the object ID is '11' to the original information before modification due to update or modification due to deletion according to an aggregation refresh action transmitted from a control point device 200.

Now FIG. 26 is described again.

If the control point device 200 transmits S2715 an aggregation refresh action (RefreshAggregation) including a refresh flag having the value of 'AggDirectChildren' and an aggregation refresh action (RefreshAggregation) including an object ID of which the value is '11' (ObjectID=11), the first media server 910 re-uses aggregate objects according to the aggregation refresh action (RefreshAggregation) S2719. In response to the transmitted aggregation refresh action, the first media server 910 can refresh information of a direction children object of an aggregated object of which the object ID is '11' as shown in FIG. 30.

FIG. 30 is a table illustrating a case where specific aggregate object information is refreshed on an aggregate media server according to a yet another embodiment of the present invention.

With reference to FIG. 30, according to an aggregation refresh action transmitted from a control point device 200, a first media server 910 can refresh information of direct children objects of a content object of which the object ID is '11', for example, information of a content object of which the object ID is '13' and information of a content object of which the object ID is '14' to the original information before modification due to update or modification due to deletion.

Now FIG. 26 is described again.

If the control point device 200 transmits a refresh flag having the value of 'AggSubtree' (RefreshFlag=AggSubtree) and an aggregation refresh action (RefreshAggregation) including an object ID of which the value is '11' (ObjectID=11) to the first media server 910 S2717, the first media server 910 re-uses aggregate objects according to the aggregation refresh action (RefreshAggregation) S2719. In response to the transmitted aggregation refresh action, the first media server 910 can refresh the whole information of a derived object such as a subtree of an aggregated object of which the object ID is '11' as shown in FIG. 31.

FIG. 31 is a table illustrating a case where specific aggregate object information is refreshed on an aggregate media server according to a still another embodiment of the present invention.

With reference to FIG. 31, according to an aggregation refresh action transmitted from a control point device 200, a first media server 910 can refresh information about subtree objects of a content object of which the object ID is '11', for example, information of a content object of which the object ID is '16' and information about a content object of which the object ID is '18' to the original information before modification due to update.

In case an error occurs during the aggregation refresh as described above, largely three error codes can occur. The error codes can include 701, 720, and 742 codes, which are not limited to the example above.

The error code 701 corresponds to the case where there is no corresponding object (No such object); since a specified object ID argument is not valid, it can indicate the case where a request for an aggregation refresh action (RefreshAggregation) has failed.

The error code 720 corresponds to the case where a request cannot be processed, which can indicate the case where a content directory service is unable to calculate the total number of objects matched to establish refresh criteria within the time allotted and the content directory service is unable to additionally return objects matching the corresponding refresh criteria.

The error code 742 is an unsupported action, which can indicate that a request for an aggregation refresh action (RefreshAggregation) is supported only when the value of the aggregation mode state variable is '1'. However, the requested action may not be supported when the value of a current state variable is '0'.

In what follows, with reference to FIG. 32, described will be the information of an aggregated media server stored in an aggregate media server according to an embodiment of the present invention.

FIG. 32 illustrates aggregated media server related information of XML type stored in an aggregate media server according to an embodiment of the present invention.

It is necessary for a control apparatus to obtain information about each of a plurality of aggregated media servers, for example, a list, power states, aggregation criteria, and aggregation process through an aggregate media server. To control more detail information of an aggregated media server, the control apparatus can control from which media server an aggregate media server aggregates content objects, a power state within each aggregated media server, and type of content object to be aggregated by the aggregate media server.

In what follows, described will be actions and state variables for obtaining or configuring more information of a plurality of aggregated media servers through an aggregate media server.

An aggregate media server can store aggregated media server information by using a state variable. Aspects of such a state variable can include a name, data type and data format. The name of a state variable can be AggregationStatus, data type can be XML fragment, and data format can include multiple elements and multiple attributes. The data format can be specified as shown in FIG. 32.

To control the aforementioned aggregated media server information, the aggregate media server (AMS) can make use of an aggregation status get action ((GetAggregationStatus) and an aggregation status set action (SetAggregationStatus).

The name of the aggregation status get action is GetAggregationStatus, and an argument which includes a name, direction, and related state variable can be defined. The argument name can be CurrentAggregationStatus, the direction can be OUT, and the related state variable can be AggregationStatus. The aggregate media server (AMS) can obtain information about a current aggregation status of an aggregated media server by using the aggregation status get action (GetAggregationStatus).

The name of the aggregation status set action is SetAggregationStatus, and an argument which includes a name, direction, and related state variable can be defined. The argument name can be NewAggregationStatus, the direction can be IN, and the related state variable can be AggregationStatus. The aggregate media server (AMS) can newly set up the aggregation status of an aggregated media server by using the aggregation status set action (SetAggregationStatus).

Meanwhile, it is necessary for a control apparatus to remove or modify the original aggregated objects on the aggregated media server (ADMS) by operating the aggregate media server (AMS) instead of the aggregated media server (ADMS). To this end, the control apparatus can redirect the request message described with reference to FIGS. 33 to 36 to the original aggregated media server.

Figure 33:
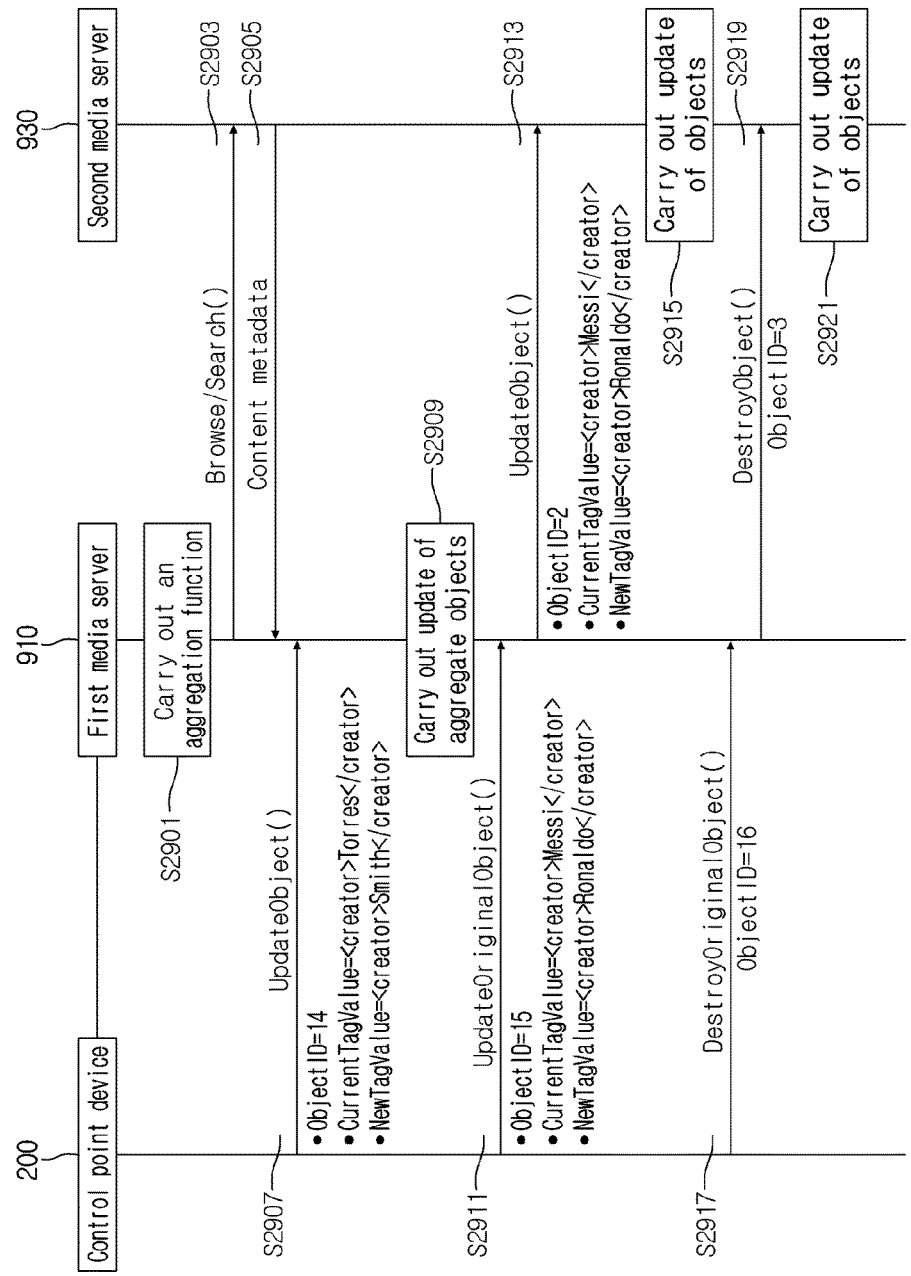
FIG. 33 is a flow diagram illustrating a method for an aggregate media server to change content objects within an aggregated media server by re-transmitting a request received from a control point device to the aggregated media server according to an embodiment of the present invention.

FIG. 33 is a flow diagram illustrating a method for an aggregate media server to change content objects within an aggregated media server by re-transmitting a request received from a control point device to the aggregated media server according to an embodiment of the present invention.

Also, FIGS. 34 to 37 illustrate tables representing information stored in an aggregate media server and an aggregated media server in case an aggregate media server transmits a request received from a control point device to an aggregated media server according to an embodiment of the present invention.

With reference to FIG. 33, a first media server 910 carries out an aggregation function as an aggregate media server (AMS) S2901, transmits S2903 a browse/search request to a second media server 930, and receives S2905 content metadata from the second media server 930. As shown in FIG. 34, the first media server 910 can store content metadata aggregated from the second media server 930. With reference to FIG. 34, the first media server 910 can store a plurality of information such as an aggregated object ID (aggregatedObjectID) of the content object assigned by the second media server 930, an object ID (ObjectID) of a content object newly assigned by the second media server 930, an originalServerUDN corresponding to the server UDN (aab3) of the second media server 930, parent ID (parentID) of each content object, and creator information of each content object.

Now FIG. 33 is described again.

The control point device 200 transmits an object update action (UpdateObject) to the first media server 910 S2907. At this time, the object update action (UpdateObject) can include an object ID of which the value is '14' (ObjectID=14), a current tag value of creator information of which the value is 'Torres' (CurrentTagValue=<creator>Torres</creator>, and a new tag value of creator information of which the value is 'Smith' (NewTagValue=<creator>Smith</creator>.

With reference to FIG. 33, the first media server 910 carries out update of aggregate object information in response to the object update action (UpdateObject) received from the control point device 200 S2909. In other words, the first media server 910 can modify content object information stored in the first media server 910 according to the control of the control point device 200. In other words, the first media server 910 can update the creator information of which the value is 'Torres' with the object ID of '14' (ObjectID=14) into 'Smith'.

Now FIG. 33 is described again.

Next, the control point device 200 transmits the original object update action (UpdateOriginalObject) to the first media server 910 S2911. The original object update action (UpdateOriginalObject) can include various types of argument information. The argument can include a name, direction, and related state variable. The argument name can be ObjectID, the direction can be IN, and the related state variable can be A_ARG_TYPE_ObjectID. Also, the argument name can be CurrentTagValue, the direction can be IN, and the related state variable can be A_ARG_TYPE_TagValueList. Also, the argument name can be NewTagValue, the direction can be IN, and the related state variable can be A_ARG_TYPE_TagValueList. Also, the argument name can be AggregatedCDSID, the direction can be IN, and the related state variable can be A_ARG_TYPE_UDN or AggregatedDeviceList. The aggregated CDS ID can indicate the original server UDN.

For example, the original object update action (UpdateOriginalObject) can include an object ID of which the value is '15' (ObjectID=15), a current tag value of creator information of which the value is 'Messi' (CurrentTageValue=<creator>Messi</creator>, and a new tag value of creator information of which the value is 'Ronaldo' (NewTagValue=<creator>Ronaldo</creator>.

Next, the first media server 910 transmits an object update action (OriginalObject) to the second media server 930 S2913. At this time, the object update action (UpdateObject)

can include an object ID of which the value is '2' (ObjectID=2), a current tag value of creator information of which the value is 'Messi' (CurrentTageValue=<creator>Messi</creator>, and a new tag value of creator information of which the value is 'Ronaldo' (NewTagValue=<creator>Ronaldo</creator>.

With reference to FIG. 36, the second media server 930 carries out update of object information in response to the object update action (UpdateObject) received from the first media server 910 S2915. In other words, the second media server 930 can modify the content object information stored in the second media server 930 according to the control of the control point device 200. In other words, the second media server 930 can update the creator information of which the value is 'Messi' with an object ID of '2' (ObjectID=2) to the value of 'Ronaldo'. In this manner, the first media server 910 can modify the information within the second media server 930 by re-transmitting the action transmitted from the control point device 200 to the second media server 930.

Now FIG. 33 is described again.

Next, the control point device 200 transmits an original object destroy action (DestroyOriginalObject) to the first media server 910 S2917. At this time, the original object destroy action (DestroyOriginalObject) can include the information of which the object ID is '16' (ObjectID=16).

Next, the first media server 910 transmits an object destroy action (DestroyObject) to the second media server 930 S2919. At this time, the object destroy action (DestroyObject) can include the information of which the object ID is '3' (ObjectID=3).

With reference to FIG. 37, the second media server 930 carries out update of object information in response to an object destroy action (DestroyObject) received from the first media server 910 S2921. In other words, the second media server 930 can delete the content object information stored in the second media server 930 according to the control of the control point device 200. To rephrase, the second media server 930 can delete the information corresponding to the object ID of '3' (ObjectID=3). In this manner, the first media server 910 can modify the information within the second media server 930 by re-transmitting the action transmitted from the control point device 200 to the second media server 930.

Figure 38:
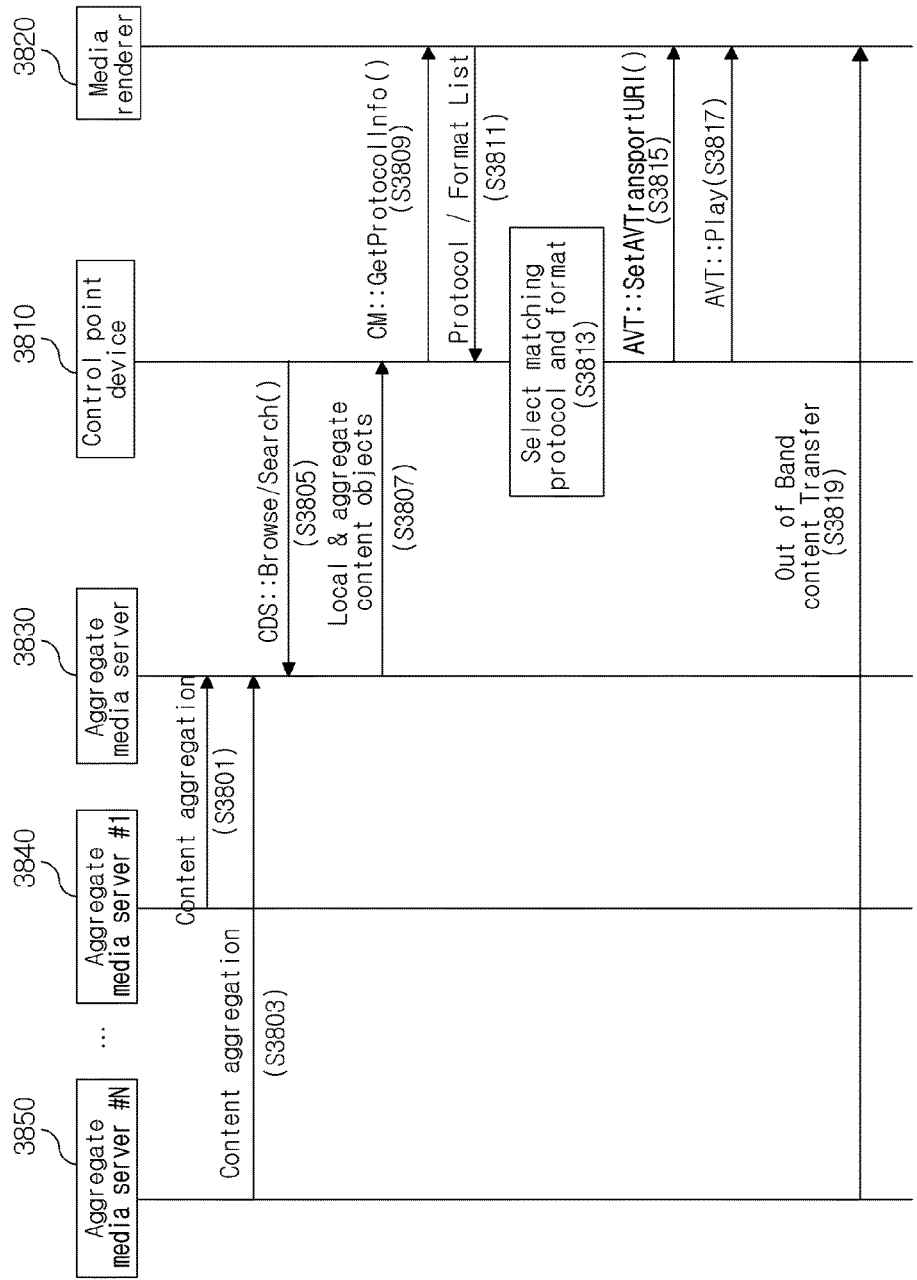
FIG. 38 illustrates an overall structure among devices for controlling and playing content information aggregated from a plurality of servers according to one embodiment of the present invention.

FIG. 38 illustrates an overall structure among devices for controlling and playing content information aggregated from a plurality of servers according to one embodiment of the present invention.

FIG. 38 illustrates an overall structure of an AV home network based on UPnP which provides a service by aggregating content information from multiple media servers. As shown in FIG. 38, an AV home network can comprise a plurality of media servers (MSs) 3830, 3840, 3850 providing media data to the home network; a media renderer (MR) 3820 playing media data through the home network; a control point device 3810 controlling the plurality of media servers 3830, 3840, 3850 and the media renderer 3820, where a plurality of media servers can comprise an aggregate media server 3830 carrying out a content aggregate function and aggregated media servers 3840, 3850 which are targets of content information aggregation. Meanwhile, the plurality of media servers 3830, 3840, 3850 and the media renderer 3820 are controlled devices controlled by the control point 3810.

The aggregate media server 3830 (to be precise, the content directory service (CDS) within the aggregate media server 3830) can pre-build the object information aggregated from other aggregated media servers 3840, 3850 and information about media files stored in the aggregate media server itself and containers (which correspond to directories) as separate object information. The 'object' is a term used to collectively refer to the container having information about a directory and an item having information about one or more media files; an object may be an item or a container depending on situations. And one item can correspond to a plurality of media files. For example, a plurality of media files having the same content but with different bit rates can be managed as one item.

FIG. 38 briefly illustrates a signal flow among devices with respect to a media play process carried out in a network, and the following describe the illustrated play process. First of all, various embodiments related to an aggregation function according to the present invention can be applied to the aggregate media server 3830; in the case of FIG. 38, content information is aggregated S3801 from an aggregated media server #1 3840, and content information is aggregated S3803 from an aggregated media server #N 3850.

In order to inform the control point 3810 of information about a directory and a media file under the corresponding directory, the aggregate media server 3830 can inform of the information about a current directory and of the item information about media files under the directory S3807, each time an UPnP action 141 according to the user's request, for example, a browsing and/or searching action is carried out S3805. The control point 3810 can carry out an action for obtaining protocol information on the media renderer (MR) 3820 S3809 and obtain information about a protocol and format that the media renderer (MR) 3820 accepts S3811. The control point 3810 can select a matching protocol and format among the protocols and formats obtained S3813.

The control point 3810 can remove information about an item not compliant with the acceptable protocol provided by the media renderer (MR) 3820 from the received information about objects and displays the resultant information to the user through an appropriate UI. If the user selects one item (or one media file of specific quality to which the item belongs) through the UI, the control point 3810 can request a connection prepare action (PrepareForConnection) from each of the aggregate media server 3830 and the media renderer (MR) 3820 to present the selected media file (in what follows, it is also called a 'component' or a 'media component') and receive instance IDs about participating elements (CM, AVT, RCS) required for presentation through streaming between the two devices 3820, 3830 (not shown).

The instance ID is used to specify and control a streaming service to be carried out at the moment. And the control point 3810 can deliver access position information about the component previously selected to an AVTransport service and set the access position to the AVTransport service S3815; and request a play action from the AVTransport service S3817. For example, the control point 3810 can transmit the URL information of an object aggregated from the aggregated media server #N 3850. The media renderer (MR) 3820 may play the media file of the aggregated media server #N 3850 by using the transmitted URL information S3819.

The AVTransport service is implemented in a media renderer, but may be implemented in a media server. Data of a component selected through an appropriate information exchange process between the media renderer (MR) 3820 and the aggregate media server 3830 can be streamed to output.

Meanwhile, streaming of a media component employs two methods, namely, push and pull methods; the difference between the push and pull methods results only from the fact that devices equipped with the AVTransport service for play management of streaming or devices employed for the play management are different from each other and accordingly, direction of an action differs depending on whether a target of an action is a media server or a media renderer. Therefore, a method of carrying out an action according to the present invention is the same for both of the push and the pull methods; interpretation of the technical scope claimed by the present invention is not limited to the appended drawings and the methods employed for describing the present invention.

Figure 39:
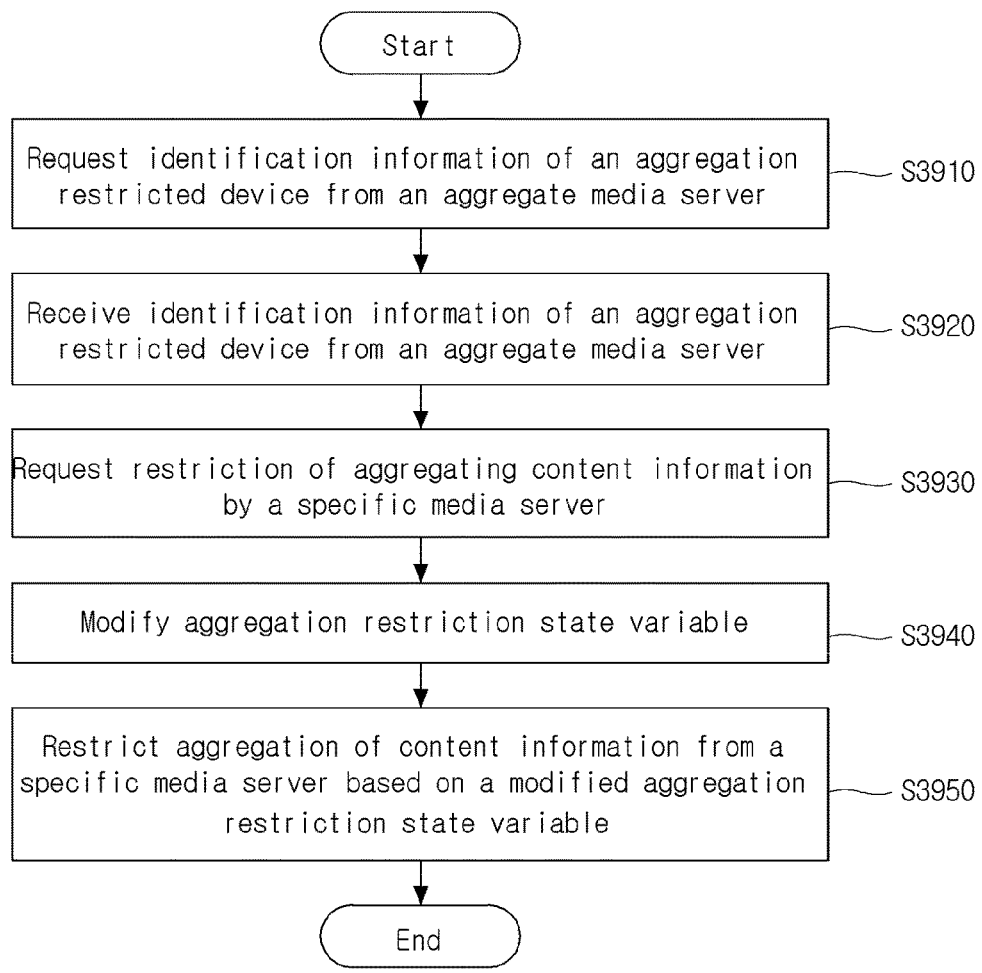
FIG. 39 is a flow diagram illustrating a method for restricting aggregation of content information from a specific aggregated media server according to one embodiment of the present invention.

FIG. 39 is a flow diagram illustrating a method for restricting aggregation of content information from a specific aggregated media server according to one embodiment of the present invention.

As one embodiment of the present invention, the user may want an aggregate media server to aggregate content information only from a specific media server. Due to this reason, a control point device should be capable of excluding a specific aggregated media server from among aggregated media servers from which a current aggregate media server aggregates content information.

Also, as another embodiment of the present invention, the user may want the aggregate media server to aggregate content information again from the excluded specific media server. Due to this reason, the control point device should be capable of adding a specific media server to a list of aggregated media servers from which a current aggregate media server aggregates content information.

To achieve the objective above, according to an embodiment of the present invention, aggregation of content information from a specific media server can be restricted by changing an aggregation restriction state variable by using identification information of an aggregation restricted device.

With reference to FIG. 39, first of all, the control point device can request from an aggregate media server identification information of an aggregation restricted device of which the content information is not allowed to be aggregated S3910. At this time, the aggregate media server can store an aggregation restriction state variable, and the aggregation restriction state variable can include identification information of an aggregation restricted device of which the content information is not allowed to be aggregated by the aggregate media server. The aggregation restriction state variable can be expressed in the form of a list, and the identification information can include a unique device number (hereinafter, it is called a UDN).

At this time, with reference to FIGS. 42 and 44, as embodiments to which the present invention is applied, FIG. 42 illustrates action information for obtaining identification information of an aggregation restricted media server of which the content information is not allowed to be aggregated by an aggregate media server, and FIG. 44 illustrates a state variable used for action information of FIG. 42. Requesting identification information of an aggregation restricted device in the S3910 stop can be carried out by the GetAggregationRestrictedDevices action of FIG. 42. The GetAggregationRestrictedDevices action produces a current value of the aggregation restriction state variable. The aggregation restriction state variable can include identification information of a media server of which the content is not allowed to be aggregated by an aggregate media server and can be expressed by AggregationRestrictedDevices. The aggregation restriction state variable is not modified by the change of an aggregation mode.

According to the request, the control point device can receive identification information of an aggregation restricted device of which the content information is not currently allowed to be aggregated by the aggregate media server S3920. The control point device, by receiving identification information of the aggregation restricted device, can check the aggregation restricted device of which the content information is not currently allowed to be aggregated.

In case the user attempts to restrict aggregation of content information by a specific media server, the control point device can request from the aggregate media server restriction of aggregating content information by a specific media server S3930. At this time, the user's request for restriction can include identification information of the specific media server and can be carried out by the user interface or a network interface.

With reference to FIGS. 43 and 44, as embodiments to which the present invention is applied, FIG. 43 illustrates action information for obtaining identification information of an aggregation restricted media server of which the content information is not allowed to be aggregated by an aggregate media server, and FIG. 44 illustrates a state variable used for action information of FIG. 43. Requesting restriction of aggregating content information by a specific media server in the S3930 step can be carried out by the SetAggregationRestrictedDevices action of FIG. 43. The SetAggregationRestrictedDevices action modifies a current value of the aggregation restriction state variable and can be used to restrict aggregation of content metadata by a specific media server. The aggregation restriction state variable can include identification information of a media server of which the content is not allowed to be aggregated by an aggregate media server and can be expressed by AggregationRestrictedDevices.

Receiving a request for content information aggregation restriction from a specific media server, the aggregate media server can modify the aggregation restriction state variable based on the identification information of the specific media server S3940. For example, the aggregate media server can modify the identification information of an aggregation restricted device included in the aggregation restriction state variable into the identification information of the specific media server.

The aggregation media server is made not to aggregate content information from the specific media server based on the modified aggregation restriction state variable S3950. In this case, if there is an aggregated media server being included in the aggregation restriction state variable before the modification but not corresponding to the specific media server, the aggregate media server can start aggregating content information from the aggregated media server after modification of the aggregation restriction state variable. On the other hand, if there is an aggregated media server not being included in the aggregation restriction state variable before the modification but corresponding to the specific media server, aggregation of content information from the corresponding aggregated media server can be stopped after modification of the aggregation restriction state variable.

In this manner, an aggregate media server can restrict aggregation of content information from a specific media server by modifying an aggregation restriction state variable according to a content information restriction request.

Figure 40:
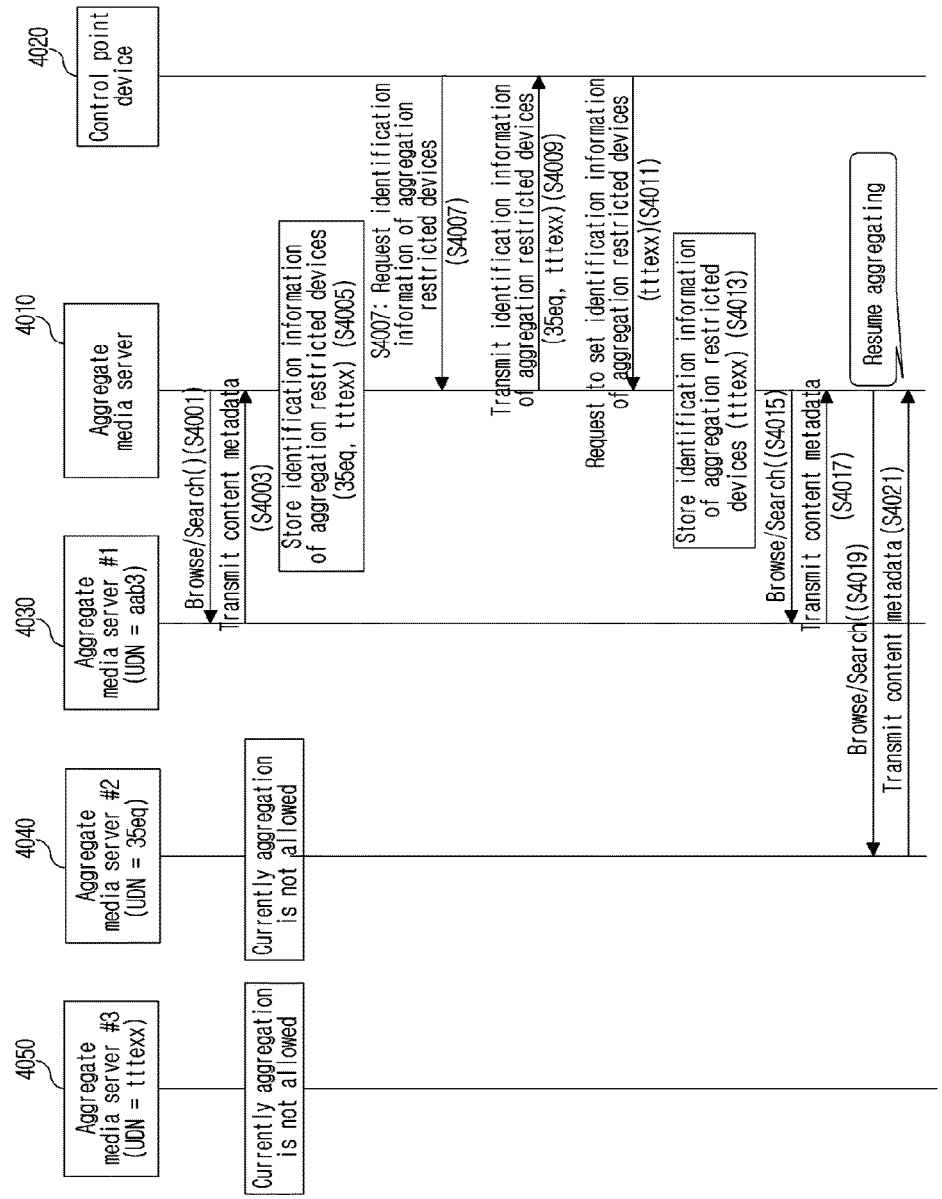
FIG. 40 is a flow diagram illustrating a process of restricting aggregation of content information from an aggregation restricted media server by using identification information of an aggregation restriction device according to one embodiment of the present invention.

FIG. 40 is a flow diagram illustrating a process of restricting aggregation of content information from an aggregation restricted media server by using identification information of an aggregation restriction device according to one embodiment of the present invention.

With reference to FIG. 40, an aggregate media server 4020, three aggregated media servers 4030, 4040, 4050 and a control point device 4010 are connected to a network to which the present invention is applied. The aggregate media server 4020 can aggregate content information from the three aggregated media servers 4030, 4040, 4050; however, in the present embodiment, it is assumed that an aggregated media server#2 4040 and an aggregated media server#3 4050 are in an aggregation restriction state.

In this case, the aggregate media server 4020 is unable to aggregate content information from the aggregated media server #2 4040 and the aggregated media server #3 4050; and the aggregate media server 4020 can store identification information of an aggregation restricted device. Therefore, the user, by requesting modification of the identification information of the aggregation restricted device stored in the aggregate media server 4020, can again aggregate content information from the aggregation restricted device of which the content information is not allowed to be aggregated. In what follows, more details about the process will be described.

First of all, the aggregate media server 4020 can transmit a browsing action and/or a searching action to request content information from the aggregated media server#1 4030 S4001. According to the action request, the aggregate media server 4020 can receive content information from the aggregated media server #1 4030 S4003. At this time, the content information can include content metadata.

Meanwhile, the aggregate media server 4020 can store identification information of the aggregation restricted device of which the content information is not currently allowed to be aggregated S4005. For example, as shown in FIG. 40, identification information of an aggregation restricted device can include the identification information (UDN=35eq) of the aggregated media server#2 4040 and identification information (UDN=tttexx) of the aggregated media server#3 4050.

The control point device 4010 can request from the aggregate media server 4020 identification information of the aggregation restricted device of which the content information is not currently allowed to be aggregated S4007.

According to the request, the control point device 4010 can receive identification information of the aggregation restricted device of which the content information is not currently allowed to be aggregated by the aggregate media server 4020 S4009. For example, the control point device 4010 can receive identification information (UDN=35eq) of the aggregated media server#2 4040, which is the identification information of the aggregation restricted device stored in the aggregate media server 4020, and identification information (UDN=tttexx) of the aggregated media server#3 4050. By doing so, the control point device can check the aggregation restricted device of which the content information is not currently allowed to be aggregated.

In case the user attempts to restrict aggregation of content information from a specific media server, the control point device 4010 can request the aggregate media server 4020 to restrict aggregation of content information from a specific media server S4011.

For example, the control point device 4010 can request the aggregate media server 4020 to set identification information of a specific media server of which the content information is not allowed to be aggregated. In other words, the aggregate media server 4020 can set identification information of the specific media server into the identification information list of aggregation restricted devices stored.

Therefore, as only the identification information of the specific media server is updated in the identification information list of aggregation restricted devices stored, aggregation of content information only from the specific media server is restricted for the aggregate media server 4020, but aggregation of content information from the other aggregated media servers is allowed again.

For example, with reference to FIG. 40, the control point device 4010 transmits identification information (UDN=35eq) of the aggregated media server#2 4040, and the aggregate media server 4020 can store the identification information (UDN=35eq) of the received aggregated media server#2 4040 by setting the identification information to the identification information list of aggregation restricted devices S4013.

The aggregate media server 4020 is made not to aggregate content information from the aggregated media server#2 4040 based on the identification information list of the aggregation restricted devices set above.

Since the aggregated media server #1 4030 is not included in the identification information list of aggregation restricted devices, the aggregate media server 4020 can receive content information from the aggregated media server #1 4030 through a browsing action and/or searching action S4015, S4017.

On the other hand, since identification information (UDN=35 eq) of the aggregated media server #2 4040 once included in the identification information list of the aggregation restricted devices before the setting has been deleted, the aggregate media server 4020 can again aggregate content information from the aggregated media server #2 4040 through a browsing action and/or a searching action S4019, S4021.

Figure 41:
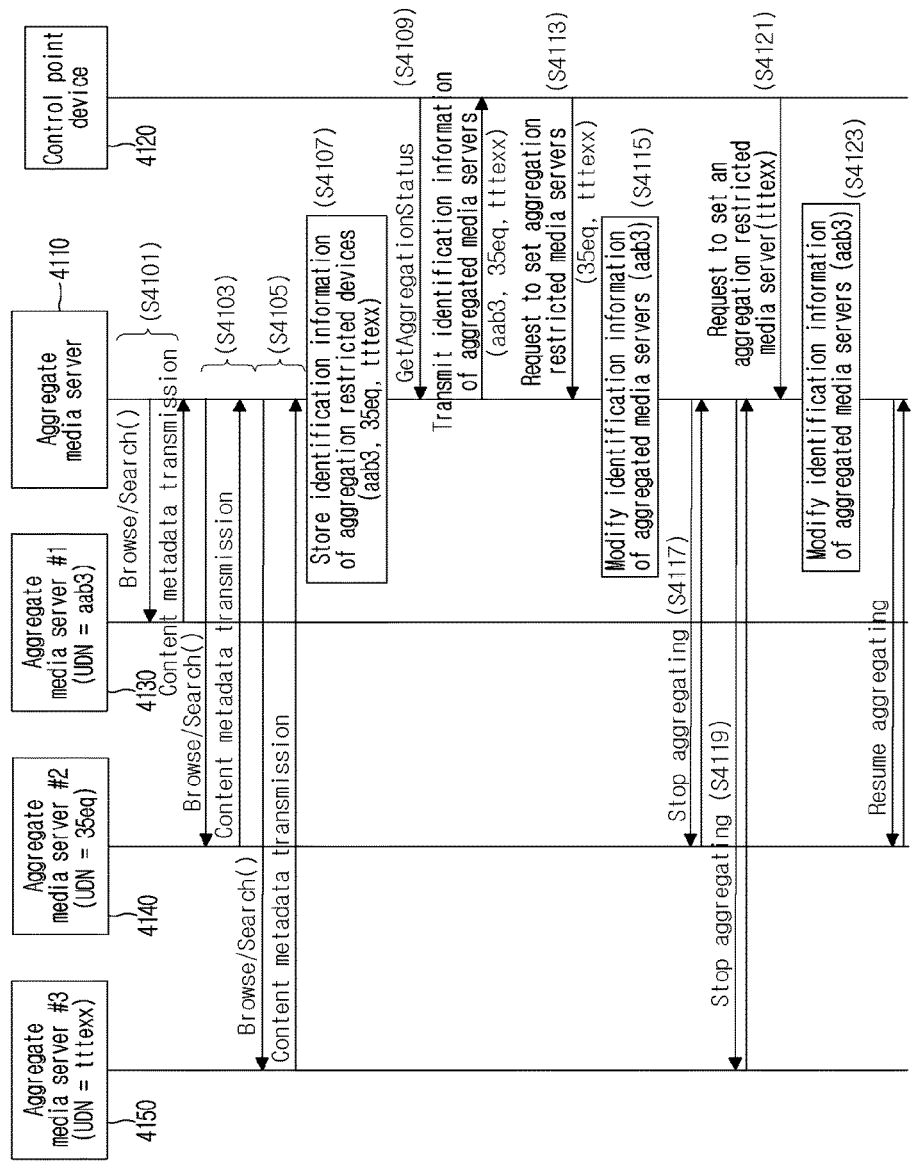
FIG. 41 is a flow diagram illustrating a process of restricting aggregation of content information from an aggregation restricted media server by using identification information of an aggregated media server according to one embodiment of the present invention.

FIG. 41 is a flow diagram illustrating a process of restricting aggregation of content information from an aggregation restricted media server by using identification information of an aggregated media server according to one embodiment of the present invention.

The present embodiment obtains identification information of an aggregated media server according to a request for obtaining information about the aggregated media server and restricts aggregation of content information according to a setting request.

First of all, an aggregate media server 4120 can transmit a browsing action and/or a searching action for requesting content information from aggregated media servers #1, #2, #3 (4130, 4140, 4150), and according to the request for an action, the aggregate media server 4120 can receive content information from the aggregated media servers #1, #2, #3 (4130, 4140, 4150) S4101, S4103, S4105. At this time, the content information can include content metadata, and the content metadata can include identification information of the aggregated media servers #1, #2, #3.

The aggregate media server 4120 may store identification information of the aggregated media server of which the content information is currently allowed to be aggregated S4107. For example, as shown in FIG. 41, identification information of the aggregated media server of which the content information is allowed to be aggregated can include identification information (UDN=aab3) of the aggregated media server #1 4130, identification information (UDN=35eq) of the aggregated media server #2 4140, and identification information (UDN=tttexx) of the aggregated media server #3 4150.

Meanwhile, the control point device 4110 can request the aggregate media server 4120 to obtain the status information of an aggregated media server S4109. According to the request, the aggregate media server 4120 can transmit identification information (UDN=aab3, 35eq, tttexx) of aggregated media servers stored in the aggregate media server 4120 to the control point device 4110. By doing so, the control point device 4110 can check an aggregated media server of which the content is currently allowed to be aggregated.

If the user attempts to restrict aggregation of content information from a specific media server, the control point device 4110 can request the aggregate media server 4120 to set an aggregation restricted device of which the content information is not currently allowed to be aggregated S4113. For example, with reference to FIG. 41, the control point device 4110 can transmit identification information (UDN=35eq) of the aggregated media server #2 4140 and identification information (UDN=tttexx) of the aggregated media server #3 4150 as identification information of the aggregation restricted device.

The aggregate media server 4120 can set the identification information of the aggregation restricted device by modifying an identification information list of aggregated media servers stored S4115. In other words, by deleting the identification information of the aggregation restricted device from the identification information list of aggregated media servers, the setting can be carried out. For example, by deleting the transmitted, identification information (UDN=35eq, tttexx) of the aggregation restricted device from a pre-stored identification information list (UDN=aab3, 35eq, tttexx) of aggregated media servers, the identification information list of aggregated media servers can be modified.

Therefore, the aggregate media server 4120 is allowed to aggregate content information only from an aggregated media server (UDN=aab3) belonging to the identification information list of the aggregated media servers.

And the aggregate media server 4120 is made not to aggregate content information from the aggregated media server #2 4140 and the aggregated media server #3 4150 which do not belong to the modified, identification information list of the aggregated media servers S4117, S4119.

Afterwards, in case a request for setting an aggregation restricted device is received again from the control point device 4110 S4121, the aggregate media server 4120 modifies the identification information list of the aggregated media servers stored S4123. For example, in case it is requested to set the aggregated media server #3 4150 (UDN=tttexx) as an aggregation restricted device, the identification information list of the aggregated media servers is modified to include UDN=aab3, 35eq and the aggregate media server 4120 is again allowed to aggregate content information from the aggregated media server #2 4140 S4125.

Figure 45:
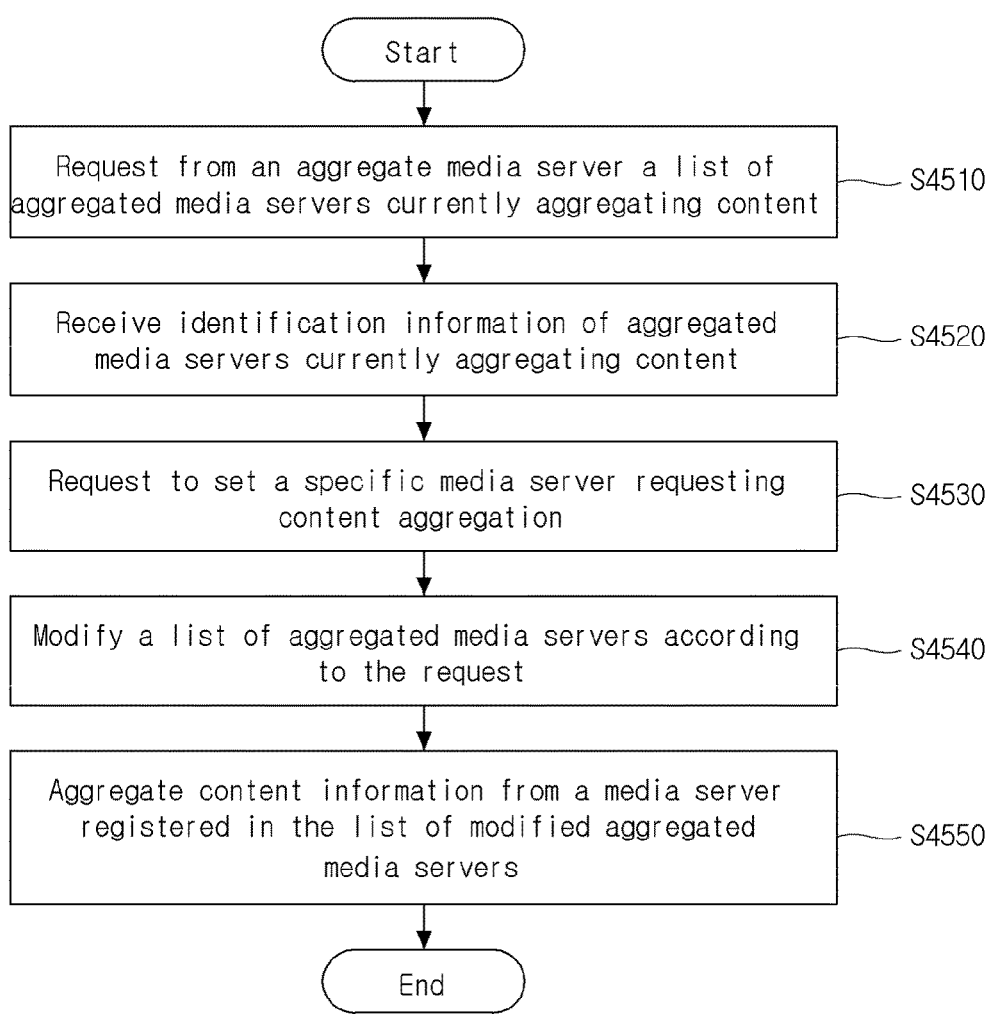
FIG. 45 is a flow diagram illustrating a method for aggregating content information only from a specific media server according to another embodiment of the present invention.

FIG. 45 is a flow diagram illustrating a method for aggregating content information only from a specific media server according to another embodiment of the present invention.

As one embodiment of the present invention, the user may want to aggregate content information only from a specific media server. Due to this reason, a control point device transmits identification information of a specific media server of which the content information is allowed to be aggregated so that an aggregate media server can aggregate content information from the specific media server.

With reference to FIG. 45, the control point device first can request from an aggregate media server a list of aggregated media servers of which the content information is currently being aggregated S4510.

According to the request, the control point device can receive from the aggregate media server identification information of an aggregated media server of which the content information is currently being aggregated S4520. The control point device, by receiving identification information of the aggregated media server, can check aggregated media servers of which the content information is currently being aggregated.

In case the user attempts to restrict aggregation of content information from a specific media server, or to aggregate content information only from a specific media server, the control point device can request the aggregate media server to set the specific media server of which the content information is required to be aggregated S4530. At this time, the request for setting the specific media server can include identification information of the specific media server and can be carried out by a user interface or a network interface.

Receiving a request for setting a specific media server, the aggregate media server can update the list of aggregated media servers based on the identification information of the specific media server S4540. For example, the aggregate media server can modify the list of the aggregated media servers so that only the identification information of the specific media server can be included.

The aggregate media server can aggregate content information from a media server registered in the updated list of aggregated media servers S4550.

As described above, the user can easily select an aggregated media server by making an aggregate media server manage a list of media servers of which the content information is required to be aggregated.

Figure 46:
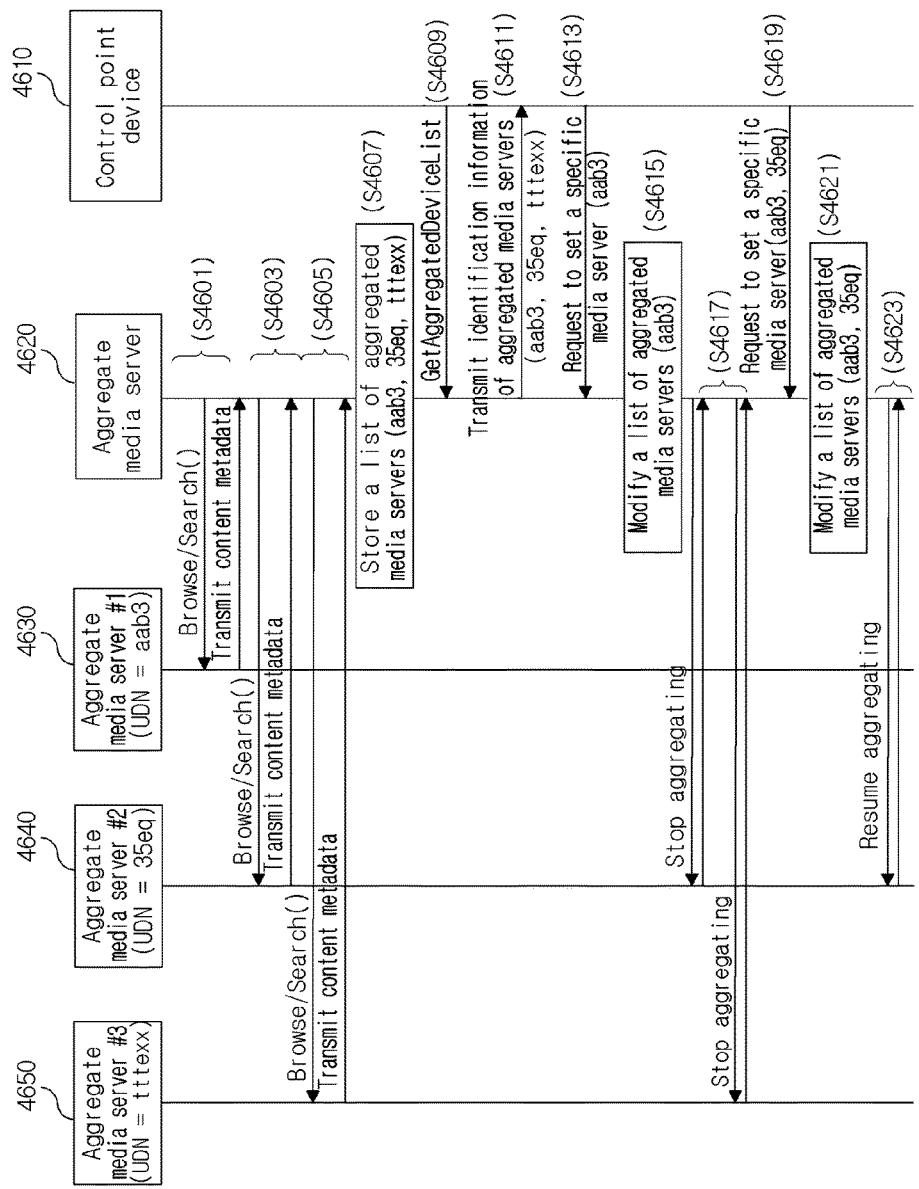
FIG. 46 is a flow diagram illustrating a process of carrying out aggregation of content information only from a specific media server through aggregated media server list setting according to one embodiment of the present invention.

FIG. 46 is a flow diagram illustrating a process of carrying out aggregation of content information only from a specific media server through aggregated media server list setting according to one embodiment of the present invention.

With reference to FIG. 46, an aggregate media server 4620 can transmit a browsing action and/or a searching action for requesting content information to aggregated media servers #1, #2, #3 (4630, 4640, 4650), and according to the request for an action, the aggregate media server 4620 can receive content information from the aggregated media servers #1, #2, #3 (4630, 4640, 4650) S4601, S4603, S4605. At this time, the content information can include content metadata, and the content metadata can include identification information of the aggregated media servers #1, #2, #3.

The aggregate media server 4620 can store identification information of the aggregated media servers of which the content information is currently allowed to be aggregated S4607. For example, as shown in FIG. 46, identification information of the aggregated media servers of which the content information is currently allowed to be aggregated can include identification information (UDN=aab3) of the aggregated media server #1 4630, identification information (UDN=35eq) of the aggregated media server #2 4640, and identification information (UDN=tttexx) of the aggregated media server #3 4650.

Meanwhile, the control point device 4610 can request a list of aggregated media servers from the aggregate media server 4620 S4609. According to the request, the aggregate media server 4620 can transmit to the control point device 4610 identification information (UDN=aab3, 35eq, tttexx) of aggregated media servers stored in the aggregate media server 4620 S4611. By doing so, the control point device 4610 can determine an aggregated media server of the content is currently allowed to be aggregate.

The control point device 4610 can request the aggregate media server 4620 to set a specific media server of which the content is wanted to be aggregated S4613. At this time, the request to set the specific media server can include identification information of the specific media server, for example, identification information (UDN=aab3) of the aggregated media server #1 4630.

Receiving a request to set a specific media server, the aggregate media server 4620 can modify the list of aggregated media servers based on the identification information of the specific media server S4615. For example, the aggregate media server 4620 can modify the list of aggregated media servers so that the list includes only the identification information (UDN=aab3) of the aggregated media server #1 4630.

The aggregate media server 4620 can aggregate content information only from the aggregated media server #1 4630 registered in the modified list of aggregated media servers, but aggregation of content information from the aggregated media server #2 4640 and the aggregated media server #3 4650 not registered in the list is not allowed S4517.

In case the user attempts to aggregate content information again from the aggregated media server #1 4630 and the aggregated media server #2 460, the control point device 4610 can request the aggregate media server 4620 to set the aggregated media server #1 and #2 S4619.

The aggregate media server 4620 can modify the list of aggregated media servers so that the list can include only the identification information (UDN=aab3) of the aggregated media server #1 4630 and the identification information (UDN=35eq) of the aggregated media server #2 4640, S4621. In other words, identification information (UDN=35eq) of the aggregated media server #2 4640 is added to an existing list of aggregated media servers (UDN=aab3).

Therefore, the aggregate media server 4620 can aggregate content information again from the aggregated media server #2 4640, S4623.

Figure 47:
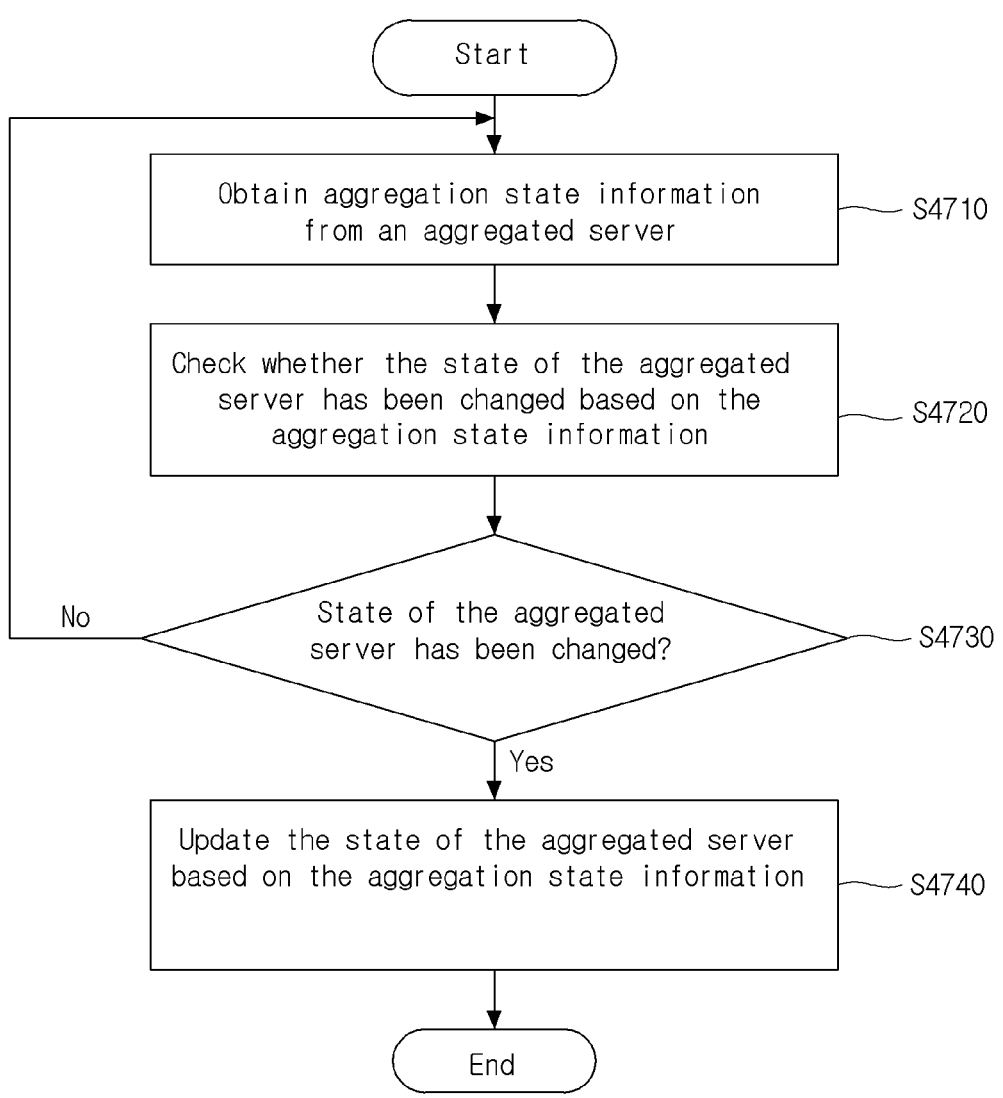
FIG. 47 is a flow diagram illustrating a method for updating changed content information in case the state of an aggregated media server has been changed according to one embodiment of the present invention.

FIG. 47 is a flow diagram illustrating a method for updating changed content information in case the state of an aggregated media server has been changed according to one embodiment of the present invention.

An aggregate media server needs to know content change information of the aggregated media server when aggregating content information from aggregated media servers.

Afterwards, in case an aggregate media server attempts to aggregate content information from aggregated media servers, the aggregate media server can receive content change information and determine which change has been made by comparing the received content change information with pre-stored content information. If it is determined that the content change information is the same as the previously aggregated content information, the aggregate media server doesn't have to aggregate content information again from the aggregated media server.

Also, when receiving content information from aggregated media servers, the aggregate media server needs to know content change information of an aggregated object.

Afterwards, when attempting to aggregate content information from aggregated media servers, the aggregate media server can aggregate only the content that has been changed by comparing content change information of aggregated objects aggregated previously with a related object located in an aggregated media server. Similarly, by comparing content change information of an aggregated object with a newly received object after aggregating content information from an aggregated media server, the aggregate media server can update only the content information which has been changed.

With reference to FIG. 47, an aggregate media server first can obtain aggregation state information from an aggregated media server S4710. The aggregation state information represents information about the aggregated media server, including, for example, identification information UDN, power state, aggregation progress state, and system update identifier.

The aggregate media server can check whether the state of the aggregated media server has been changed based on the obtained aggregation state information S4720. For example, the state of the aggregated media server can be checked by comparing aggregation state information pre-stored in the aggregate media server with the aggregation state information obtained. More specifically, in case the system update identifier among the obtained aggregation state information is larger than a pre-stored system update identifier, it can be determined that the state of the aggregated media server has been changed.

In case it is determined from the checking result that the state of the aggregated server has been changed S4730, the aggregate media server can update the state of the aggregated media server based on the aggregation state information S4740.

On the other hand, in case it is determined from the checking result that the state of the aggregated media server has not been changed S4730, it is not necessary to update the state of the aggregated media server; thus, the aggregate media server returns to the initial step.

Figure 48:
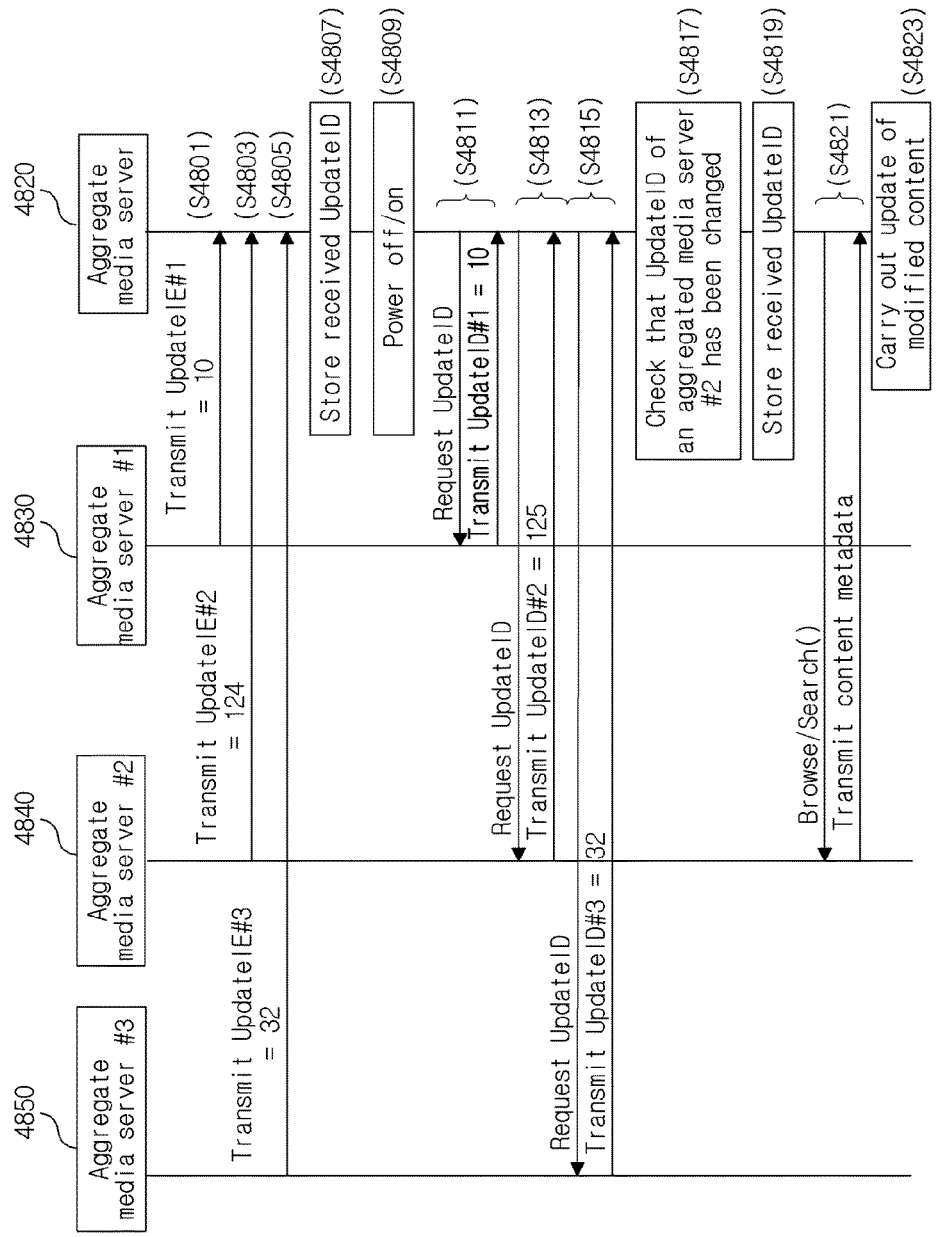
FIG. 48 is a flow diagram illustrating a process of updating changed content information in case the state of an aggregated media server has been changed according to one embodiment of the present invention.

FIG. 48 is a flow diagram illustrating a process of updating changed content information in case the state of an aggregated media server has been changed according to one embodiment of the present invention.

Since an aggregate media server aggregates content information from a plurality of aggregated media servers, in case content information change occurs in an aggregated media server, the user needs to know which content information has been changed. At this time, it is unnecessary for the aggregate media server to aggregate content information again from all of the aggregated media servers. Therefore, the aggregate media server can easily determine in which aggregated media server content information change has occurred by obtaining aggregate state information from an aggregated media server and comparing the obtained aggregate state information with pre-stored aggregation state information.

With reference to FIG. 48, the aggregate media server 4820 can obtain update identification information from aggregated media servers #1, #2, #3 (4830, 4840, 4850). For example, UpdateID#1=10 can be obtained from the aggregated media server #1 4830 S4801, UpdateID#2=124 can be obtained from the aggregated media server #2 4840 S4803, and UpdateID#3=32 can be obtained from the aggregated media server #3 4850 S4805.

The aggregate media server 4820 can store the received update identification information (UpdateID#1=10, UpdateID#2=124, UpdateID#3=32) of the aggregated media servers #1, #2, #3 (4830, 4840, 4850).

After a predetermined time period or in case the aggregate media server 4820 is turned off and then turned on, the aggregate media server 4820 can request update identification information from the aggregated media servers #1, #2, #3 (4830, 4840, 4850), and according to the request, the aggregated media servers #1, #2, #3 (4830, 4840, 4850)

transmit current update identification information (S4811, S4813,S4815). For example, the aggregated media server #1 4830 can transmit UpdateID#1=10 S4811, the aggregated media server #2 4840 can transmit UpdateID#2=125 S4813, and the aggregated media server #3 4850 can transmit UpdateID#3=32 S4815.

The aggregate media server 4820 can determine that the update identification information of the aggregated media server #2 4840 has been changed by comparing pre-stored update identification information (UpdateID#1=10, UpdateID#2=124, UpdateID#3=32) with newly received update identification information (UpdateID#1=10, UpdateID#2=125, UpdateID#3=32) S4817. And the aggregate media server 4820 stores the newly received update identification information (UpdateID#1=10, UpdateID#2=125, UpdateID#3=32) again S4819.

The aggregate media server 4820 can receive changed content information from the aggregated media server #2 4840 through a browsing action and/or a searching action S4821. Through the procedure above, the aggregate media server 4820 can carry out update of the changed content information S4823. At this time, the changed content information can include content metadata.

FIGS. 49 to 51 are embodiments to which the present invention is applied, where FIG. 49 represents action information for obtaining information about an aggregated media server; FIG. 50 represents a state variable used for the action information of FIG. 49; and FIG. 51 represents information of XML type as an example of the state variable of FIG. 50.

In the S4710 step, an aggregate media server's obtaining aggregation state information from an aggregated media server can be carried out by the GetAggregationStatus action of FIG. 49. The GetAggregationStatus action produces a current value of a state variable of the aggregated media server, and the produced value is used for identifying information about the aggregated media server.

As shown in FIG. 50, the state variable of the aggregated media server provides information about an aggregated media server. For example, information about the aggregated media server can include identification information UDN, power state, aggregation progress state, and system update identifier of the aggregated media server.

FIG. 51 represents XML type information of a state variable of the aggregated media server, and it can be known from the figure that the state variable of the aggregated media server can include identification information UDN 5110, power state 5120, aggregation progress state 5130, and system update identifier 5140 of the aggregated media server. Also, in the case of multiple aggregated media servers, the state variable of an aggregated media server includes all of the state variables about the multiple aggregated media servers S5150.

Figure 52:
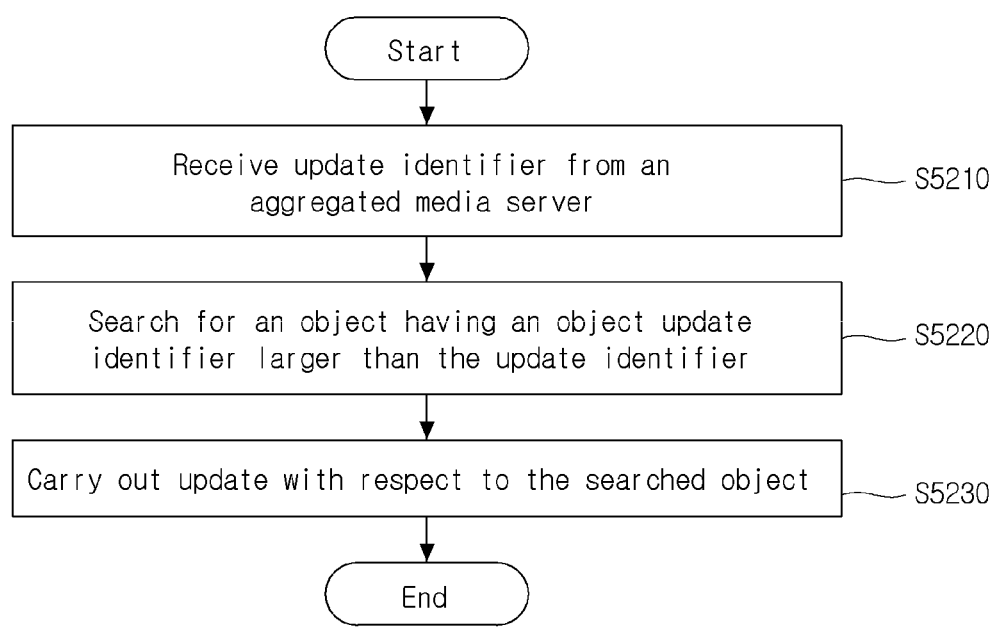
FIG. 52 is a flow diagram illustrating a method for updating changed content information by using an update identifier of an aggregated media server according to one embodiment of the present invention.

FIG. 52 is a flow diagram illustrating a method for updating changed content information by using an update identifier of an aggregated media server according to one embodiment of the present invention.

The aggregation function of an aggregate media server can be activated or deactivated by carrying out SetAggregationMode action. The SetAggregationMode action produces an aggregation mode state variable. For example, an aggregation mode state variable indicates whether CDS of a media server carries out an aggregation function, the case of '1' indicates that CDS of the corresponding media server corresponds to a media server currently carrying out an aggregation function, and the case of '0' indicates that CDS of the corresponding media server corresponds to a media server currently not carrying out an aggregation function.

In case there is a change in the original aggregate object stored in an aggregate media server, the aggregate media server should update the original aggregate object to the latest aggregate object. At this time, the original aggregate object corresponds to an object aggregated from an aggregated media server and stored in the aggregate media server. The change can indicate, for example, creation, deletion, and modification of an object.

An aggregate media server has to detect the change within an aggregated media server on a network. For example, change detection can be carried out by receiving event information from an aggregated media server. And, if needed, change detection can be carried out by executing a system update identification information get action (GetSystemUpdateID). The aggregate media server can check whether a change has occurred within the aggregated media server by monitoring update identification information of the aggregated media server.

The aggregate media server, if receiving update identification information of the aggregated media server, should update the received update identification information into the latest received state variable.

As another embodiment of the present invention, an aggregate media server can update a change by searching for a changed aggregate object by using update identification information of an aggregated media server.

In case an aggregate media server receives update identification information of an aggregated media server S5210, the aggregate media server can search for an aggregate object having object update identification information larger than the update identification information S5220.

By carrying out an update with respect to the searched aggregate object, the aggregate media server can update the change of the aggregated media server S5230.

Figure 53:
FIG. 53 shows details of aggregate object information illustrating a process of updating aggregate object information according to one embodiment of the present invention.

FIG. 53 shows details of aggregate object information illustrating a process of updating aggregate object information according to one embodiment of the present invention.

As shown in FIG. 53, an aggregate media server has aggregate object information (S5310) obtained from an aggregated media server. For example, in the case of an aggregate object of which the object ID is 'aaa', ObjectUpdateID=121, and in the case of an aggregate object of which the object ID is 'bbb', ObjectUpdateID=124.

The aggregate media server can check whether a change has occurred within the aggregated media server by monitoring update identification information of the aggregated media server. In case it is determined from the checking result that there is a change within the aggregated media server, the aggregate media server can receive new aggregate object information S5320. At this time, it can be known that the object update ID of an aggregate object of which the object ID is 'aaa' is 125 (ObjectUpdateID=125), and the object update ID of an aggregate object of which the object ID is 'bbb' is 124 (ObjectUpdateID=124).

From the result above, it can be determined that a change has occurred in an aggregate object of which the object ID is 'aaa', and the aggregate media server can carry out an update of the aggregate object into the new aggregate object information S5330.

Embodiments according to the present invention can be realized by using software, hardware, or a combination thereof in a recording medium that can be readable by a computer or a device similar thereto.

In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and other electric units for carrying out a function. In some cases, the embodiments can be implemented by the controller.

In the case of software implementation, embodiments such as a procedure or a function can be implemented together with a separate software module which enables at least one function or operation to be carried out. Software codes can be implemented by a software application written by an appropriate program language. Software codes can be stored in a memory unit and executed by a controller.

According to one embodiment of the present invention, embodiments can be implemented in the form of processor-readable program codes in a medium in which programs are recorded. Examples of a processor-readable recording medium include ROM, RAM, CD-ROM, magnetic tape, floppy disk, and optical data storage device; embodiments implemented in the form of carrier waves (for example, transfer through the Internet) are also included.

INDUSTRIAL APPLICABILITY

The devices described above are not limited to the structure and methods of the embodiments above, but the embodiments can be composed by a selective combination of the whole or part of the embodiments so that various modifications can be made.

The invention claimed is:

1. An operating method of an aggregate media server aggregating content information stored in at least one aggregated media server, the operating method comprising:
   receiving an aggregation restriction request for content information of a first aggregated media server;
   adding identification information of the first aggregated media server to a list included in an aggregation restriction state variable according to the aggregation restriction request,
   wherein the list includes identification information of a specific aggregated media server of which the content information is not allowed to be aggregated by the aggregate media server;
   requesting and obtaining aggregation state information of a second aggregated media server from the second aggregated media server not included in the list,
   wherein the aggregation state information includes an update identifier of the second aggregated media server;
   checking whether a state of the second aggregated media server has been changed by comparing the update identifier with a pre-stored update identifier of the second aggregated media server; and
   updating, when the state of the second aggregated media server has been changed according to the checking result, the state of the second aggregated media server.

2. The operating method of claim 1, wherein the updating the state of the second aggregated media server includes:
   requesting a search of the second aggregated media server for content information; and
   receiving modified content information from the second aggregated media server.

3. The operating method of claim 1, wherein the updating the state of the second aggregated media server includes:
   requesting a search of the second aggregated media server for an aggregate object having an object update identification larger than the update identification information; and
   receiving the searched aggregate object from the second aggregated media server.

4. The operating method of claim 1, further comprising:
   receiving a request for the aggregation restriction state variable; and
   transmitting the aggregation restriction state variable.

5. An aggregate media server for aggregating content information from an aggregated media server, the aggregate media server comprising:
   a network interface; and
   a controller configured to:
      control the network interface to receive an aggregation restriction request for content information of a first aggregated media server;
      add identification information of the first aggregated media server to a list included in an aggregation restriction state variable according to the aggregation request;
      wherein the list includes identification information of a specific aggregated media server of which the content information is not allowed to be aggregated by the aggregate media server,
      control the network interface to request and obtain aggregation state information of a second aggregated media server from the second aggregated media server not included in the list,
      wherein the aggregation state information includes an update identifier of the second aggregated media server,
      check whether a state of the second aggregated media server has been changed by comparing the update identifier with a pre-stored update identifier of the second aggregated media server, and
      update, when the state of the second aggregated media server has been changed according to the checking result, the state of the second aggregated media server.

6. The aggregate media server of claim 5, wherein the controller is further configured to:
   control the network interface to request a search of the second aggregated media server for content information, and
   control the network interface to receive modified content information from the second aggregated media server.

7. The aggregate media server of claim 5, wherein the controller is further configured to:
   control the network interface to request a search of the second aggregated media server for an aggregate object having an object update identification larger than the update identification information, and
   control the network interface to receive the searched aggregate object from the second aggregated media server.

8. The aggregate media server of claim 5, wherein the controller is further configured to:
   control the network interface to receive a request for the aggregation restriction state variable, and
   control the network interface to transmit the aggregation restriction state variable.

* * * * *